(12) United States Patent
Yoo

(10) Patent No.: US 10,110,767 B2
(45) Date of Patent: Oct. 23, 2018

(54) METHOD OF GENERATING WORKFORM BY USING BYOD SERVICE AND MOBILE DEVICE FOR PERFORMING THE METHOD

(71) Applicant: S-PRINTING SOLUTION CO., LTD., Suwon-si, Gyeonggi-do (KR)

(72) Inventor: Myung-han Yoo, Suwon-si (KR)

(73) Assignee: S-PRINTING SOLUTION CO., LTD., Suwon-si (KR)

(*) Notice: Subject to any disclaimer, the term of this patent is extended or adjusted under 35 U.S.C. 154(b) by 48 days.

(21) Appl. No.: 14/757,644

(22) Filed: Dec. 22, 2015

(65) Prior Publication Data

US 2016/0182757 A1 Jun. 23, 2016

(30) Foreign Application Priority Data

Dec. 22, 2014 (KR) .................. 10-2014-0186372
Aug. 26, 2015 (KR) .................. 10-2015-0120542

(51) Int. Cl.
*G06F 3/12* (2006.01)
*G06F 9/00* (2006.01)
(Continued)

(52) U.S. Cl.
CPC ....... *H04N 1/00957* (2013.01); *G06F 3/1204* (2013.01); *G06F 3/1205* (2013.01); *G06F 3/1275* (2013.01); *G06F 3/1292* (2013.01); *G06F 9/00* (2013.01); *H04M 1/72527* (2013.01); *H04N 1/00222* (2013.01); *H04N 1/00307* (2013.01); *H04N 1/00949* (2013.01); *H04N 1/32085* (2013.01);
(Continued)

(58) Field of Classification Search
None
See application file for complete search history.

(56) References Cited

U.S. PATENT DOCUMENTS 6,886,095 B1 4/2005 Hind et al.
6,980,332 B2 12/2005 Simske
(Continued)

FOREIGN PATENT DOCUMENTS

EP 2757464 A2 7/2014
JP 2014-090238 A 5/2014
(Continued)

OTHER PUBLICATIONS

Korean Office Action dated Mar. 8, 2017 from Korean Patent Application No. 10-2014-0186365, 8 pages.
(Continued)

*Primary Examiner* — John R Wallace
(74) *Attorney, Agent, or Firm* — Staas & Halsey LLP

(57) ABSTRACT

Provided is a method of generating a workform that defines an order of performing jobs, the method including: setting any one of an image forming apparatus and a mobile device as an input source for receiving a job target; setting a transforming method for transforming a job target received through the input source; setting any one of the image forming apparatus and the mobile device as a transmission destination for transmitting the job target transformed according to the transforming method; and storing a workform defining an order of performing jobs according to the input source, the transforming method, and the transmission destination.

20 Claims, 79 Drawing Sheets

(51) Int. Cl.
| | |
|---|---|
| *H04N 1/00* | (2006.01) |
| *H04N 1/32* | (2006.01) |
| *H04M 1/725* | (2006.01) |
| *H04N 1/327* | (2006.01) |
| *H04N 1/333* | (2006.01) |
| *H04W 4/00* | (2018.01) |

(52) U.S. Cl.
CPC ..... *H04N 1/32566* (2013.01); *H04N 1/32767* (2013.01); *H04N 1/33369* (2013.01); *H04W 4/00* (2013.01)

(56) References Cited

U.S. PATENT DOCUMENTS

| | | | |
|---|---|---|---|
| 6,980,660 | B1 | 12/2005 | Hind et al. |
| 8,797,571 | B2 | 8/2014 | Kong |
| 9,013,728 | B2 | 4/2015 | Adachi et al. |
| 9,258,449 | B1 | 2/2016 | Orimoto |
| 2002/0062397 | A1 | 5/2002 | Chang |
| 2006/0221374 | A1* | 10/2006 | D'Entrecasteaux ........................ H04N 1/00954 358/1.14 |
| 2007/0263872 | A1 | 11/2007 | Kirkup |
| 2009/0195817 | A1 | 8/2009 | Nakajima |
| 2009/0303532 | A1 | 12/2009 | Ito |
| 2011/0055689 | A1* | 3/2011 | Chang .................... G06Q 10/06 715/255 |
| 2011/0055832 | A1 | 3/2011 | Choi |
| 2011/0063655 | A1 | 3/2011 | Tian |
| 2011/0116631 | A1 | 5/2011 | Shon et al. |
| 2011/0128564 | A1 | 6/2011 | Kayama |
| 2011/0216349 | A1 | 9/2011 | Mccorkindale |
| 2012/0050772 | A1 | 3/2012 | Lu |
| 2012/0054493 | A1 | 3/2012 | Bradley |
| 2012/0077432 | A1 | 3/2012 | Rose et al. |
| 2012/0079409 | A1 | 3/2012 | Luo |
| 2012/0154842 | A1 | 6/2012 | Hori |
| 2012/0311659 | A1 | 12/2012 | Narain et al. |
| 2012/0322461 | A1 | 12/2012 | Ito |
| 2013/0063772 | A1 | 3/2013 | Bae |
| 2013/0077124 | A1 | 3/2013 | Vojak et al. |
| 2013/0117063 | A1 | 5/2013 | Kamath |
| 2013/0139218 | A1 | 5/2013 | Roulland et al. |
| 2013/0258408 | A1 | 10/2013 | Mizutani |
| 2013/0301077 | A1* | 11/2013 | Rocas .................... G06F 3/1288 358/1.15 |
| 2013/0326526 | A1 | 12/2013 | Sasaki |
| 2013/0329245 | A1 | 12/2013 | Nishida |
| 2013/0331027 | A1 | 12/2013 | Rose et al. |
| 2014/0006347 | A1 | 1/2014 | Qureshi et al. |
| 2014/0007182 | A1 | 1/2014 | Qureshi et al. |
| 2014/0007192 | A1 | 1/2014 | Qureshi et al. |
| 2014/0007215 | A1 | 1/2014 | Romano et al. |
| 2014/0055812 | A1* | 2/2014 | DeRoller ........... H04N 1/00854 358/1.15 |
| 2014/0071045 | A1* | 3/2014 | Muchnick ........... G06F 3/04845 345/156 |
| 2014/0149746 | A1 | 5/2014 | Yau |
| 2014/0168687 | A1 | 6/2014 | Kim et al. |
| 2014/0173692 | A1 | 6/2014 | Srinivasan et al. |
| 2014/0176991 | A1 | 6/2014 | Yun |
| 2014/0195585 | A1 | 7/2014 | Mihara |
| 2014/0218763 | A1 | 8/2014 | Takahashi et al. |
| 2014/0218765 | A1 | 8/2014 | Sawayanagi et al. |
| 2014/0226173 | A1 | 8/2014 | Tredoux |
| 2014/0280445 | A1 | 9/2014 | Hori |
| 2014/0333963 | A1 | 11/2014 | Nakamura |
| 2014/0355063 | A1 | 12/2014 | Jang et al. |
| 2015/0046971 | A1 | 2/2015 | Huh et al. |
| 2015/0092213 | A1* | 4/2015 | Tohne ................. H04N 1/00387 358/1.13 |
| 2015/0099502 | A1 | 4/2015 | Park et al. |
| 2015/0146246 | A1 | 5/2015 | Ito |
| 2015/0153975 | A1 | 6/2015 | Mori |
| 2015/0234623 | A1 | 8/2015 | Mochizuki |
| 2015/0237231 | A1 | 8/2015 | Hirose |
| 2015/0244878 | A1* | 8/2015 | MacAuley ............ G06F 3/1204 358/1.2 |
| 2015/0249757 | A1 | 9/2015 | Han |
| 2015/0271348 | A1 | 9/2015 | Kimura |
| 2016/0014293 | A1 | 1/2016 | Iwai |
| 2016/0062553 | A1 | 3/2016 | Kang |
| 2016/0065764 | A1 | 3/2016 | Kang |
| 2016/0094664 | A1 | 3/2016 | Olcese et al. |

FOREIGN PATENT DOCUMENTS

| | | |
|---|---|---|
| KR | 10-2009-0002683 A | 1/2009 |
| KR | 10-2013-0046155 A | 5/2013 |
| WO | 2012-011922 A1 | 1/2012 |
| WO | 2013-165364 A1 | 11/2013 |
| WO | 2014-017118 A1 | 1/2014 |

OTHER PUBLICATIONS

Korean Office Action dated Feb. 24, 2017 from Korean Patent Application No. 10-2014-0186490, 6 pages.
Korean Office Action dated Jan. 5, 2017 from Korean Patent Application No. 10-2014-0186490, 6 pages.
Notification of Transmittal of the International Search Report and the Written Opinion of the International Searching Authority or the Declaration, International Search Report, Written Opinion of the International Searching Authority dated Apr. 1, 2016 corresponding to International Patent Application No. PCT/KR2015/014095.
Communication with European Search Report dated May 4, 2016 corresponding to European Patent Application No. 15201879.2.
Office Action dated May 19, 2016 corresponding to European Patent Application No. 15201879.2
Notification of Transmittal of the International Search Report and the Written Opinion of the International Searching Authority or the Declaration, International Search Report, Written Opinion of the International Searching Authority, dated May 9, 2016, corresponding to International Patent Application No. PCT/KR2015/014009.
Communication with European Search Report dated May 3, 2016 corresponding to European Patent Application No. 15201856.0.
Office Action dated May 17, 2016 corresponding to European Patent Application No. 15201856.0.
Ernst Haselsteiner et al. "Security in Near Field Communication (NFC) Strengths and Weaknesses", Workshop on RFID security, Jul. 12, 2006, XP055257832.
NFC-SEC NECIP-1 Security Services and Protocol Cryptography Standard using ECDH and AES White paper, Dec. 9, 2008, XP055267898.
Office Action dated Jun. 16, 2016 corresponding to Korean Patent Application No. 10-2014-0186490.
HP ePrint, Wikipedia, downloaded from https://en.wikipedia.org/wiki/HP_ePrint on Nov. 20, 2015.
https://play.google.com/store/apps/details?id=com.mobilemotion.dubsmash, downloaded Nov. 20, 2015.
https://play.google.com/store/apps/details?id=com.google.android.apps.unveil, downloaded Nov. 20, 2015.
European Search Report for EP 15184577.3-1903 dated Jun. 27, 2016.
Examination Report for EP 15184577.3-1903 dated Jul. 12, 2016.
Korean Office Action for 10-2014-0186365 dated Sep. 7, 2016.
Office Action dated Jun. 21, 2016 from U.S. Appl. No. 14/739,905.
Office Action dated Jan. 11, 2017 from U.S. Appl. No. 14/739,905.
Office Action dated Jun. 9, 2017 from U.S. Appl. No. 14/739,905.
Korean Office Action dated Apr. 13, 2017 from Korean Patent Application No. 10-2014-0186365, 8 pages.
Office Action dated Jun. 20, 2016 from U.S. Appl. No. 14/979,281.
Office Action dated Nov. 10, 2016 from U.S. Appl. No. 14/979,281.
Office Action dated May 3, 2017 from U.S. Appl. No. 14/979,281.
U.S. Appl. No. 14/739,905, filed Jun. 15, 2015, Tae-gyun Cho, S-Printing Solution Co., Ltd.

(56) References Cited

OTHER PUBLICATIONS

U.S. Appl. No. 14/979,281, filed Dec. 22, 2015, Ju-ho Eum, S-Printing Solution Co., Ltd.

* cited by examiner

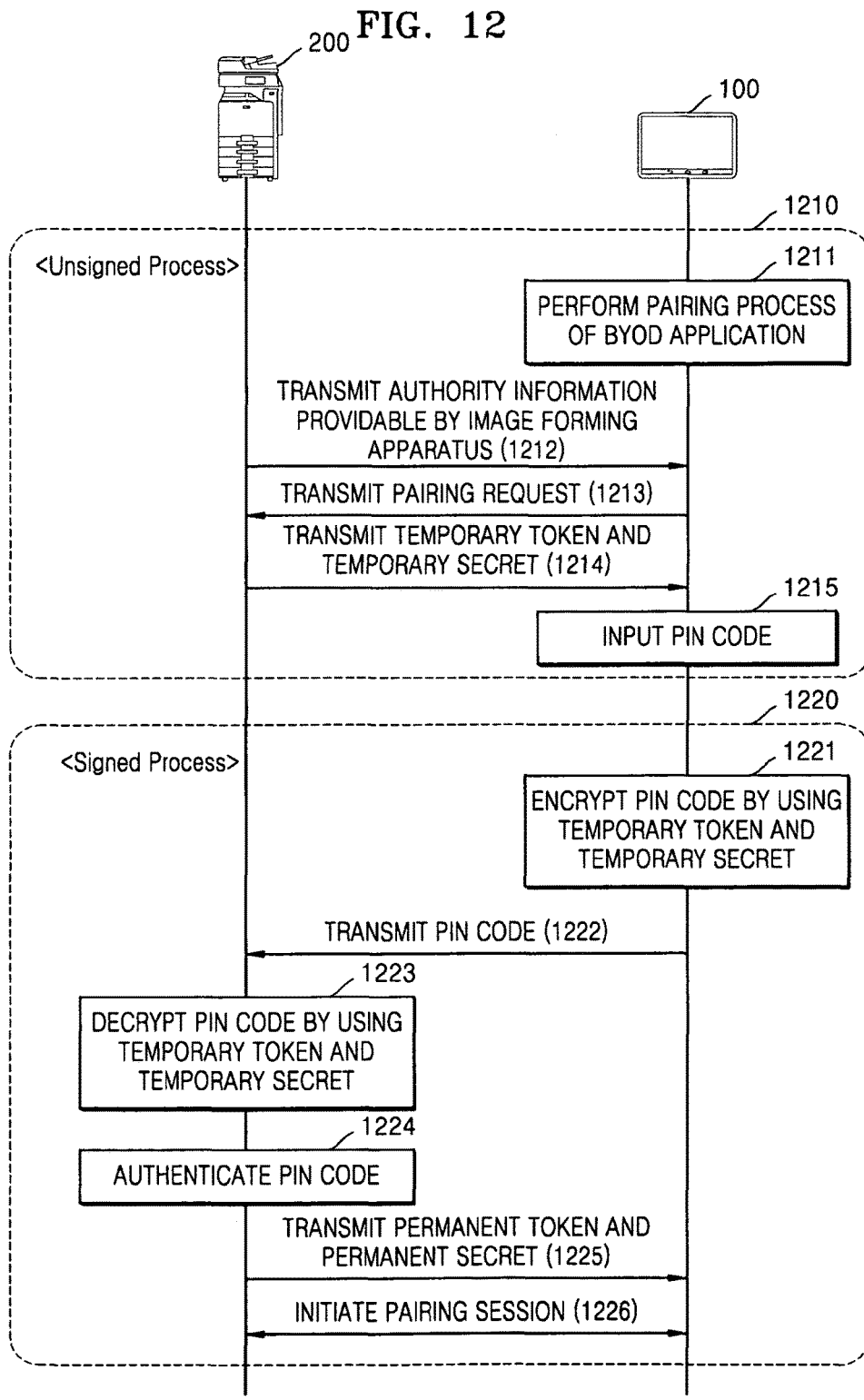

FIG. 13A authoritiesCap:[saaLocalUiAccess, saaJobCreation, saaJobControl, saaServiceMode, saaUpComplete, saaReadCardReader, saaManageApplicationInstallation, saaObtainThirdPartySession, saaObtainSafeCredentials, saaObtainUnsafeCredentials]

FIG. 13B

```
clientinfo:{
    clientToken:{
        token:jjhhmht6kngt545
        secret:aalljnzxy678687jasd
    }
}
```

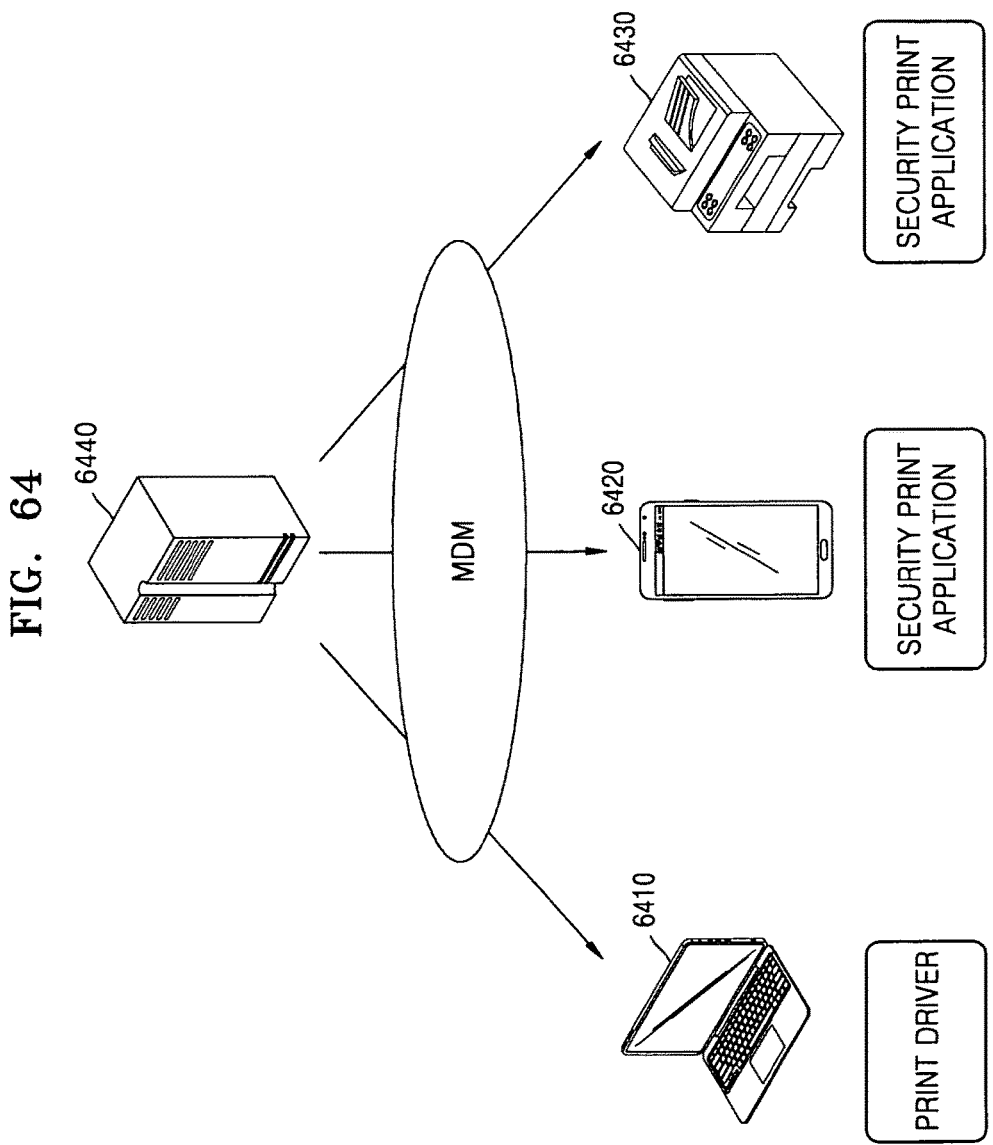

METHOD OF GENERATING WORKFORM BY USING BYOD SERVICE AND MOBILE DEVICE FOR PERFORMING THE METHOD

RELATED APPLICATION(S)

This application claims the benefit of Korean Patent Application No. 10-2014-0186372, filed on Dec. 22, 2014, in the Korean Intellectual Property Office, and Korean Patent Application No. 10-2015-0120542, filed on Aug. 26, 2015, in the Korean Intellectual Property Office, the disclosures of which are incorporated herein in their entirety by reference.

BACKGROUND

One or more exemplary embodiments relate to a method of generating a workform by using a bring your own device (BYOD) service, and a mobile device for performing the method.

Recently, BYOD services appear as use of personal devices at work increased. A BYOD service allows a user to use a personal device while conducting company business. Thus, a company's information, apparatuses, and systems are accessible by a personal device, such as, for example, a laptop, a smart phone, a tablet personal computer (PC), and the like. For example, the user, such as, an employee may conduct business by accessing a company's system with a personal laptop instead of a company desktop issued for business use.

When a BYOD working environment is created, employees do not need to carry separate devices for business use and personal use, and thus productivity may improve and company expenses due to purchasing of devices may be reduced.

SUMMARY

One or more exemplary embodiments include a method of generating a workform for defining an order of performing jobs by using a bring your own device (BYOD) service, and a mobile device for performing the same.

Additional aspects will be set forth in part in the description which follows and, in part, will be apparent from the description, or may be learned by practice of the presented exemplary embodiments.

According to one or more exemplary embodiments, a method of generating a workform that defines an order of performing jobs, the method includes: setting any one of an image forming apparatus and a mobile device as an input source for receiving a job target; setting a transforming method for transforming the job target received through the input source; setting any one of the image forming apparatus and the mobile device as a transmission destination for transmitting the transformed job target; and storing a workform defining an order of performing jobs according to the input source, the transforming method, and the transmission destination.

The setting of any one of the image forming apparatus and the mobile device as the input source may include: selecting any one of the image forming apparatus and the mobile device; and selecting a function of the selected any one of the image forming apparatus and the mobile device to operate as the input source.

The setting of any one of the image forming apparatus and the mobile device as the input source may further include setting an option related to performing the selected function.

The setting of the transforming method may include setting the transforming method for transforming the job target by using an application installed in the mobile device in which the workform is stored.

The setting of any one of the image forming apparatus and the mobile device as the transmission destination may include: selecting any one of the image forming apparatus and the mobile device; and selecting a function to be performed by the selected any one of the image forming apparatus and the mobile device after the job target is transmitted to the selected any one of the image forming apparatus and the mobile device.

The setting of any one of the image forming apparatus and the mobile device as the transmission destination may further include setting an option related to performing the selected function.

When the image forming apparatus is set as the input source, the setting of any one of the image forming apparatus and the mobile device as the transmission destination may include setting an image forming apparatus that is different from the image forming apparatus set as the input source, as the transmission destination.

A name of the workform may be automatically generated such that details and orders of jobs defined in the workform are distinguished.

When the workform is stored in the mobile device, the mobile device may perform pairing with the image forming apparatus set as the input source or the transmission destination.

According to one or more exemplary embodiments, a mobile device includes: an input unit that receives a user input for setting an input source, a transforming method, and a transmission destination, which are used to form a workform; a controller that generates a workform defining an order of performing jobs according to the input source, the transforming method, and the transmission destination, which are set according to the user input received through the input unit; and a storage unit that stores the generated workform, wherein the input source is used to receive a job target, the transforming method is used to transform the job target received through the input source, and the transmission destination is used to transmit the transformed job target, and any one of an image forming apparatus and the mobile device is set as each of the input source and the transmission destination.

When the user input received through the input unit contains information about selecting any one of the image forming apparatus and the mobile device as the input source and selecting a function of the selected any one of the image forming apparatus and the mobile device to operate as the input source, the controller may generate the workform to include the selected any one of the image forming apparatus and the mobile device and the selected function.

When the user input received through the input unit further contains information about setting an option related to performing the selected function, the controller may generate the workform to further include the option.

When the user input received through the input unit contains information about transforming the job target by using an application installed in the mobile device, the controller may generate the workform to define the application as the transforming method.

When the user input received through the input unit contains information about selecting any one of the image forming apparatus and the mobile device as the transmission destination, and selecting a function to be performed by the selected any one of the image forming apparatus and the mobile device after the job target is transmitted to the selected any one of the image forming apparatus and the mobile device, the controller may generate the workform to include the selected any one of the image forming apparatus and the mobile device and the selected function.

When the user input received through the input unit further contains information about setting an option related to performing the selected function, the controller may generate the workform to further include the option.

When the image forming apparatus is set as the input source, an image forming apparatus that is different from the image forming apparatus set as the input source may be set as the transmission destination.

The controller may automatically generate a name of the workform such that details and orders of jobs defined in the workform are distinguished.

The mobile device may further include a communication unit that communicates with the image forming apparatus, wherein, when the workform is generated, the controller may perform pairing with the image forming apparatus set as the input source or the transmission destination, through the communication unit.

BRIEF DESCRIPTION OF THE DRAWINGS

These and/or other aspects will become apparent and more readily appreciated from the following description of the exemplary embodiments, taken in conjunction with the accompanying drawings in which:

FIG. 12 is a detailed flowchart of a pairing process between a mobile device and an image forming apparatus to perform a BYOD service, according to an exemplary embodiment;

FIG. 13A is a diagram describing authority information provided from an image forming apparatus to a mobile device, according to an exemplary embodiment;

FIG. 13B is a diagram describing credential information (a token and a secret) provided from an image forming apparatus to a mobile device, according to an exemplary embodiment;

FIG. 64 is a diagram of an environment providing a security print solution in a BYOD environment, according to an exemplary embodiment;

DETAILED DESCRIPTION

Figure 1:
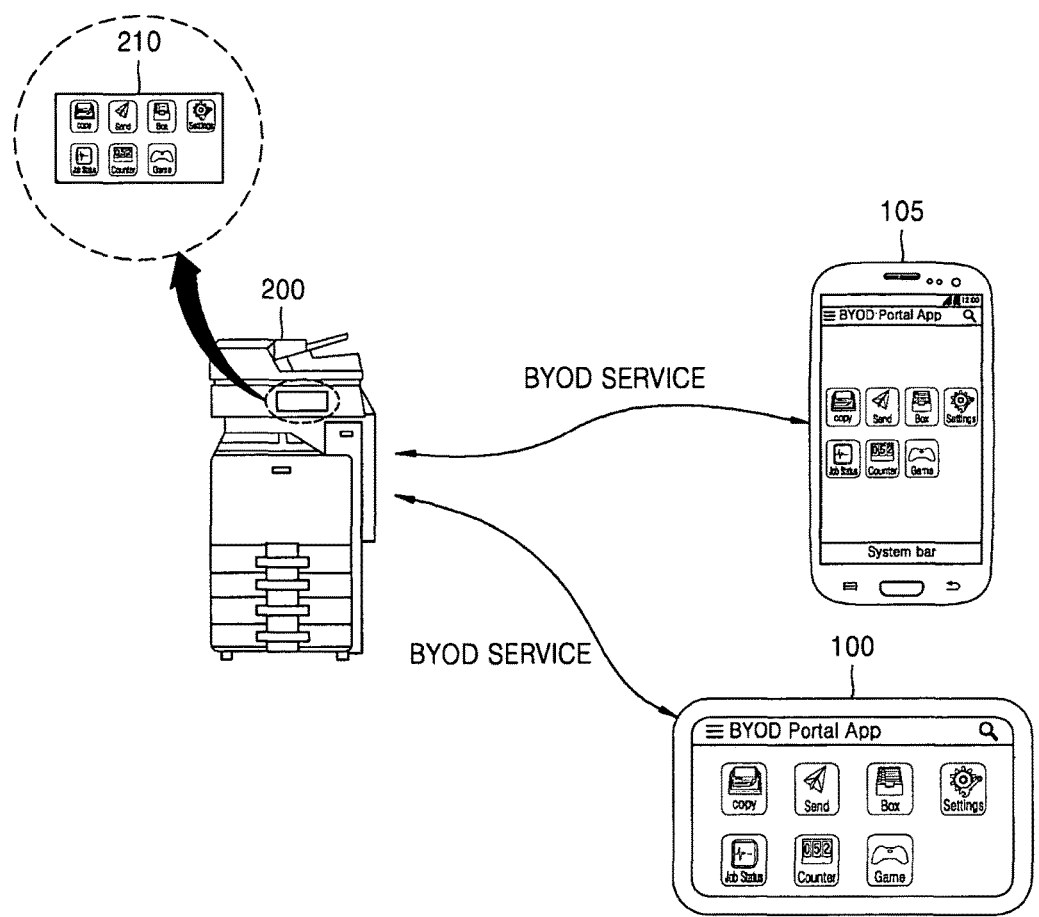
FIG. 1 is a diagram of a bring your own device (BYOD) environment according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description.

It will be further understood that the terms "include" and/or "including" used herein specify the presence of stated features or components, but do not preclude the presence or addition of one or more other features or components.

It will be understood that although the terms "first", "second", etc. may be used herein to describe various components, these components should not be limited by these terms. These components are only used to distinguish one component from another.

Expressions such as "at least one of," when preceding a list of elements, modify the entire list of elements and do not modify the individual elements of the list.

One or more exemplary embodiments will now be described in detail with reference to accompanying drawings.

FIG. 1 is a diagram of a "bring your own device" (BYOD) environment according to an exemplary embodiment. In the BYOD environment according to an exemplary embodiment, a user may manipulate various functions of an image forming apparatus 200 by using one or more BYOD device, for example, in the form of a mobile device 100 or 105, via a BYOD service. In other words, one or more BYOD devices controlling the image forming apparatus 200 may be simultaneously connected to the image forming apparatus 200. The BYOD service may be a service in which a personal device accesses a function of the image forming apparatus 200 such that a resource of the image forming apparatus 200 is shared with the personal device. The BYOD environment may be a network system for using the BYOD service.

In FIG. 1, the mobile device 100 is illustrated as a tablet device and the mobile device 105 is illustrated as a smart phone, but types of the mobile devices 100 and 105 are not limited thereto. In other words, the mobile device 100 or 105 may be any one of various devices including a display screen, such as a tablet device, a smart phone, a laptop, a personal digital assistant (PDA), and a wearable device (a watch or glasses).

A BYOD application needs to be installed in the mobile device 100 or 105 supporting BYOD, in order to use the BYOD service. The BYOD application may also be referred to as a BYOD portal app. When the BYOD application is installed in the mobile device 100 or 105, the mobile device 100 or 105 transmits a control command to the image forming apparatus 200 to control operations of the image forming apparatus 200. Here, the BYOD application may control the image forming apparatus 200 via an application programming interface (API). The mobile device 100 or 105 may be wirelessly connected to the image forming apparatus 200 through an access point (AP) or Wi-Fi direct.

As shown, the image forming apparatus 200 includes a manipulator 210, and a user may manipulate the image forming apparatus 200 also via the manipulator 210. The manipulator 210 may include a display panel that displays a graphical user interface (GUI), and an input key to receive a user input.

The manipulator 210 of the image forming apparatus 200, and the mobile device 100 or 105 may have independent user interface (UI) contents. In other words, the mobile device 100 or 105 may display UI contents displayed on the manipulator 210, or display independent UI contents for manipulating the image forming apparatus 200, which are different from the UI contents displayed on the manipulator 210. In other words, UI contents for performing various functions of the image forming apparatus 200, such as copying, printing, and scanning, may be independently provided to the BYOD application installed in the mobile device 100 or 105.

The user may perform some or all manipulations available in the manipulator 210 by using the mobile device 100 or 105. As such, according to the current embodiment, the user may manipulate the image forming apparatus 200 by using the mobile device 100 or 105, and may conveniently print a file stored in the mobile device 100 or 105, or perform an imaging job (e.g., scan-to-email or scan-to-cloud) by using an address book stored in the mobile device 100 or 105, and thus user convenience may improve. Also, for example, a process of transforming image data to print data, such as a print command language (PCL), a page description language (PDL), or a postscript (PS), may be performed via a resource of the image forming apparatus 200 that has a relatively high process performance, instead of a resource of the mobile device 100 or 105 that has a relatively low process performance. This way, print data may be processed at a high speed compared to a general mobile printing application.

As such, the mobile device 100 or 105 may be connected to the image forming apparatus 200 in order to perform the BYOD service to control the image forming apparatus 200. In the current embodiment, the mobile device 100 or 105 is connected to the image forming apparatus 200 via a variety of connection method, such as, for example, pairing. The connection method for a BYOD service will now be described in detail with reference to relevant drawings.

Figure 2A:
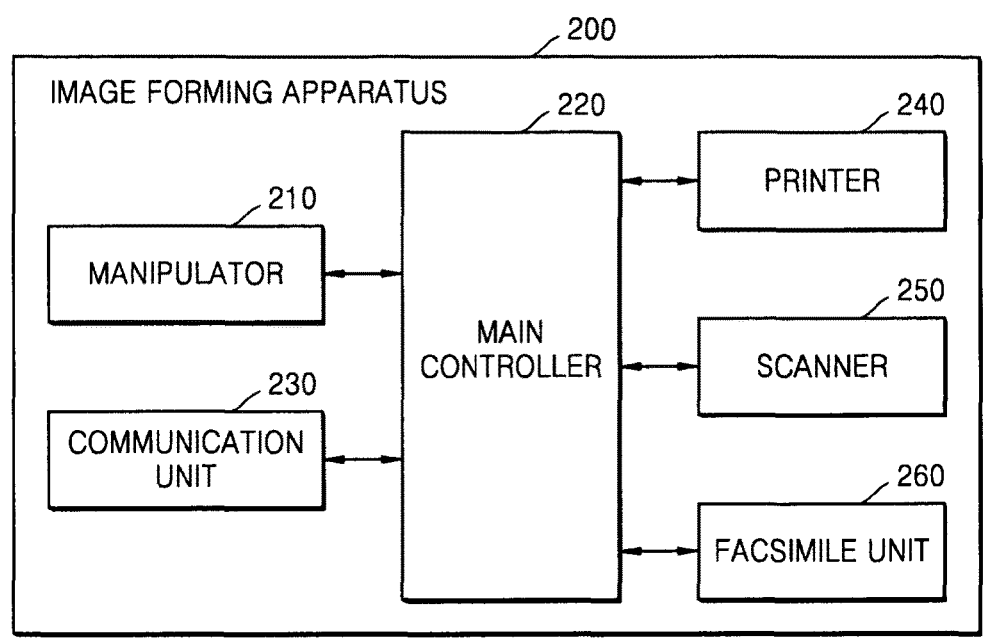
FIG. 2A is a block diagram of hardware components of an image forming apparatus, according to an exemplary embodiment.

FIG. 2A is a block diagram of hardware components of the image forming apparatus 200 of FIG. 1, according to an exemplary embodiment. Referring to FIG. 2A, the image forming apparatus 200 may include the manipulator 210 of FIG. 1, a main controller 220, a communication unit 230, a printer 240, a scanner 250, and a facsimile unit 260. However, it would be obvious to one of ordinary skill in the art that the image forming apparatus 200 may further include general-purpose hardware components other than those shown in FIG. 2A.

The manipulator 210 is a hardware component used by the user to manipulate or control the image forming apparatus 200. The manipulator 210 may include a display panel (not shown) for displaying a GUI screen, and an input key for receiving a user input. The manipulator 210 provides the GUI screen to the user, and transmits a manipulation command received from the user through the GUI screen to the main controller 220.

The main controller 220 is a hardware component that controls operations of some or all components included in the image forming apparatus 200, and may be realized as a processor. The main controller 220 may communicate with the manipulator 210 to transmit and receive commands required to manipulate and control the image forming apparatus 200 to and from the manipulator 210. Also, the main controller 220 may communicate with the mobile device 100 or 105 connected to the image forming apparatus 200 for the BYOD service to transmit and receive commands required to manipulate and control the image forming apparatus to and from the mobile device 100 or 105 of FIG. 1.

The communication unit 230 is a hardware component for communicating with the mobile device 100 or 105 (of FIG. 1) that provides the BYOD service as discussed above with respect to FIG. 1. The communication unit 230 may be connected to the mobile device 100 or 105 via an AP or directly by using Wi-Fi direct.

The printer 240 performs a print operation according to control of the main controller 220, the scanner 250 performs a scan operation according to control of the main controller 220, and the facsimile unit 260 performs a facsimile operation according to control of the main controller 220.

Figure 2B:
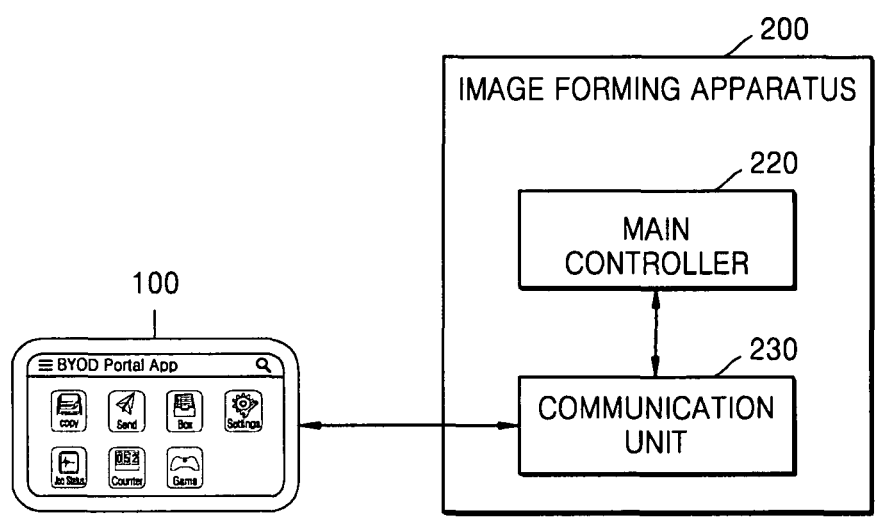
FIG. 2B is a block diagram of hardware components of an image forming apparatus, according to another exemplary embodiment.

FIG. 2B is a block diagram of hardware components of the image forming apparatus 200 of FIG. 1, according to another exemplary embodiment. Referring to FIG. 2B, the image forming apparatus 200 may include the main controller 220 (of FIGS. 1 and 2A) and the communication unit 230 (of FIG. 2A). In other words, the image forming apparatus 200 of FIG. 2B includes only some of the components of the image forming apparatus 200 of FIG. 2A for convenience of description, but the components of the image forming apparatus 200 of FIG. 2B are not limited thereto.

The communication unit 230 transmits to the mobile device 100 temporary credential information that is issued upon receiving a pairing request from the mobile device 100, and receives a personal identification number (PIN) code that is encrypted by the mobile device 100.

The main controller 220 decrypts the PIN code by using the temporary credential information so as to determine whether the PIN code is valid.

When it is determined that the PIN code is valid, the main controller 220 issues permanent credential information, and controls the communication unit 230 such that the permanent credential information is returned to the mobile device 100.

Figure 3A:
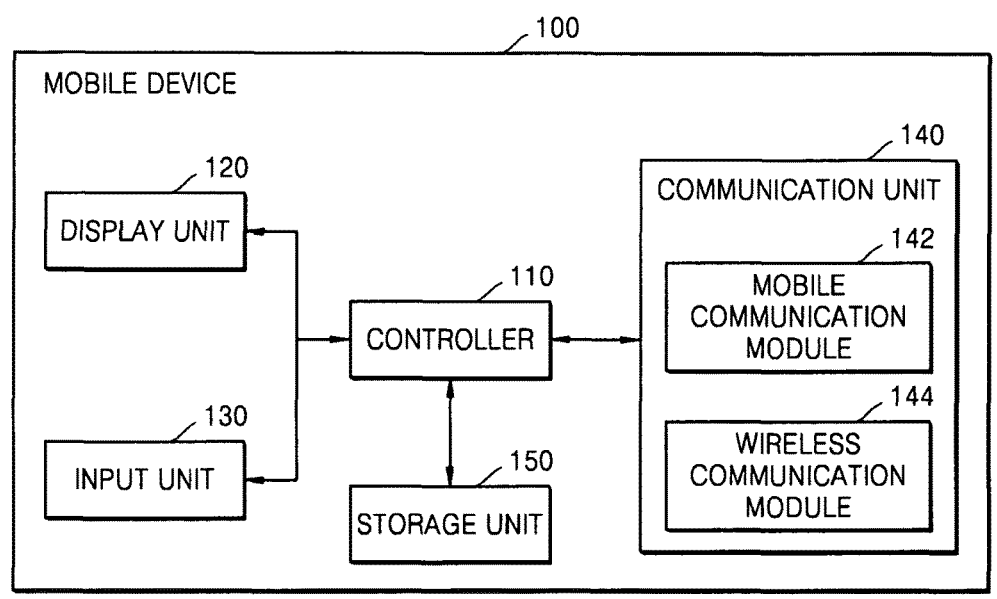
FIG. 3A is a block diagram of hardware components of a mobile device, according to an exemplary embodiment.

FIG. 3A is a block diagram of hardware components of the mobile device 100 of FIG. 1, according to an exemplary embodiment. Referring to FIG. 3A, the mobile device 100 may include a controller 110, a display unit 120, an input unit 130, a communication unit 140, and a storage unit 150. Also, the communication unit 140 may include a mobile communication module 142 and a wireless communication module 144. However, the mobile device 100 may include general-purpose hardware components other than or in addition to those shown in FIG. 3A. Meanwhile, in FIG. 3A, components of the mobile device 100 of FIG. 1 will be described, but details of FIG. 3A may also be applied to the mobile device 105 of FIG. 1. In other words, the mobile device 105 of FIG. 1 may include the components of the mobile device 100 shown in FIG. 3A and other additional components not shown. In the embodiment shown, the storage unit 150 may store a BYOD application (not shown). In some embodiments, the BYOD application may be stored in other components external to the controller 110, or, alternatively, internally as a part of the controller 110. Further, although the storage unit 150 is shown as external to the controller 110, the storage unit 150 may also be a storage unit embedded in the controller 110.

The controller 110 is a hardware component realized in at least one processor, and may control overall operations of the components in the mobile device 100. For example, the controller 110 may execute the BYOD application stored in the storage unit 150 to control the BYOD service regarding the image forming apparatus 200. Also, the controller 110 may control the mobile device 100 such that a connection to the image forming apparatus 200 for the BYOD service is established. In addition, the controller 110 may control functions and operations of the mobile device 100 described hereinafter according to one or more exemplary embodiments. The controller 110 may be realized as a processor module, such as a central processing unit (CPU), an application processor, or a graphics processing unit (GPU).

The display unit 120 displays and outputs information processed by the mobile device 100. For example, the display unit 120 may display a GUI screen for controlling the image forming apparatus 200 according to the BYOD service, or display information about an event (e.g., a print completion event or a power low event) generated in the image forming apparatus 200. Also, the display unit 120 may display information (e.g., a discovery result or a PIN code input screen) for the mobile device 100 to connect to the image forming apparatus 200 for the BYOD service. The display unit 120 may be of any type, for example, a liquid crystal display (LCD), a thin-film transistor-liquid crystal display (TFT-LCD), an organic light-emitting diode (OLED), a flexible display, a 3-dimensional (3D) display, or an electrophoretic display.

The input unit 130 allows a user to input information or instructions to control the mobile device 100. For example, although not shown, the input unit 130 may include a keypad, a dome switch, a touch pad (a contact capacitance type, a pressure resistance film type, an infrared ray detection type, or a piezoelectric effect type), a jog wheel, or a jog switch, but is not limited thereto. The input unit 130 may receive a user input for selecting any one of various contents or options displayed on the display unit 120. For example, the input unit 130 may receive information about a PIN code for authenticating the mobile device 100 to the image forming apparatus 200 to be connected for the BYOD service, from the user.

In the mobile device 100, the display unit 120 and the input unit 130 may be integrated in a form of a touch screen widely used in smart phones or tablet devices.

The communication unit 140 performs communication between the mobile device 100 and the image forming apparatus 200, and may include the mobile communication module 142 and the wireless communication module 144.

The mobile communication module 142 transmits and receives a mobile communication signal to and from a base station (not shown), an external device (not shown), or a server (not shown) on a mobile communication network (not shown). Here, examples of the mobile communication signal include various types of wireless data, such as a voice call signal, an image call signal, a text/multimedia message signal, and a content data signal received through a mobile communication network, such as third generation (3G) or fourth generation (4G).

The wireless communication module 144 may include a Bluetooth module (not shown), a Bluetooth low energy (BLE) module (not shown), a near field communication (NFC) module (not shown), a wireless local area network (WLAN) (Wi-Fi) module (not shown), a Zigbee module (not shown), an infrared data association (IrDA) module (not shown), a Wi-Fi direct (WFD) module (not shown), or an ultra-wideband (UWB) module (not shown), but is not limited thereto. The wireless communication module 144 also enables communication with the image forming apparatus 200 via a local area wireless connection or a wireless network connection.

The storage unit 150 may store programs for processes and control of the controller 110, or may store various types of data (e.g., applications, such as, the BYOD application) and various types of contents (e.g., documents, pictures, and images). The storage unit 150 may include any one of various types of storage media, such as a flash memory, a hard disk drive (HDD), a card memory (e.g., a secure digital (SD) card), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. Also, the storage unit 150 may operate as a web storage unit.

Figure 3B:
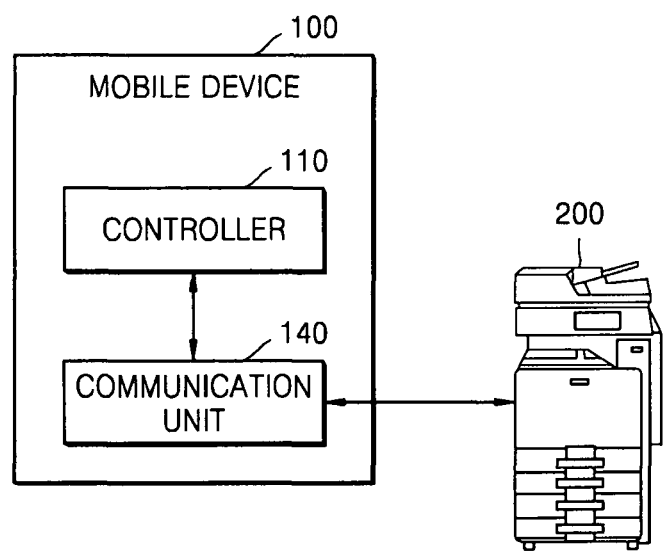
FIG. 3B is a block diagram of hardware components of a mobile device, according to another exemplary embodiment.

FIG. 3B is a block diagram of hardware components of the mobile device 100 of FIG. 1, according to another exemplary embodiment. Referring to FIG. 3B, the mobile device 100 may include the controller 110 of FIG. 3A and the communication unit 140 of FIG. 3A. In other words, the mobile device 100 of FIG. 3B includes some of the components of the mobile device 100 of FIG. 3A for convenience of description, but the components of the mobile device 100 of FIG. 3B are not limited thereto.

The communication unit 140 receives temporary credential information issued by the image forming apparatus 200 upon transmitting a pairing request to the image forming apparatus 200.

The controller 110 encrypts a PIN code input by the user by using the temporary credential information.

The communication unit 140 transmits the PIN code to the image forming apparatus 200, and when the image forming apparatus 200 determines that the PIN code is valid, receives permanent credential information from the image forming apparatus 200.

Detailed functions and operations of the components of the image forming apparatus and the mobile device 100 will now be described in detail in connection to FIGS. 2A through 3B.

Figure 4:
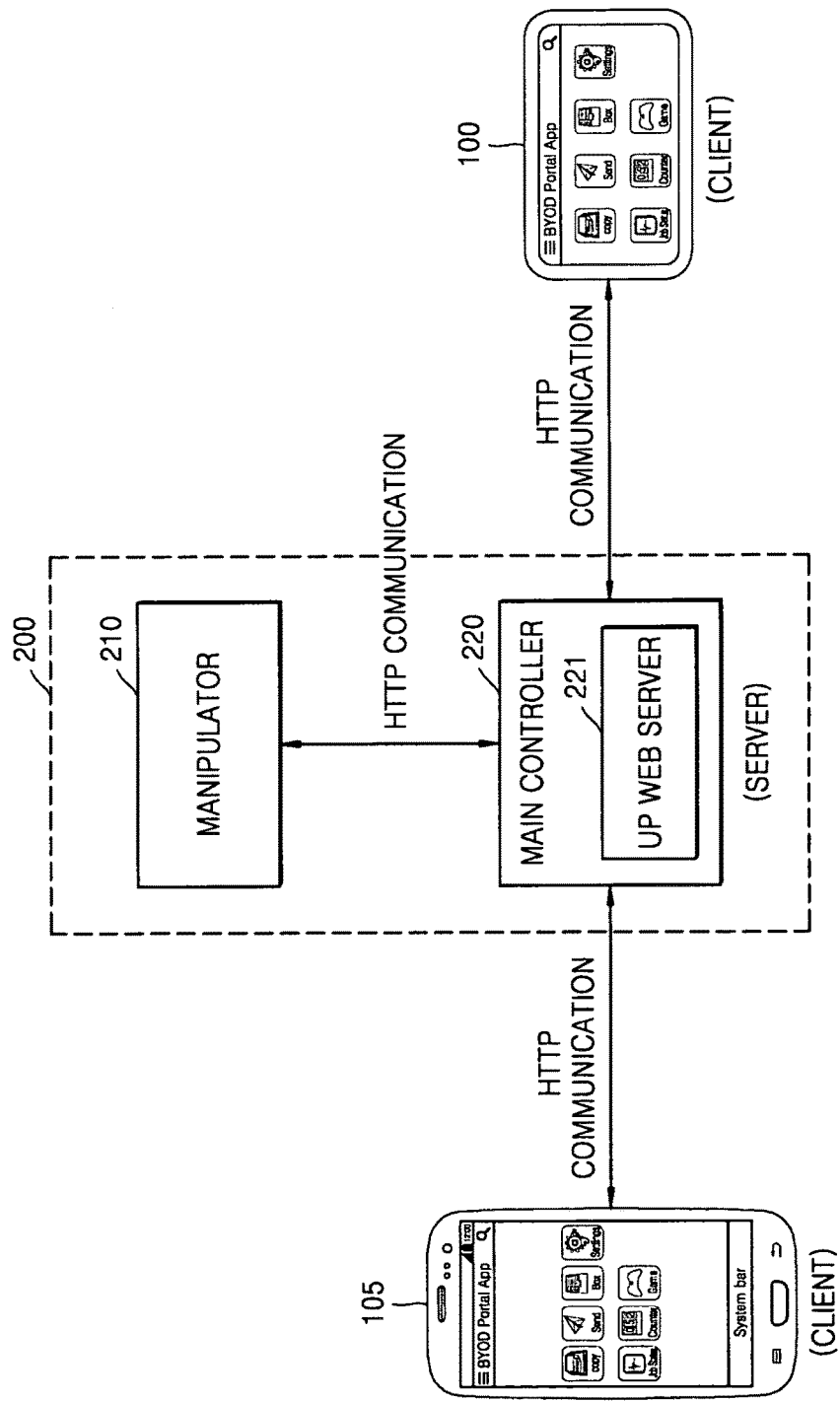
FIG. 4 is a diagram describing communications between mobile devices and an image forming apparatus in a BYOD environment, according to an exemplary embodiment.

FIG. 4 is a diagram describing communications between the mobile devices 100 and 105 and the image forming apparatus 200 in a BYOD environment, according to an exemplary embodiment.

Referring to FIG. 4, the image forming apparatus 200 is connected to the mobile devices 100 and 105, but the number of mobile devices is not limited to two. As shown in FIG. 4, the mobile devices 100 and 105 for the BYOD service may be simultaneously connected to the image forming apparatus 200. In some embodiments, the number of BYOD devices simultaneously connectable to the image forming apparatus 200 may be limited. For example, a maximum number of BYOD devices simultaneously connectable to the image forming apparatus 200 may be pre-set based on product specifications, for example, a memory size, of the image forming apparatus, and a BYOD device that tries to connect to the image forming apparatus 200 may not be allowed when the maximum number has already been reached.

In the BYOD environment, the mobile devices 100 and 105, and the image forming apparatus 200 may perform communications using a unified protocol (UP). In detail, the main controller 220 of the image forming apparatus 200 may perform UP communications with the mobile devices 100 and 105. Also, the main controller 220 may perform UP communication with the manipulator 210. A UP is a web service API, and is a protocol for accessing, generating, deleting, and updating a resource by using a hypertext transfer protocol (HTTP) based on a uniform resource locator (URL).

The mobile devices 100 and 105 may control operations of the image forming apparatus 200 by transmitting UP commands to the main controller 220. The main controller 220 controls the printer 240, the scanner 250, and the facsimile unit 260 to perform operations corresponding to UP commands received from the manipulator 210 or the mobile devices 100 and 105.

Meanwhile, when an event is generated, the main controller 220 broadcasts the event to the manipulator 210 and the mobile devices 100 and 105. The manipulator 210 and the mobile devices 100 and 105 may each determine whether the event needs to be processed, and perform an operation when the event needs to be processed and ignore the event when the event does not need to be processed.

In order to perform UP communication, the main controller 220 may operate as a server. In other words, the main controller 220 may include a UP web server 221. Here, it may be assumed that the manipulator 210 and the mobile devices 100 and 105 are clients. The clients may request the UP web server 221 for resources, and the UP web server 221 responds to the requests. The UP web server 221 and the clients may use HTTP as a communication protocol. Thus, any device may be connected to the UP web server 221 as long as the device uses HTTP, and may communicate with the UP web server 221 as long as the device uses a determined protocol despite a different platform.

Figure 5:
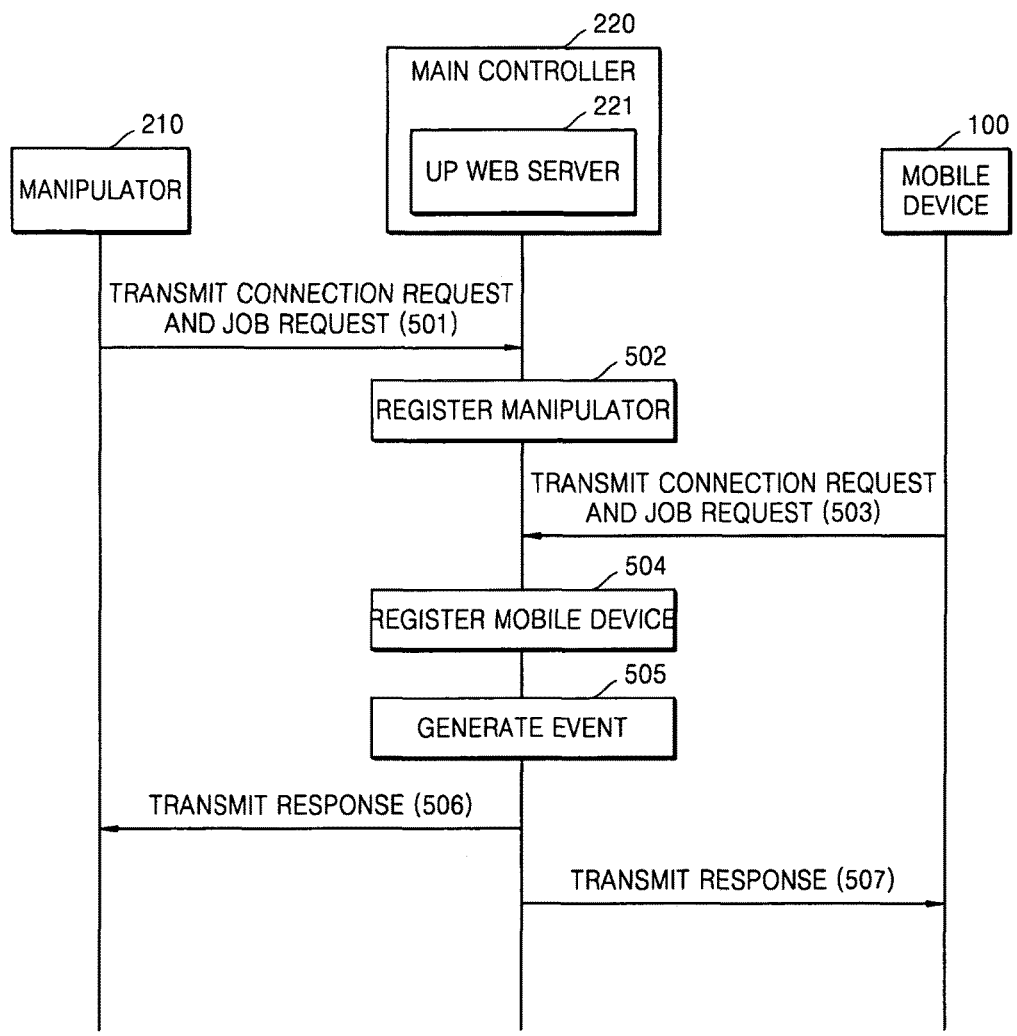
FIG. 5 is a diagram describing operations of performing unified protocol (UP) communication, according to an exemplary embodiment.

FIG. 5 is a diagram describing operations of performing UP communication, according to an exemplary embodiment. The manipulator 210 and the main controller 220 of FIG. 5 may be components included in the image forming apparatus 200 of FIG. 2A or 2B.

Referring to FIG. 5, when the manipulator 210 transmits a connection request and a job request to the UP web server 221 of the main controller 220 by using HTTP in operation 501, the UP web server 221 registers the manipulator 210 in operation 502. In other words, the UP web server 221 generates a session by using access information included in a HTTP request received from the manipulator 210.

Similarly, when the mobile device 100 transmits a connection request and a job request to the UP web server 221 by using HTTP in operation 503, the UP web server 221 registers the mobile device 100 in operation 504. In other words, the UP web server 221 generates a session by using access information included in a HTTP request received from the mobile device 100.

When an event is generated in the image forming apparatus 200 in operation 505, the UP web server 221 transmits a response to the manipulator 210 and the mobile device 100 respectively in operations 506 and 507. According to an exemplary embodiment, the UP web server 221 may not immediately transmit a response upon receiving a request from the manipulator 210 or the mobile device 100, but may transmit the response after an event is generated, and such a method may be referred to as a long polling method.

Figure 6:
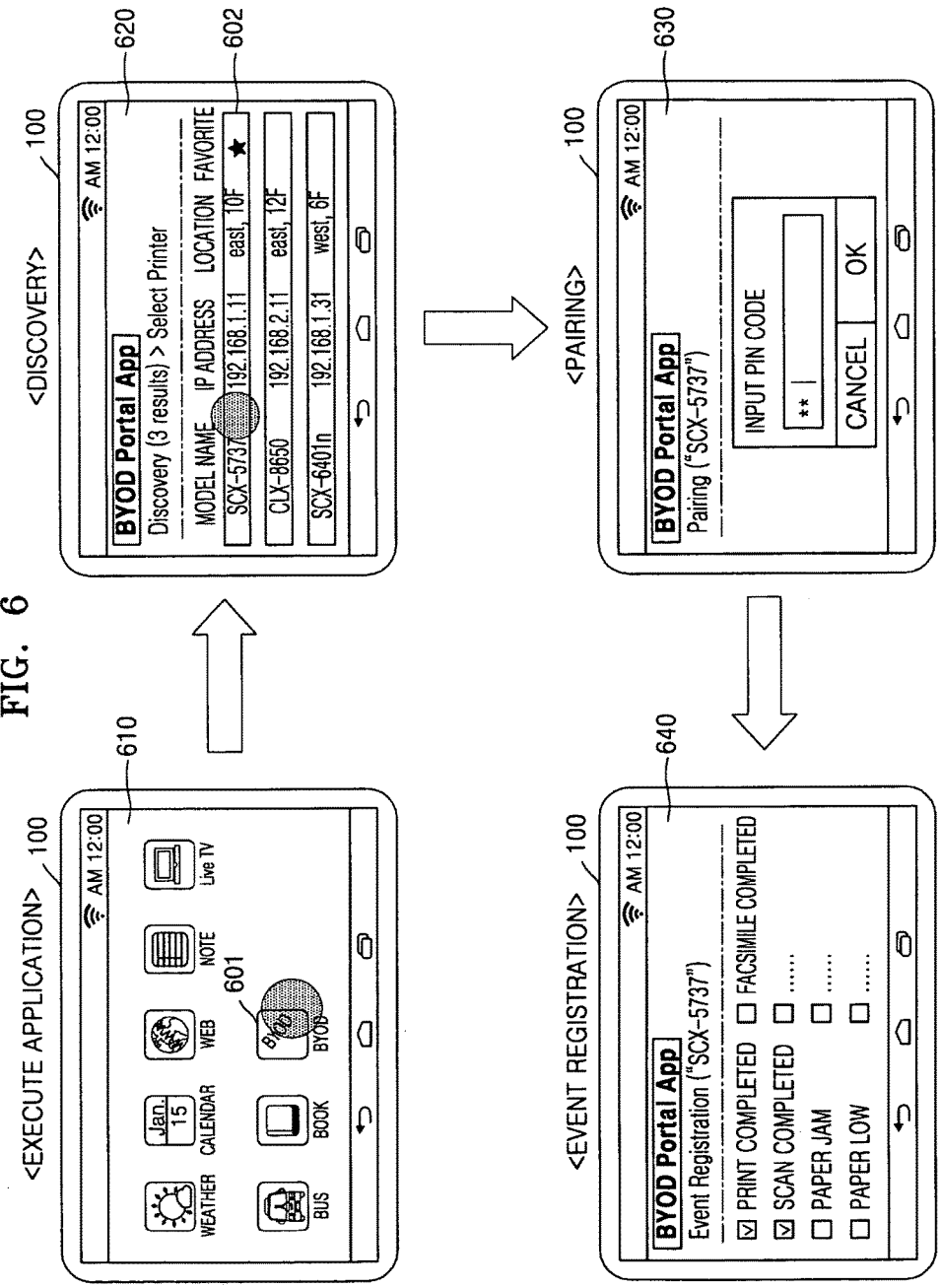
FIG. 6 illustrates user interface (UI) screens of a mobile device, which are displayed while the mobile device is connected to an image forming apparatus to perform a BYOD service, according to an exemplary embodiment.

FIG. 6 illustrates UI screens of the mobile device 100, which are displayed while the mobile device 100 is connected to the image forming apparatus 200 to perform a BYOD service, according to an exemplary embodiment. The UI screens of FIG. 6 are arbitrarily illustrated for convenience of description, and thus arrangements and composition of the UI screens may vary.

The mobile device 100 may be a BYOD device, and processes of the mobile device 100 connecting to the image forming apparatus 200 may be largely classified into three processes, i.e., a discovery process 650, a pairing process 660, and an event registration process 670. Here, a communication between the mobile device 100 of FIG. 1 and the image forming apparatus 200 of FIG. 1 may be performed based on open standard for authorization (OAuth).

First, the mobile device 100 executes or launches a BYOD application 601 in an execution process 680 on a wallpaper UI 610. The BYOD application 601 is stored in the storage unit 150 of FIG. 3A, and may be downloaded and installed in the mobile device 100 from a generally well-known online application market, such as Samsung Apps of Samsung, Google Play of Google, or AppStore of Apple. Alternatively, the BYOD application 601 may be a basic application installed in the mobile device 100 during manufacture. The BYOD application 601 may provide various functions for the BYOD service, such as connecting to the image forming apparatus 200, displaying a GUI screen for controlling the image forming apparatus 200 of FIG. 1, and generating a command for controlling the image forming apparatus 200 of FIG. 1.

When the BYOD application 601 is executed in the execution process 680, the display unit 120 of FIG. 3A displays a UI 620 to enable the discovery process 650 to be performed. The discovery process 650 searches for image forming apparatuses, such as, for example, the image forming apparatus of FIG. 1, that may be connectable to the mobile device 100. In the embodiment shown, the UI 620 discovers three image forming apparatuses, i.e., "SCX-5737" 602, "CLX-8650", and "SCX-6401n", are discovered. Information about model names, internet protocol (IP) addresses, and locations of the discovered image forming apparatuses may also be displayed on the UI 620. The user may select the image forming apparatus "SCX-5737" 602 to be controlled (or connected) through the BYOD service from among the discovered image forming apparatuses. Meanwhile, a list of the image forming apparatuses displayed on the UI 620 may support the BYOD service, or, alternatively, the image forming apparatuses may be discovered regardless of whether the BYOD service is supported.

When the image forming apparatus "SCX-5737" 602 to be controlled (or connected) is selected through the BYOD service, the pairing process 660 is performed between the image forming apparatus "SCX-5737" 602 and the mobile device 100. The pairing process 660 is a series of operations performed by the image forming apparatus "SCX-5737" 602 to determine whether the mobile device 100 is reliable as a BYOD device and to initiate a connection session of the BYOD device.

The mobile device 100 prompts for and receives a user input regarding a PIN code through prompt 625 of a UI 630 for the pairing process 660. The PIN code may be used to authenticate the mobile device 100 to the image forming apparatus "SCX-5737" 602. In other words, in order for the mobile device 100 to be paired up with the image forming apparatus "SCX-5737" 602 as a BYOD device, the PIN code may be authenticated. After the image forming apparatus "SCX-5737" 602 authenticates the PIN code, the image forming apparatus "SCX-5737" 602 may issue authentication information, such as credential information including a token and a secret (a secret key or a secret code) and transmit the credential information to the mobile device 100. The mobile device 100 may store the credential information (the token and the secret) in the storage unit 150, and transmit the credential information while transmitting a BYOD command to the image forming apparatus "SCX-5737" 602 to notify the image forming apparatus "SCX-5737" 602 that the BYOD command is a valid command. In other words, the image forming apparatus "SCX-5737" 602 may allow access to the BYOD service only to the mobile device 100 having the credential information so as to prevent another mobile device having an unauthenticated PIN code from using the BYOD service. The pairing process using the credential information will be described in detail later with reference to FIGS. 10 through 16B.

After the image forming apparatus "SCX-5737" 602 authenticates the PIN code and the image forming apparatus "SCX-5737" 602 and the mobile device 100 are paired up, the event registration process 670 begins.

The event registration process 670 selects an event to be received from the mobile device 100 from among various events generable by the image forming apparatus "SCX-5738" 602 after a BYOD connection is established, such as a print completion event, a paper low event, a paper jam event, and a scan completion event. Referring to a UI 640 for the event registration process 670, the mobile device 100 may receive event generation notifications regarding a "print completed" event and a "scan completed" event, which are selected from among various events, from the image forming apparatus "SCX-5737" 602, and may not receive event generation notifications regarding other events that are not selected.

In FIG. 6, in order for the mobile device 100 to connect to the image forming apparatus 200 as a BYOD device, the BYOD application 601 is executed, and the discovery process 650, the pairing process 660, and the event registration process 670 are performed. The discovery process 650, the pairing process 660, and the event registration process 670 will now be described in more detail.

Figure 7:
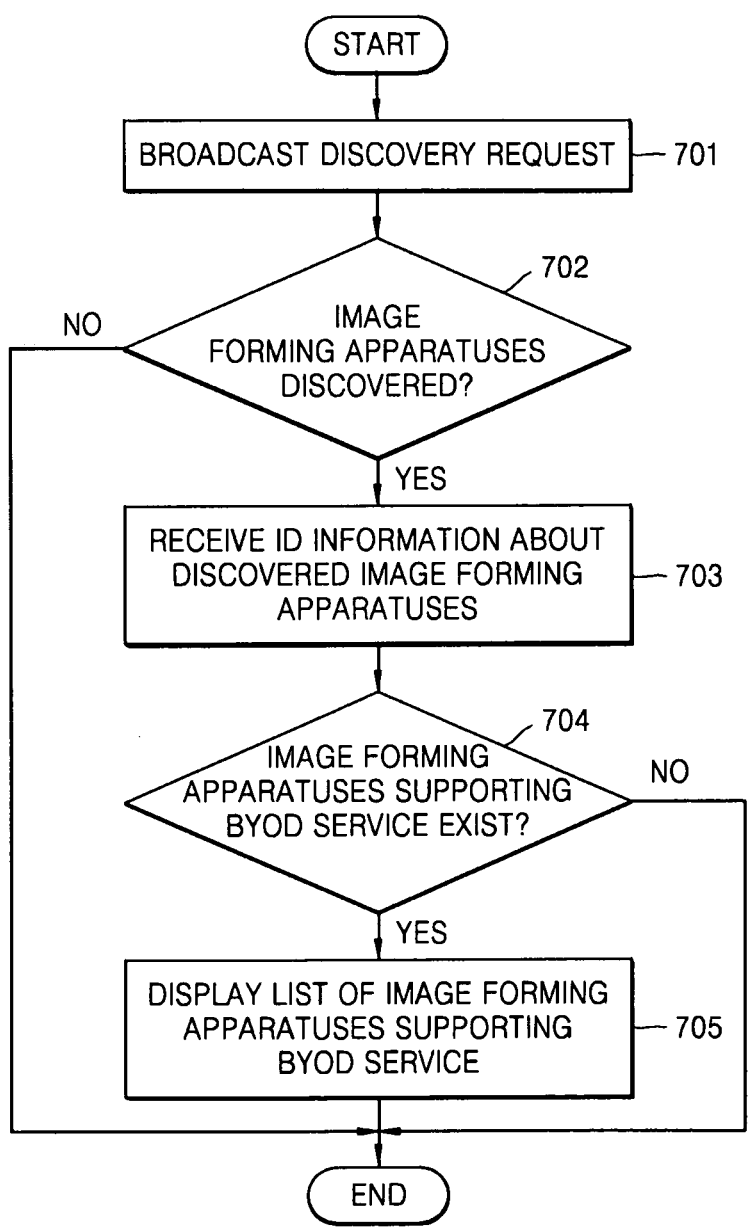
FIG. 7 is a flowchart of a discovery process of discovering an image forming apparatus to which a mobile device is to be connected to perform a BYOD service, according to an exemplary embodiment.

FIG. 7 is a flowchart of a discovery process 700 (similar to the discovery process 650 of FIG. 6) of discovering the image forming apparatus 200 of FIG. 1 to which the mobile device 100 of FIG. 1 is to be connected to perform a BYOD service, according to an exemplary embodiment. Referring to FIG. 7, the method may be performed by the components of the mobile device 100 of FIG. 3A or 3B.

In operation 701, the controller 110 of the mobile device 100 generates a discovery request for searching for image forming apparatuses connectable via the BYOD service, and the communication unit 140 (e.g., of FIGS. 3A and 3B) of the mobile device 100 broadcasts the discovery request. Here, the communication unit 140 may broadcast the discovery request through the mobile communication module 142 (e.g., of FIG. 3A) (e.g., 3G or 4G) or the wireless communication module 144 (e.g., of FIG. 3A) (e.g., Wi-Fi, WFD, Bluetooth, or NFC).

In operation 702, the controller 110 of the mobile device 100 determines whether image forming apparatuses are discovered based on a result of the broadcasting. If no image forming apparatus is discovered, the discovery process 700 is ended. If one or more image forming apparatuses have been discovered, operation 703 is performed.

In operation 703, the communication unit 140 of the mobile device 100 receives identification (ID) information about the discovered image forming apparatuses from the discovered image forming apparatuses. Here, the ID information may include information about a model name of an image forming apparatus, whether a BYOD service is supported, a connection method of the image forming apparatus, an internet protocol (IP) address of the image forming apparatus, a location of the image forming apparatus, a description of the image forming apparatus, or whether the image forming apparatus is registered as a favorite.

In operation 704, the controller 110 of the mobile device 100 determines whether there are image forming apparatuses supporting the BYOD service from among the discovered image forming apparatuses, based on the received ID information. If no image forming apparatus supports the BYOD service, the discovery process is ended. If there are image forming apparatuses supporting the BYOD service, operation 705 is performed.

In operation 705, the display unit 120 (e.g., of FIG. 3A) of the mobile device 100 displays a list of the image forming apparatuses supporting the BYOD service.

After receiving the ID information, the mobile device 100 may transmit a pairing request to the image forming apparatus 200 in order to perform a pairing process following the discovery process 700.

Figure 8:
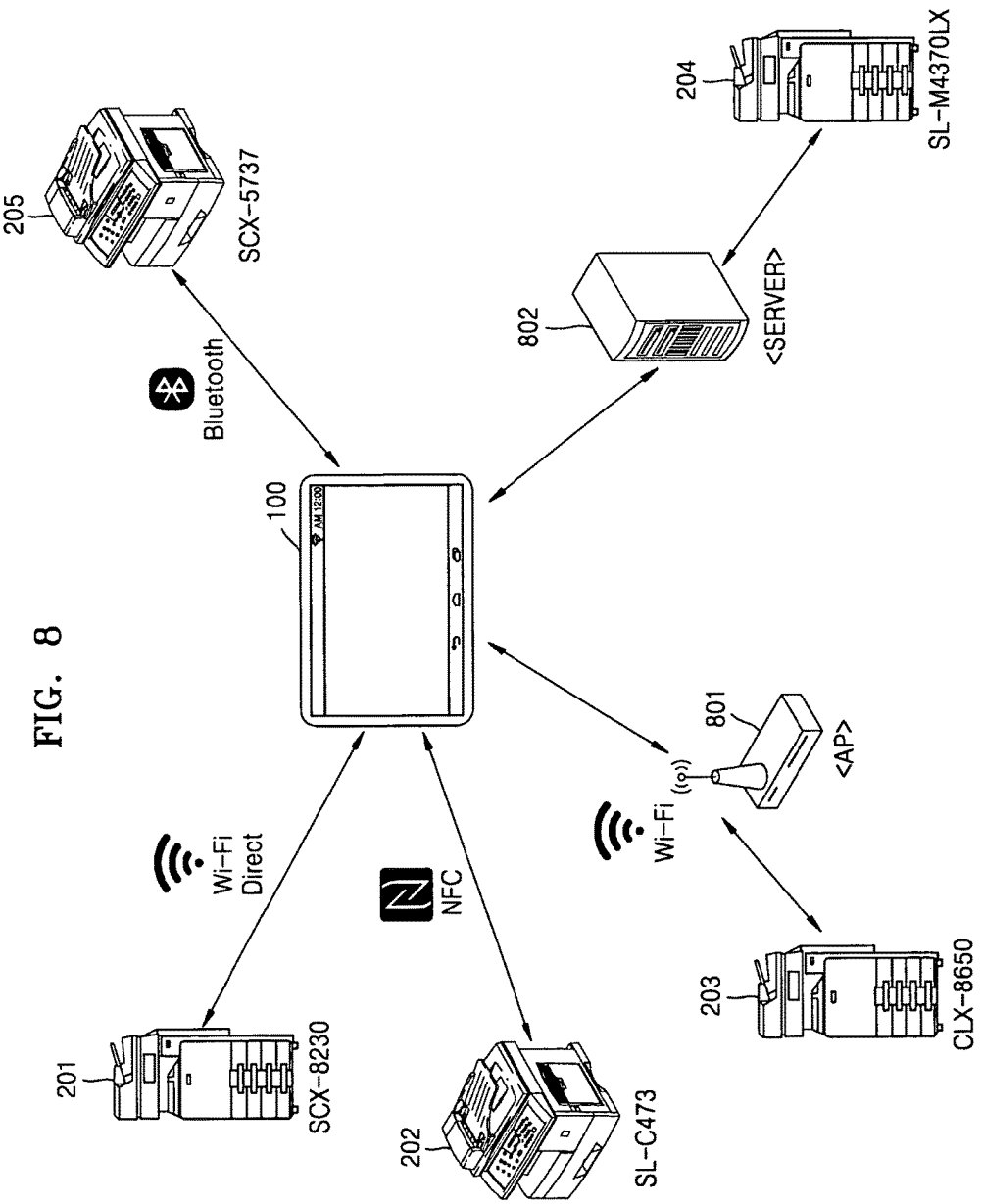
FIG. 8 is a diagram of a BYOD connection environment in which a mobile device discovers image forming apparatuses to perform a BYOD service, according to an exemplary embodiment.

FIG. 8 is a diagram of a BYOD connection environment 800 in which the mobile device 100 of FIG. 1 discovers image forming apparatuses to perform a BYOD service, according to an exemplary embodiment.

Referring to FIG. 8, the communication unit 140 (e.g., of FIG. 3A) of the mobile device 100 may discover image forming apparatuses via WFD, NFC, Wi-Fi, Bluetooth, and 3G or 4G mobile communications. In detail, the mobile device 100 may discover "SCX-8230" 201 that is an adjacent image forming apparatus connectable via WFD 804 by activating a WFD module (not shown), discover "SL-C473" 202 that is an adjacent image forming apparatus connectable via NFC 808 by activating an NFC module (not shown), and discover "SCX-5737" 205 that is an adjacent image forming apparatus connectable via Bluetooth 812 by activating a Bluetooth module (not shown).

Also, the mobile device 100 may discover "CLX-8650" 203 that is an image forming apparatus connected to an AP 801 via a network by being wirelessly connected to the AP 801 via Wi-Fi 816. When the mobile device 100 exists in the same network environment as an image forming apparatus, for example, "CLX-8650" 203, i.e., when the mobile device 100 is connected to "CLX-8650" 203 through the AP 801, the mobile device 100 may discover "CLX-8650" 203 by using a method, such as universal plug and play (UPnP), Bonjour, simple network management protocol (SNMP), or multicast domain name system (mDNS). However, even if the mobile device 100 and "CLX-8650" 203 are not in the same network environment, "CLX-8650" may be discovered in the same manner.

In addition, the mobile device 100 may discover "SL-M4370LX" 204 that is a remote image forming apparatus (e.g., in another region or in a foreign country) connected to an external server 802 (e.g., a web server, a cloud server, or a mobile carrier server) by connecting to the external server 802 through 3G or 4G mobile communications. In other words, the mobile device 100 may discover image forming apparatuses at close or far distances by using various types of communication methods.

Figure 9:
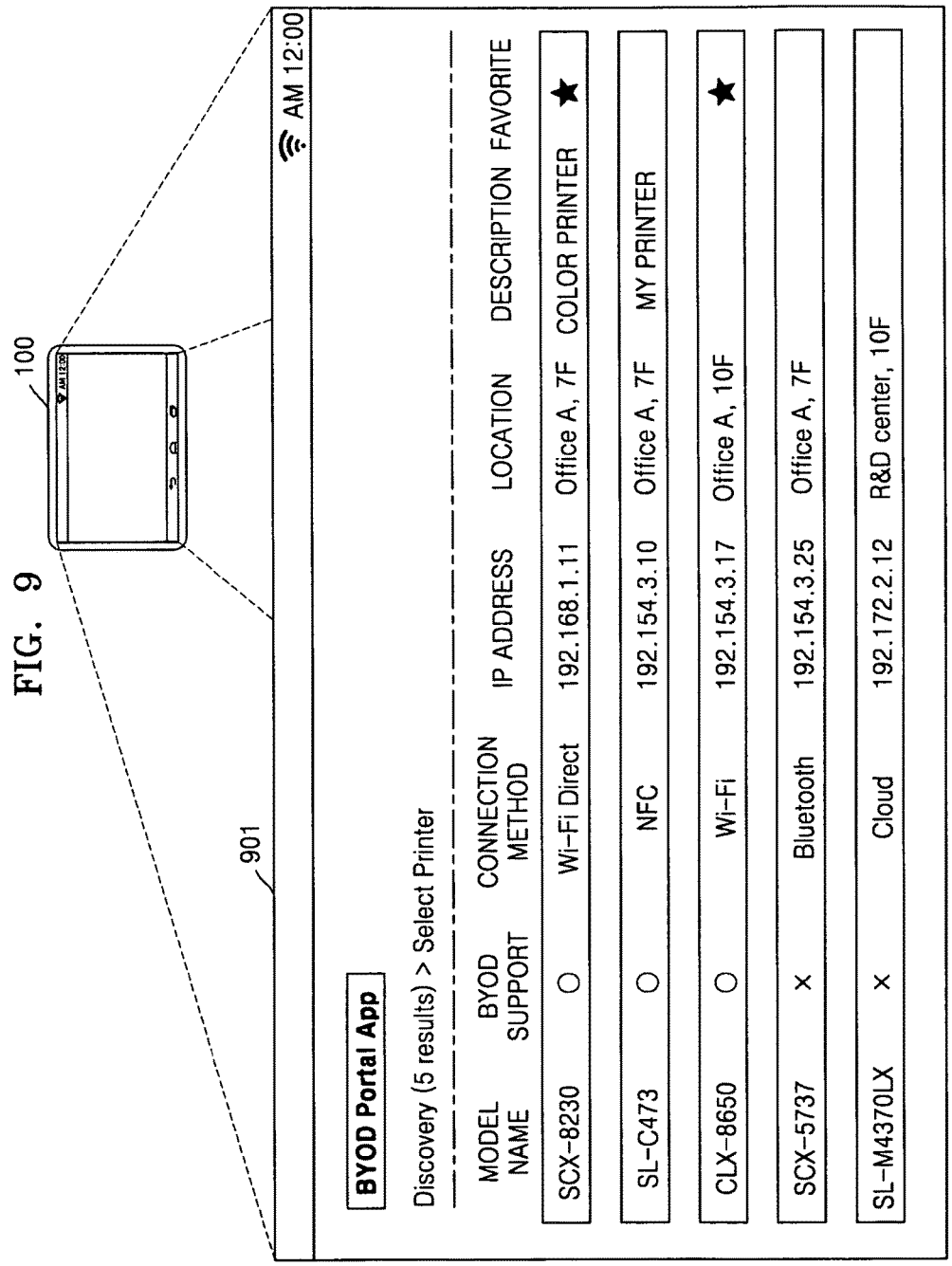
FIG. 9 illustrates a UI of a mobile device, which shows a result of discovering image forming apparatuses to perform a BYOD service, according to an exemplary embodiment.

FIG. 9 illustrates a UI 901 of the mobile device 100 of FIG. 1, which shows a result of discovering image forming apparatuses to perform a BYOD service, according to an exemplary embodiment.

In FIG. 9, it is assumed that five image forming apparatuses, i.e., "SCX-8230" 201, "SL-C473" 202, "CLX-8650" 203, "SL-M4370LX" 204, and "SCX-5737" 205 of FIG. 8, are discovered by the mobile device 100.

In the UI 901, ID information of the image forming apparatuses, which includes information about model names, whether the BYOD service is supported, connection methods, IP addresses, locations, descriptions, and whether the image forming apparatuses are registered as a favorite, may also be displayed. A user may select one of the image forming apparatuses displayed on the UI 901, for example, "SCX-8230", so as to connect the mobile device 100 to "SCX-8230", as a BYOD device.

Meanwhile in FIG. 9, the image forming apparatuses ("SCX-5737" and "SL-M4370LX") that do not support the BYOD service are also displayed on the UI 901. However, in operations 704 and 705 of FIG. 7, only the image forming apparatuses ("SCX-8230", "SL-C473", and "CLX-8650") supporting the BYOD service are displayed. An exemplary embodiment is not limited, and the result of discovering image forming apparatuses may also include a list of the image forming apparatuses ("SCX-5737" and "SL-M4370LX") that do not support the BYOD service, or may only include a list of image forming apparatuses ("SCX-8230", "SL-C473" and "CLX-8650") that support the BYOD service.

Figure 10:
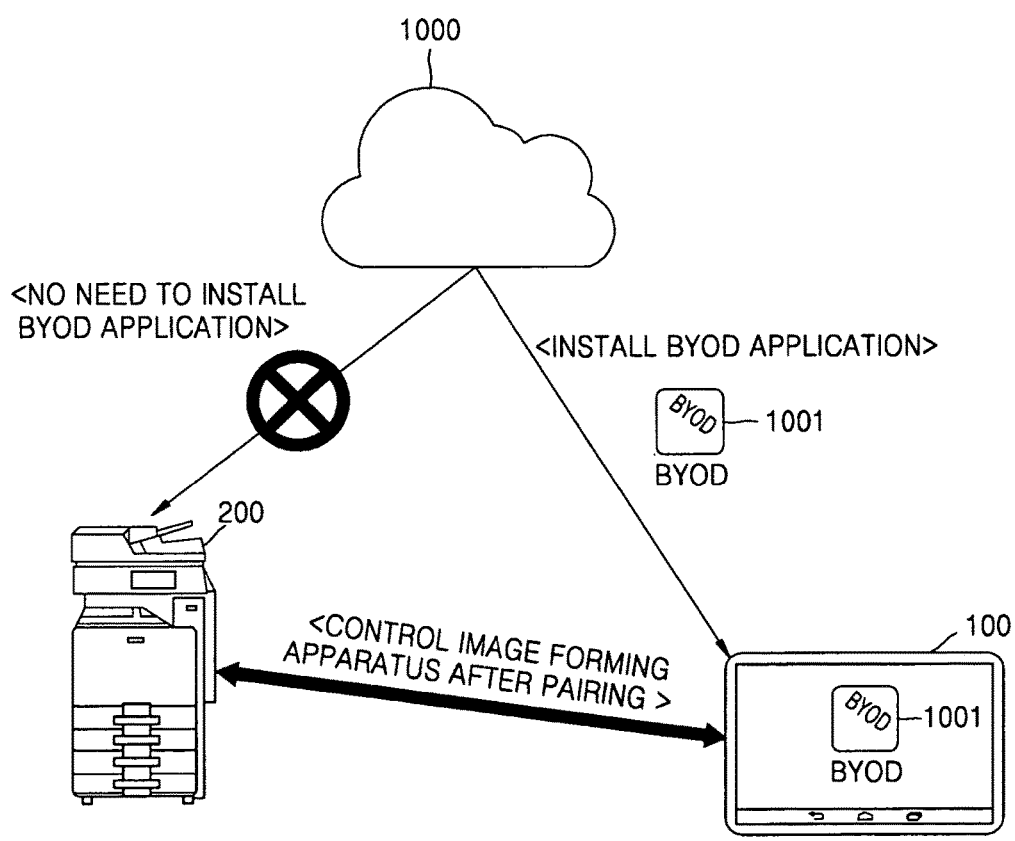
FIG. 10 is a diagram describing installation of a BYOD application, according to an exemplary embodiment.

FIG. 10 is a diagram describing installation process of a BYOD application, according to an exemplary embodiment.

In a general pairing technology, a certain application needs to be installed in both devices to be paired, and the devices are paired by the certain application. In other words, when the certain application is installed in a device, the certain application provides permission to control the device and stores application information in a system of the device such that the certain application is driven even after the device is turned on or off. In other words, when the certain application is installed, the certain application has authority to control the device.

However, according to a BYOD environment described in one or more exemplary embodiments, a BYOD application 1001 downloaded from an external server 1000 may not be installed on the image forming apparatus 200, while the BYOD application 1001 is installed in the mobile device 100 without depending from the image forming apparatus 200. Thus, pairing for a BYOD service described in one or more exemplary embodiments may be established only by using the BYOD application 1001 installed only in the mobile device 100. In other words, in the BYOD environment described in one or more exemplary embodiment, the image forming apparatus 200 may be controlled under authority of the BYOD application 1001 installed only in the mobile device 100.

In order to control the image forming apparatus 200 to be paired by using the BYOD application 1001 installed only in the mobile device 100, the BYOD application 1001 needs to be identified and an authority of the BYOD application 1001 needs to be set. Here, credential information (a token and a secret) issued by the image forming apparatus 200 may be used to identify the BYOD application 1001, and an event registering process similar to the event registration process 670 of FIG. 6 may be required to set the authority of the BYOD application 1001.

After the pairing is completed, the image forming apparatus 200 may determine that various types of commands (e.g., an API invocation) transmitted from the BYOD application 1001 installed in the mobile device 100 are reliable until the pairing is disconnected.

Figure 11:
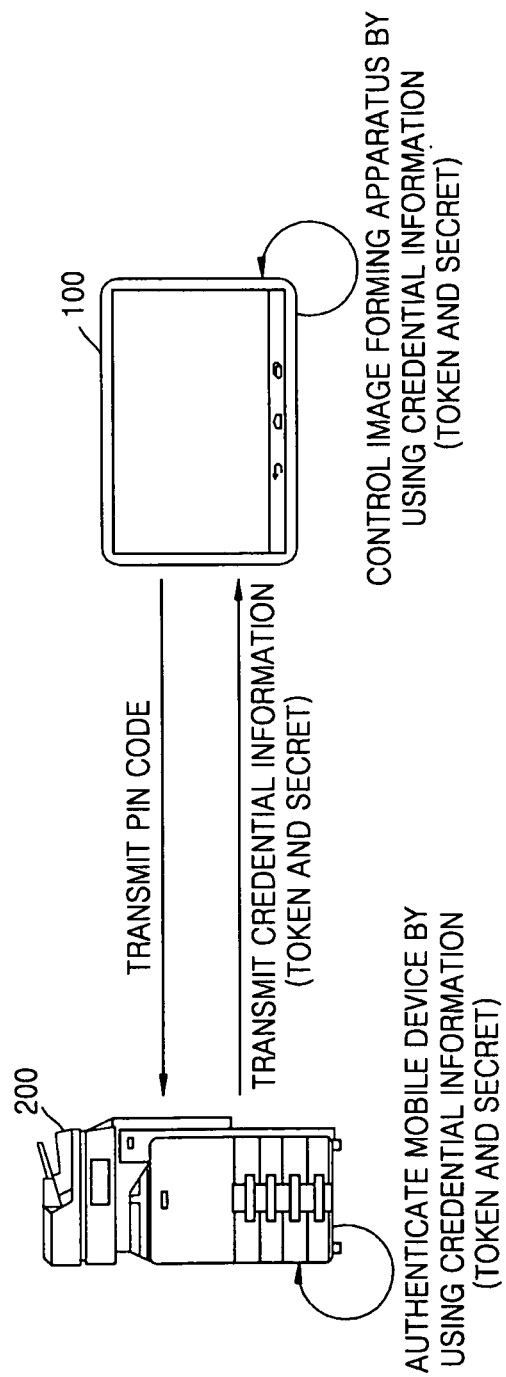
FIG. 11 is a diagram describing information exchange performed during a pairing process between a mobile device and an image forming apparatus to perform a BYOD service, according to an exemplary embodiment.

FIG. 11 is a diagram describing information exchange performed during a pairing process between the mobile device 100 and the image forming apparatus 200 to perform a BYOD service, according to an exemplary embodiment.

Referring to FIG. 11, the input unit 130 (e.g., of FIG. 3A) of the mobile device 100 receives information about a PIN code from a user as described above with reference to FIG. 6. When the mobile device 100 transmits the PIN code to the image forming apparatus 200, the image forming apparatus 200 issues and returns (or transmits) credential information (a token and a secret) to the mobile device 100 in response to the PIN code.

The credential information issued by the image forming apparatus 200 is used to identify the mobile device 100 (a BYOD application installed in the mobile device 100). The mobile device 100 may transmit a command for controlling the image forming apparatus 200 together with the credential information to the image forming apparatus 200 to notify the image forming apparatus 200 that the command is valid, and the image forming apparatus 200 may authenticate the mobile device 100 by using the credential information to determine that the command is valid.

Meanwhile, in one or more exemplary embodiments, terms such as a token and a secret are used, but it would be obvious to one of ordinary skill in the art that the terms may be changed to other terms, such as key, as long as the terms are used to identify the mobile device 100 (the BYOD application installed in the mobile device 100).

FIG. 12 is a detailed flowchart of a pairing process between the mobile device 100 and the image forming apparatus 200 to perform a BYOD service, according to an exemplary embodiment.

Referring to FIG. 12, operations 1211 through 1215 are an unsigned process 1210 in which information in an unencrypted (unsigned) state is exchanged, and operations 1221 through 1226 are a signed process 1220 in which information in an encrypted (signed) state is exchanged. The pairing process of FIG. 12 may be performed by the components of the image forming apparatus 200 and the mobile device 100 described above with reference to FIGS. 2A through 3B. The unsigned process 1210 may be performed as a BYOD application of the mobile device 100 requests the image forming apparatus 200 for an unsigned API for pairing by using a secure sockets layer (SSL)/transport layer security (TLS), and the image forming apparatus 200 allows the request.

In operation 1211, the mobile device 100 (the controller 110) performs a pairing process (similar to the pairing process 660 of FIG. 6) of the BYOD application. Here, it is assumed that the BYOD application being executed in the mobile device 100 has already performed a discovery process similar to the discovery process 650 and selected the image forming apparatus 200 as described above with reference to FIGS. 6 through 9.

In operation 1212, the image forming apparatus 200 through the communication unit 230 (of FIG. 2A) transmits authority information to be provided by the image forming apparatus 200 to the mobile device 100. Here, the authority information includes information and/or functions of the image forming apparatus 200, which allow the mobile device 100 to access, and may contain information about options related to a printing function, options related to a scanning function, options related to a facsimile function, options related to a copy function, notifications related to state change events, notifications related to error events, and notifications related to job process events.

In operation 1213, the mobile device 100 through the communication unit 140 (e.g., of FIG. 3A) transmits a pairing request to the image forming apparatus 200 via the communication unit 230.

The image forming apparatus 200 via the main controller 220 of FIG. 4 issues temporary credential information (a temporary token and a temporary secret), and the image forming apparatus 200 through the communication unit 230 returns (or transmits) the temporary credential information to the mobile device 100 via the communication unit 140, in operation 1214.

In operation 1215, the mobile device 100 receives information about a PIN code from a user via the input unit 130 (e.g., of FIG. 3A). In other words, the user inputs the PIN code through the input unit 130. The PIN code may be used to determine that the mobile device 100 is valid as a BYOD device with respect to the image forming apparatus 200. The PIN code may be issued by a manager who manages a BYOD environment or by the image forming apparatus 200, for example, via the main controller 220.

In operation 1221, the mobile device 100 through the controller 110 (e.g., of FIG. 3A) encrypts the PIN code by using the temporary credential information. Here, the mobile device 100 (the controller 110) may encrypt the PIN code with the temporary credential information according to any one of well-known encryption methods, such as a hash algorithm and a secret-key encryption algorithm.

In operation 1222, the mobile device 100 transmits the encrypted PIN code through the communication unit 140 to the communication unit 230 (e.g., of FIG. 2A) of the image forming apparatus 200.

If the main controller 220 or the communication unit 230 of the image forming apparatus 200 does not receive the encrypted PIN code within a certain period of time after the temporary credential information is returned (or transmitted) in operation 1214, the main controller 220 of the image forming apparatus 200 may cancel the pairing process and discard the temporary credential information.

In operation 1223, the image forming apparatus 200 through the main controller 220 (e.g., of FIG. 2A) decrypts the encrypted PIN code by using the temporary credential information.

In operation 1224, the image forming apparatus 200 through the main controller 220 (e.g., of FIG. 2A) authenticates the decrypted PIN code. In other words, the image forming apparatus 200 through the main controller 220 (e.g., of FIG. 2A) determines whether the decrypted PIN code is a valid PIN code assigned to the mobile device 100 such that the mobile device 100 operates as a BYOD device with respect to the image forming apparatus 200.

When it is determined that the decrypted PIN code is valid, the image forming apparatus 200 through the main controller 220 (e.g., of FIG. 2A) issues permanent credential information (a permanent token and a permanent secret), and the image forming apparatus 200 through the communication unit 230 (e.g., of FIG. 2A) transmits the permanent credential information to the mobile device 100 via the communication unit 140 (e.g., of FIG. 3A) in operation 1225. The permanent credential information may be information for assigning authority to the mobile device 100 to control functions of the image forming apparatus 200. In other words, the permanent credential information may be information for assigning authority to the mobile device 100 to control the functions of the image forming apparatus 200. The term "permanent" may be interpreted that the permanent credential information is valid until the image forming apparatus 200 or the mobile device 100 discards the permanent credential information. Meanwhile, since the decrypting of the encrypted PIN code is completed, the image forming apparatus 200 through the main controller 220 (e.g., of FIG. 2A) discards the temporary credential information. In other words, the temporary credential information is used only during an encrypting or decrypting process of a PIN code, which is a part of the pairing process.

The temporary token and the permanent token may have different values, and the temporary secret and the permanent secret may also have different values.

Figure 15:
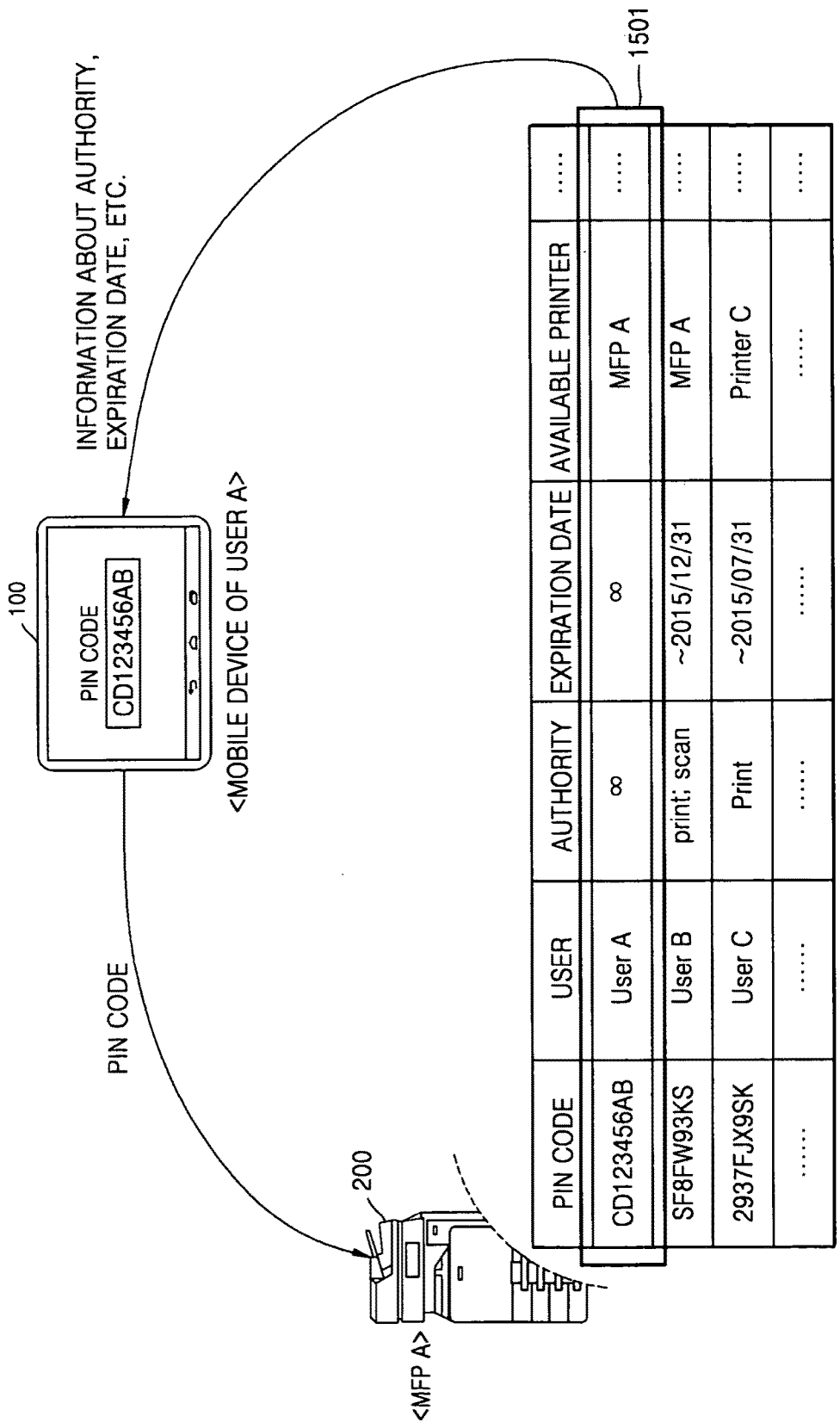
FIG. 15 is a diagram describing an image forming apparatus transmitting authority assigned to a personal identification number (PIN) code to a mobile device, after authenticating the PIN code, according to an exemplary embodiment.

Although not shown in operation 1225, the image forming apparatus 200 through the main controller 220 (e.g., of FIG. 2A) may determine authority assigned to the PIN code as shown in FIG. 15, in operation 1225. Then, the image forming apparatus 200 through the communication unit 230 (e.g., of FIG. 2A) may transmit information about the authority assigned to the PIN code (e.g., information 1501 of FIG. 15) to the mobile device 100 via the communication unit 140 (e.g., of FIG. 3A) in operation 1225.

In operation 1226, the image forming apparatus 200 through the main controller 220 and the communication unit 230 (e.g., of FIG. 2A) and the mobile device 100 via the controller 110 and the communication unit 140 (e.g., of FIG. 3A) initiate a pairing session, thereby completing the pairing process. In other words, the mobile device 100 may be a reliable as a BYOD device for controlling the image forming apparatus 200.

FIG. 13A is a diagram describing authority information provided from the image forming apparatus 200 to the mobile device 100, according to an exemplary embodiment.

Referring to FIG. 13A, the authority information may be provided from the image forming apparatus 200 to the mobile device 100 in operation 1212 of FIG. 12. The authority information includes information about functions of the image forming apparatus 200, which the mobile device 100 is allowed to access, and may include list of authorities to be provided by the image forming apparatus 200, such as "saaLocalUiAccess", "saaJobCreation", "saaJobControl", "saaServiceMode", "saaUpComplete", "saaReadCardReader", "saaManageApplicationInstallation", "saaObtainThirdPartySession", "saaObtainSafeCredentials", and "saaObtainUnsafeCredentials".

FIG. 13B is a diagram describing credential information (a token and a secret) provided from the image forming apparatus 200 (e.g., of FIG. 1) to the mobile device 100 (e.g., of FIG. 1), according to an exemplary embodiment.

A token ("jjhhmht6kngt545") and a secret ("aalljnzxy678687jasd") shown in FIG. 13B may respectively be a temporary token and a temporary secret, or a permanent token and a permanent secret.

Figure 14:
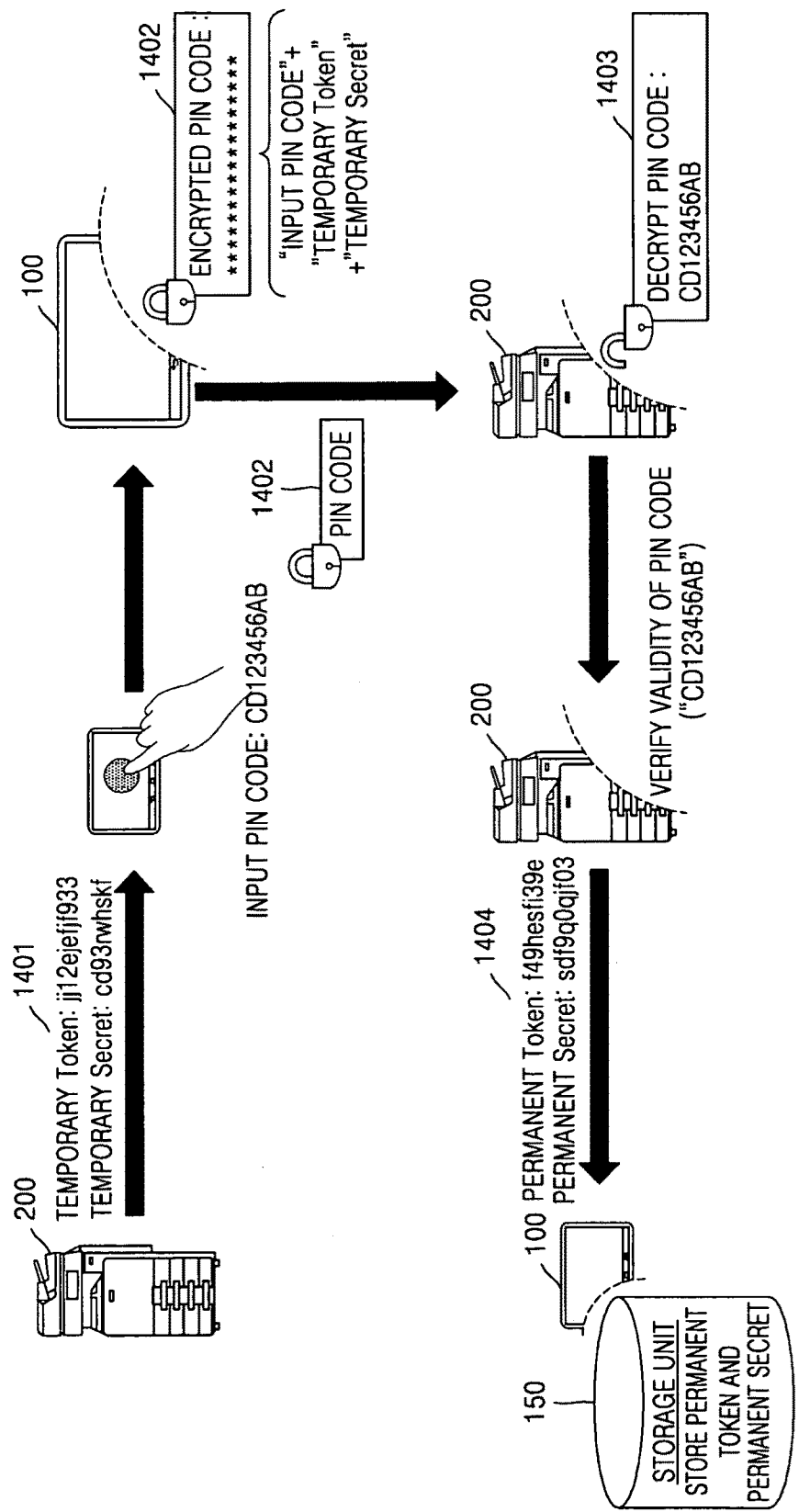
FIG. 14 is a diagram of a pairing process between a mobile device and an image forming apparatus to perform a BYOD service, according to an exemplary embodiment.

FIG. 14 is a diagram of a pairing process (similar to the pairing process 660 discussed above, e.g., with respect to FIG. 6) between a mobile device 100 (similar to the mobile device 100 of FIG. 1) and an image forming apparatus 200 (similar to the image forming apparatus 200 of FIG. 1) to perform a BYOD service, according to an exemplary embodiment.

Referring to FIG. 14, during the pairing process, the image forming apparatus 200 transmits temporary credential information 1401 (a temporary token ("jj12ejefjf933") and temporary credential information ("cd93rwhskf")) to the mobile device 100.

Upon receiving a PIN code ("CD123456AB") from a user, the mobile device 100 encrypts the PIN code by using the temporary credential information 1401 to obtain an encrypted PIN code 1402. Then, the encrypted PIN code 1402 is transmitted to the image forming apparatus 200.

The image forming apparatus 200 decrypts the encrypted PIN code 1402 by using the temporary credential information 1401 to obtain a decrypted PIN code 1403. The image forming apparatus 200 verifies validity of the decrypted PIN code 1403 to determine whether the mobile device 100 transmitted a valid PIN code to operate as a BYOD device.

When the decrypted PIN code 1403 is valid, the image forming apparatus 200 transmits permanent credential information 1404 (a permanent token ("f49hesfi39e") and a permanent secret ("sdf9q0qjf03")) to the mobile device 100. The mobile device 100 stores the permanent credential information 1404 in the storage unit 150. As such, the pairing process is completed, and the mobile device 100 may be deemed or considered reliable as a BYOD device for controlling the image forming apparatus 200. The permanent credential information 1404 stored in the storage unit 150 may continuously exist in the mobile device 100 for the BYOD service until the user erases the permanent credential information 1404. In some embodiments, the user may intentionally erase the permanent credential information 1404 with an erasion process (not shown).

After the pairing process, when the mobile device 100 is to transmit a certain command to the image forming apparatus 200, as a BYOD device, the mobile device 100 may transmit the permanent credential information 1404 together with the certain command so as to notify the image forming apparatus 200 that the certain command is a valid command transmitted by the BYOD device. In other words, when a device transmits a command without permanent credential information (a permanent token and a permanent secret) to the image forming apparatus 200, the image forming apparatus 200 may determine that the command is not valid. In other words, when a mobile device that does not include permanent credential information (a permanent token and a permanent secret) transmits a control command, the image forming apparatus 200 may ignore or discard the control command.

FIG. 15 is a diagram describing the image forming apparatus 200 transmitting authority assigned to a PIN code to the mobile device 100, after authenticating the PIN code, according to an exemplary embodiment.

FIG. 15 illustrates a management table 1500 in which usable authority and an expiration date are assigned according to types of a PIN code. It is assumed that a PIN code input through the mobile device 100 of a user A during a pairing process (similar to the pairing process 660 of FIG. 6, and the pairing processes discussed above) is "CD123456AB". When a PIN code obtained by decrypting an encrypted PIN code received from the mobile device 100 is "CD123456AB", the image forming apparatus 200 ("MFP A") may transmit the information 1501 about authority ("∞") and an expiration date ("∞") assigned to the PIN code "CD123456AB" to the mobile device 100. As such, the mobile device 100 that is a BYOD device to which the PIN code "CD123456AB" is assigned may use the image forming apparatus 200 without limitations related to the authority and the expiration date. In other words, when it is determined that a PIN code is valid, the image forming apparatus 200 may transmit authority information for accessing the image forming apparatus 200, which is assigned to the PIN code, to the mobile device 100.

However, when a PIN code is "SF8FW93KS" and a user of the mobile device 100 is not the user A, the mobile device 100 may not operate as a BYOD device. Also, even if the user of the mobile device 100 is a user B, when the PIN code input through the mobile device 100 is "SF8FW93KS", the mobile device 100 is able to use only print and scanning functions of the image forming apparatus 200 only until Dec. 31, 2015.

The management table 1500 may be a table in which authority information, such as separate (different) authorities and expiration dates, is assigned according to values of PIN codes, as a BYOD device setting information assigned by a manager of a BYOD environment or an image forming apparatus. Accordingly, the image forming apparatus 200 or a manager of a BYOD environment may set the management table 1500 to adjust authority of a BYOD device.

Figure 16A:
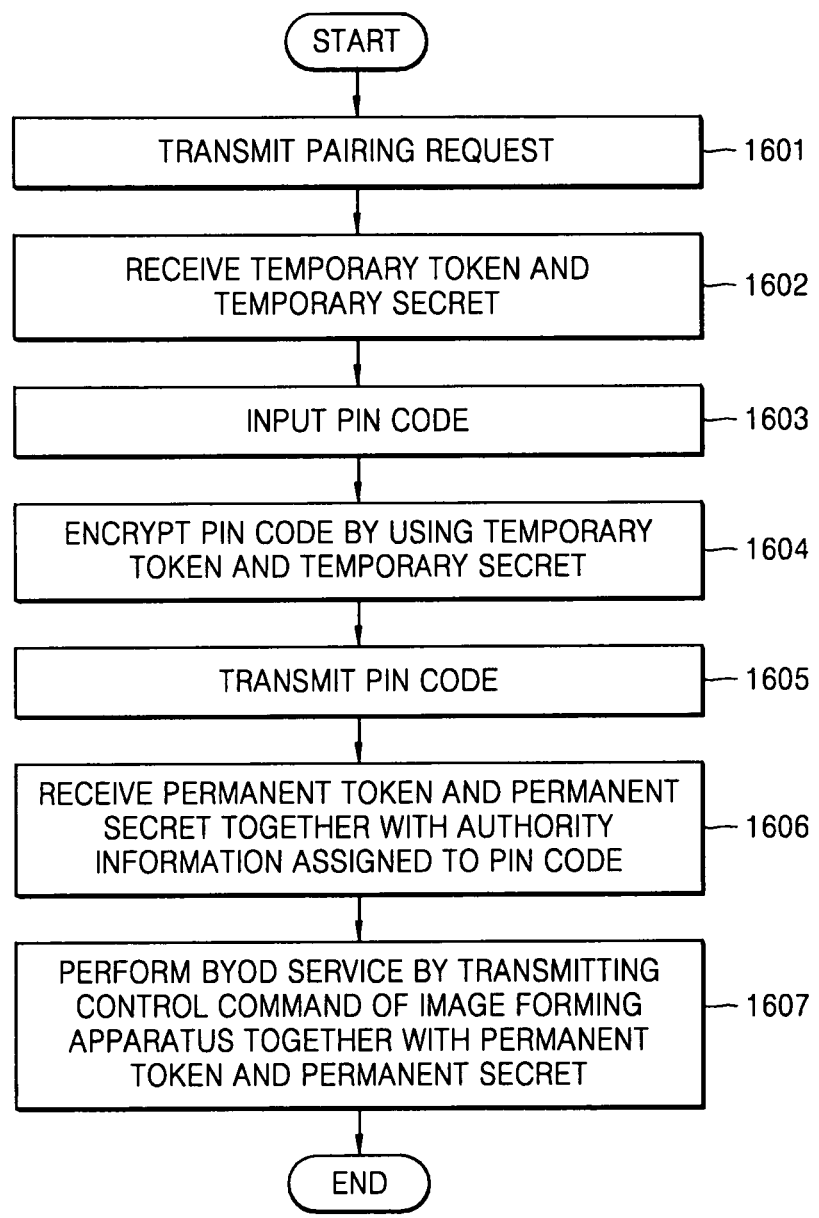
FIG. 16A is a flowchart of a pairing process performed by a mobile device, according to an exemplary embodiment.

FIG. 16A is a flowchart of a pairing process (similar to the pairing process 660 of FIG. 6, and the pairing processes discussed above) performed by the mobile device 100, according to an exemplary embodiment.

In operation 1601, the communication unit 140 of the mobile device 100 (e.g., of FIG. 1) transmits a pairing request to the communication unit 230 (e.g., of FIG. 2A) of the image forming apparatus 200 (e.g., of FIG. 1).

In operation 1602, the communication unit 140 of the mobile device 100 receives temporary credential information (a temporary token and a temporary secret) issued by the main controller 220 (e.g., of FIG. 2A) of the image forming apparatus 200.

In operation 1603, the input unit 130 (e.g., of FIG. 3A) of the mobile device 100 receives information about a PIN code from a user. In other words, the user inputs the PIN code through the input unit 130 of the mobile device 100.

In operation 1604, the controller 110 of the mobile device 100 encrypts the PIN code by using the temporary credential information.

In operation 1605, the communication unit 140 of the mobile device 100 transmits the PIN code to the communication unit 230 (e.g., of FIG. 2A) of the image forming apparatus 200.

After the main controller 220 (e.g., of FIG. 2A) of the image forming apparatus 200 authenticates the PIN code, the communication unit 140 (e.g., of FIG. 3A) of the mobile device 100 receives permanent credential information (a permanent token and a permanent secret) together with authority information assigned to the PIN code (the information 1501 assigned by the management table 1500 of FIG. 15), in operation 1606.

In operation 1607, the controller 110 of the mobile device 100 generates a control command of the image forming apparatus 200, and the communication unit 140 of the mobile device 100 transmits the control command together with the permanent credential information to the communication unit 230 of the image forming apparatus 200. As such, the controller 110 (e.g., of FIG. 3A) of the mobile device 100 may perform a BYOD service with respect to the image forming apparatus 200.

Figure 16B:
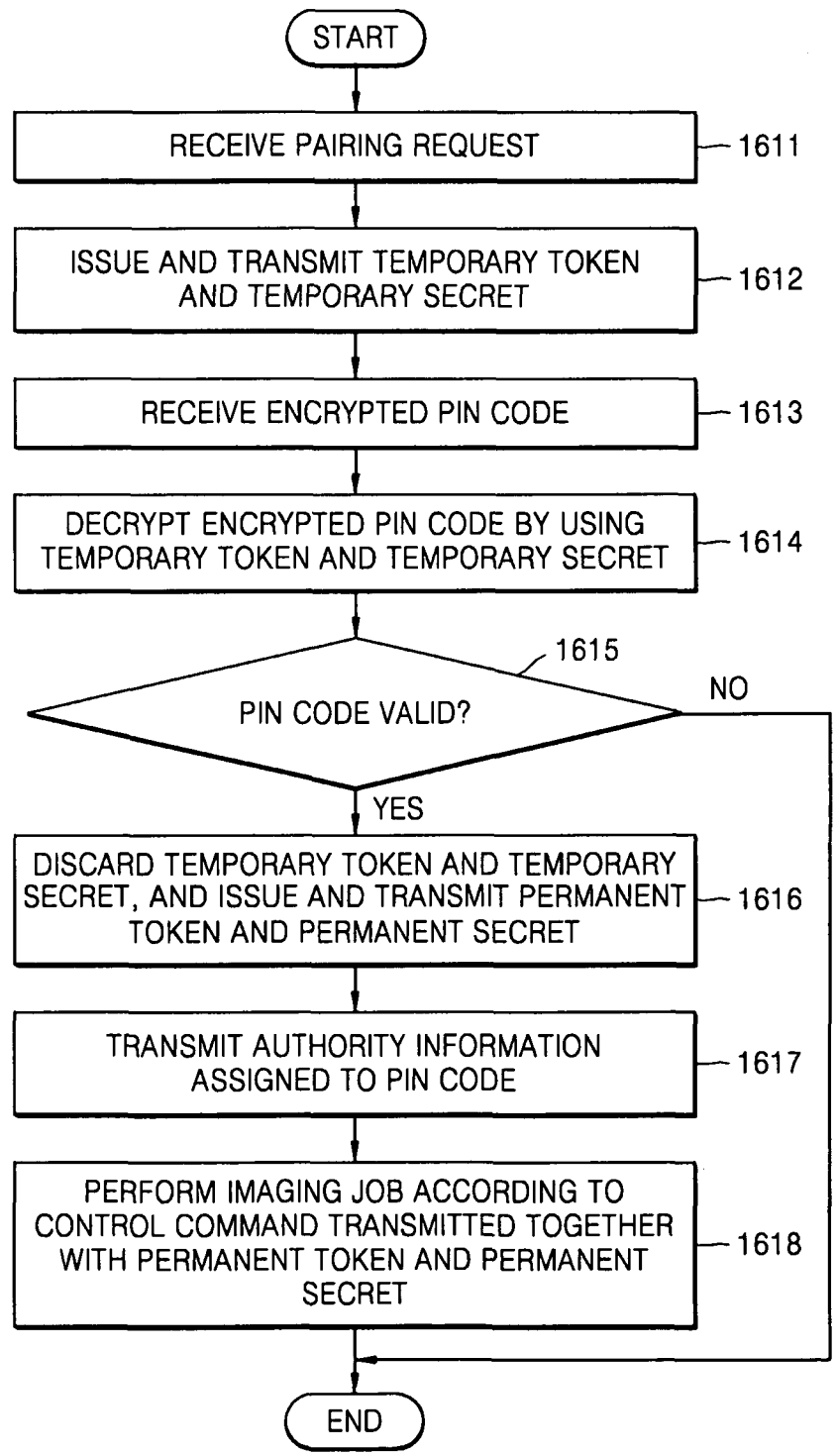
FIG. 16B is a flowchart of a pairing process performed by an image forming apparatus, according to an exemplary embodiment.

FIG. 16B is a flowchart of a pairing process performed by the image forming apparatus 200, according to an exemplary embodiment.

In operation 1611, the communication unit 230 (e.g., of FIG. 2A) of the image forming apparatus 200 receives a pairing request from the communication unit 140 of the mobile device 100.

In operation 1612, the main controller 220 (e.g., of FIG. 2A) of the image forming apparatus 200 issues temporary credential information (a temporary token and a temporary secret), and the communication unit 230 (e.g., of FIG. 2A) of the image forming apparatus 200 transmits the temporary credential information to the communication unit 140 of the mobile device 100.

In operation 1613, the communication unit 230 (e.g., of FIG. 2A) of the image forming apparatus 200 receives a PIN code encrypted by the controller 110 (e.g., of FIG. 3A) of the mobile device 100, from the communication unit 140 (e.g., of FIG. 3A) of the mobile device 100.

In operation 1614, the main controller 220 (e.g., of FIG. 2A) of the image forming apparatus 200 decrypts the encrypted PIN code by using the temporary credential information.

In operation 1615, the main controller 220 (e.g., of FIG. 2A) of the image forming apparatus 200 determines whether the decrypted PIN code is valid. When it is determined that the decrypted PIN code is not valid, the pairing process is ended. When it is determined that the decrypted PIN code is valid, operation 1616 is performed.

In operation 1616, the main controller 220 (e.g., of FIG. 2A) of the image forming apparatus 200 discards the temporary credential information and issues permanent credential information (a permanent token and a permanent secret) for the mobile device 100. The communication unit 230 (e.g., of FIG. 2A) of the image forming apparatus 200 transmits the permanent credential information to the communication unit 140 of the mobile device 100.

In operation 1617, the communication unit 230 of the image forming apparatus 200 transmits authority information assigned to the PIN code (the information 1501 assigned by the management table 1500 of FIG. 15) to the communication unit 140 of the mobile device 100.

In operation 1618, when the communication unit 230 of the image forming apparatus 200 receives a control command and the permanent credential information from the communication unit 140 (e.g., of FIG. 3A) of the mobile device 100, the main controller 220 (e.g., of FIG. 2A) of the image forming apparatus 200 controls the image forming apparatus 200 to perform an imaging job according to the control command. As such, the main controller 220 (e.g., of FIG. 2A) of the image forming apparatus 200 may perform a BYOD service by the mobile device 100.

Various embodiments of authentication methods required when pairing is performed will now be described.

First, an authentication method may use an ID card. In detail, during authentication in a pairing process, a guide screen describing an authentication method may be displayed on a mobile device. For example, the guide screen may display content to perform authentication when an ID card comes in contact with a card reader included in an image forming apparatus (e.g., the image forming apparatus 200 of FIG. 14). When a user places his/her ID card in contact with the card reader by moving toward the image forming apparatus according to the guide screen, the image forming apparatus reads authentication information (e.g., a user ID and a password) pre-stored in the ID card, and transmits a token and credential information for pairing to the mobile device when it is determined that the authentication information is valid. The mobile device pairs up with the image forming apparatus using the received token and the received credential information.

Second, an authentication method may use fingerprint recognition. A fingerprint recognizer used for authentication may be connected to an image forming apparatus (e.g., the image forming apparatus 200 of FIG. 14) via a universal serial bus (USB) or a mobile device may include a fingerprint recognizer. When the fingerprint recognizer is connected to the image forming apparatus, authentication is performed in a manner similar to the authentication method using the ID card. In other words, when a guide screen guiding a user to place a finger on the fingerprint recognizer connected to the image forming apparatus is displayed, the user may place the finger on the fingerprint recognizer according to the guide screen, the image forming apparatus may transmit information required for pairing to the mobile device when it is determined that a recognized fingerprint is valid, and the mobile terminal may pair up with the image forming apparatus using the received information. Meanwhile, when the mobile device includes the fingerprint recognizer, an authentication method may be performed as follows. When the user undergoes fingerprint recognition using the mobile device, the mobile device converts the recognized fingerprint to a form of digital information and transmits the digital information to the image forming apparatus. The image forming apparatus may pre-store digital information about a fingerprint of an allowed user. Accordingly, the image forming apparatus compares the received digital information and the pre-stored digital information, and when they match, transmits a token and credential information for pairing to the mobile device. The mobile device pairs up with the image forming apparatus using the received token and the received credential information.

Third, an authentication method may use voice recognition. A voice of a user is recognized using a microphone (not shown) included in a mobile device (e.g., the mobile device 100), and the mobile device converts the recognized voice to a form of digital information and transmits the digital information to an image forming apparatus. The image forming apparatus pre-stores digital information about a voice of an allowed user. Accordingly, the image forming apparatus compares the received digital information and the pre-stored digital information, and when they match, transmits a token and credential information for pairing to the mobile device. The mobile device pairs up with the image forming apparatus using the received token and the received credential information. Meanwhile, voices of some or all users may be pre-recorded, and an authority matching voice of each user may be assigned.

Fourth, an authentication method may use NFC for communication. A user does not directly input a PIN. When a mobile device is located within a certain distance from an image forming apparatus, the mobile device automatically transmits a PIN to the image forming apparatus through an NFC interface. For example, an NFC module included in the mobile device may read device information stored in an NFC tag attached on the image forming apparatus by detecting the NFC tag when the mobile device is within a certain distance from the NFC tag, and analyze the device information to transmit a pre-stored PIN to the image forming apparatus. The user may pre-store a PIN to be transmitted during NFC tagging in the mobile device. Also, when an application for authentication is executed in the mobile device, the pre-stored PIN may be converted and stored to be transmitted via NFC. When the PIN received from the mobile device matches a pre-stored PIN, the image forming apparatus transmits a token and credential information for pairing to the mobile device. The mobile device pairs up with the image forming apparatus using the received token and the received credential information.

Figure 17:
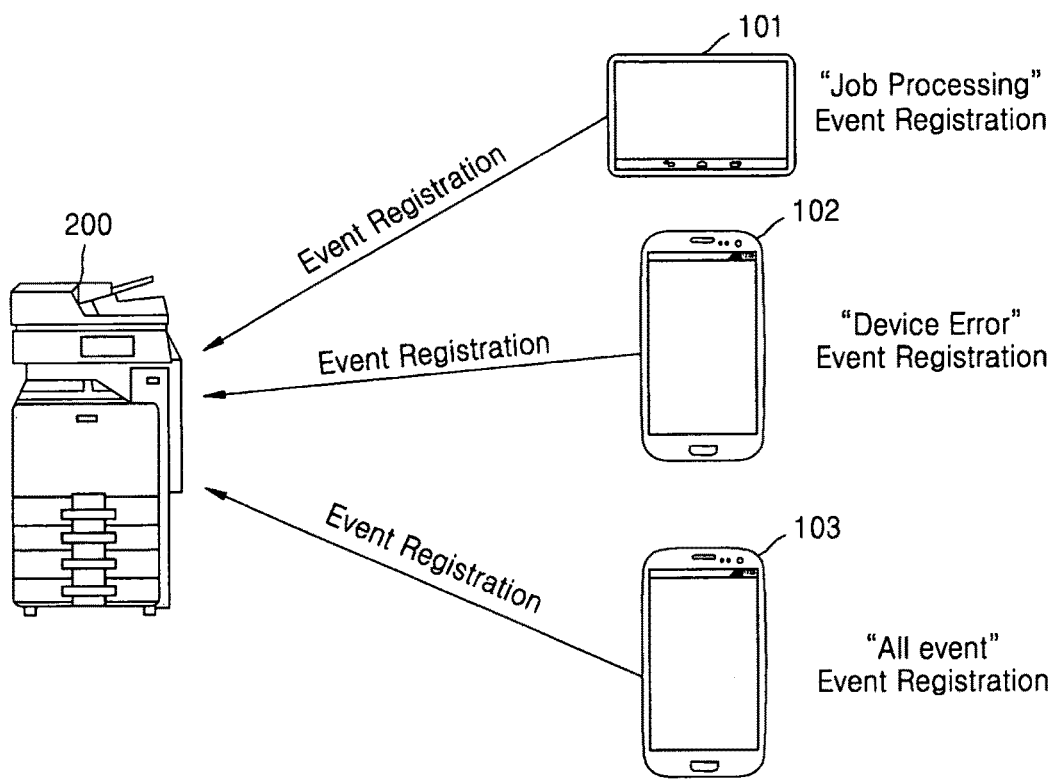
FIG. 17 is a diagram describing an event registering process between mobile devices and an image forming apparatus to perform a BYOD service, according to an exemplary embodiment.

FIG. 17 is a diagram describing an event registration process (similar to the event registration process 670 of FIG. 6, and the event registering processes discussed above) between mobile devices 101 through 103 (similar to the mobile device 100 of FIG. 1) and an image forming apparatus 200 (similar to the image forming apparatus 200 of FIG. 1) to perform a BYOD service, according to an exemplary embodiment.

Referring to FIG. 17, various types of the mobile devices 101 through 103 may each be connected to (paired up with) the image forming apparatus 200, as a BYOD device. Here, the mobile devices 101 through 103 may each correspond to the mobile device 101 or 105 described above.

When the mobile device 101 is paired up with the image forming apparatus 200, as a BYOD device, the mobile device 101 may register a desired event type so as to receive only a notification about generation of a certain event ("job processing").

The mobile device 101 may transmit a registration request of a list of events the mobile device 101 is to receive, from among events generatable in the image forming apparatus 200.

When an event about an imaging job process, such as print completion or scan completion, is generated in the image forming apparatus 200, the communication unit 140 of the mobile device 101 may receive a notification about a registered event from the communication unit 230 of the image forming apparatus 200. In other words, when an event included in the list of events is generated in the image forming apparatus 200, the image forming apparatus 200 may transmit a notification about the event to the mobile device 101. If the mobile device 101 did not register an event type and an event about an error is generated in the image forming apparatus 200, a notification about the event about the error may not be provided to the mobile device 101.

Similarly, when the mobile device 102 registers an event about an error ("device error"), the communication unit 140 (e.g., of FIG. 3A) of the mobile device 101 may receive only an event about an error (e.g., a paper low event, a paper jam event, or a toner low event) generated in the image forming apparatus 200 from the communication unit 230 (e.g., of FIG. 2A) of the image forming apparatus 200.

Meanwhile, the mobile device 103 may register some or all events ("all event") generatable in the image forming apparatus 200, and thus a notification about an event may be provided through the display unit 120 of the mobile device 103 like the manipulator 210 (e.g., of FIG. 2A) of the image forming apparatus 200.

Figure 18:
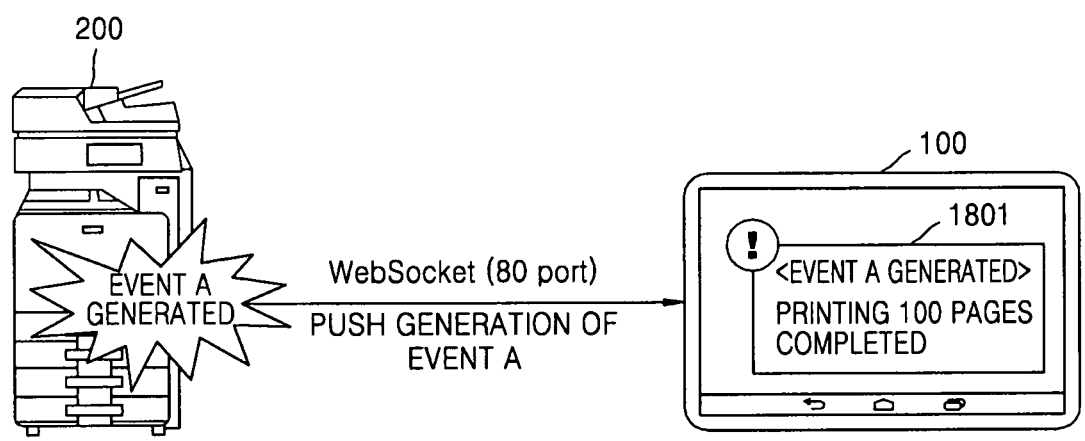
FIG. 18 is a diagram describing a method of transmitting an event generated by an image forming apparatus to a mobile device, according to an exemplary embodiment.

FIG. 18 is a diagram describing a method of transmitting an event generated by the image forming apparatus 200 to the mobile device 100, according to an exemplary embodiment.

Referring to FIG. 18, when an event, for example, an event A, registered by the mobile device 100 is generated in the image forming apparatus 200, the communication unit 230 of the image forming apparatus 200 may use an event transmission method of pushing generation of the event A to the communication unit 140 of the mobile device 100. In other words, whenever the event A registered by the mobile device 100 is generated in the image forming apparatus 200, the image forming apparatus 200 notifies the mobile device 100 about event generation by using a data push method. According to the data push method, an event notification message 1801 ("printing 100 pages completed!") is immediately provided through the display unit 120 of the mobile device 100, and thus a user using the image forming apparatus 200 through the mobile device 100 may immediately determine whether an event directed by him/herself is processed or whether an error is generated in the image forming apparatus 200. Moreover, a notification about the generation of the event A may be pushed to other mobile devices that registered the event A, as well as to the mobile device 100.

The communication unit 230 of the image forming apparatus 200 may use a WebSocket protocol as a protocol for transmitting event information. The WebSocket protocol is a protocol capable of real-time bidirectional communication, and may be realized in any one of various protocols, such as transfer control protocol/internet protocol (TCP/IP), HTTP, and user datagram protocol (UDP). Here, in order to communicate via the WebSocket protocol, a socket port needs to be set between the communication unit 230 (e.g., of FIG. 2A) of the image forming apparatus 200 and the communication unit 140 (e.g., of FIG. 3A) of the mobile device 100. In the current embodiment, an open 80 port may be used as the socket port for the WebSocket protocol, but the socket port is not limited thereto.

In FIG. 18, an event is transferred between the communication unit 230 of the image forming apparatus 200 and the communication unit 140 of the mobile device 100 via the data push method, but a method of transferring an event is not limited thereto, and any one of various methods, such as a data polling method and a data long polling method, may be used.

Figure 19A:
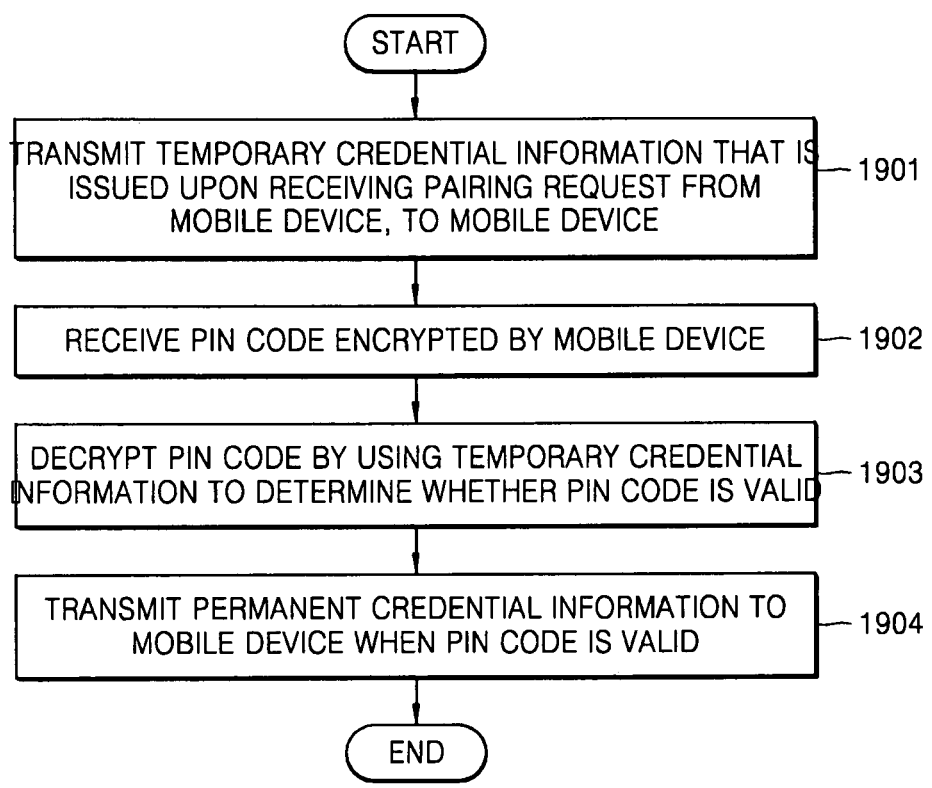
FIG. 19A is a flowchart of a method of establishing, by a mobile device, a connection with an image forming apparatus, according to an exemplary embodiment.

FIG. 19A is a flowchart of a method of establishing, by the mobile device 100 (e.g., of FIG. 1), a connection with the image forming apparatus 200 (e.g., of FIG. 1), according to an exemplary embodiment. Referring to FIG. 19A, the method includes operations that are performed by the image forming apparatus 200 in time-series, and thus details about the image forming apparatus 200 described above may be applied to the method of FIG. 19A even if not explicitly mentioned.

In operation 1901, the communication unit 230 (e.g., of FIG. 2A) of the image forming apparatus 200 transmits temporary credential information that is issued upon receiving a pairing request from the mobile device 100, to the mobile device 100.

In operation 1902, the communication unit 230 (e.g., of FIG. 2A) of the image forming apparatus 200 receives a PIN code encrypted by the mobile device 100.

In operation 1903, the main controller 220 (e.g., of FIG. 2A) of the image forming apparatus 200 decrypts the encrypted PIN code by using the temporary credential information to determine whether the decrypted PIN code is valid.

When it is determined that the PIN code is valid by the main controller 220 (e.g., of FIG. 2A), the communication unit 230 (e.g., of FIG. 2A) of the image forming apparatus 200 returns (or transmits) permanent credential information to the mobile device 100 in operation 1904.

Figure 19B:
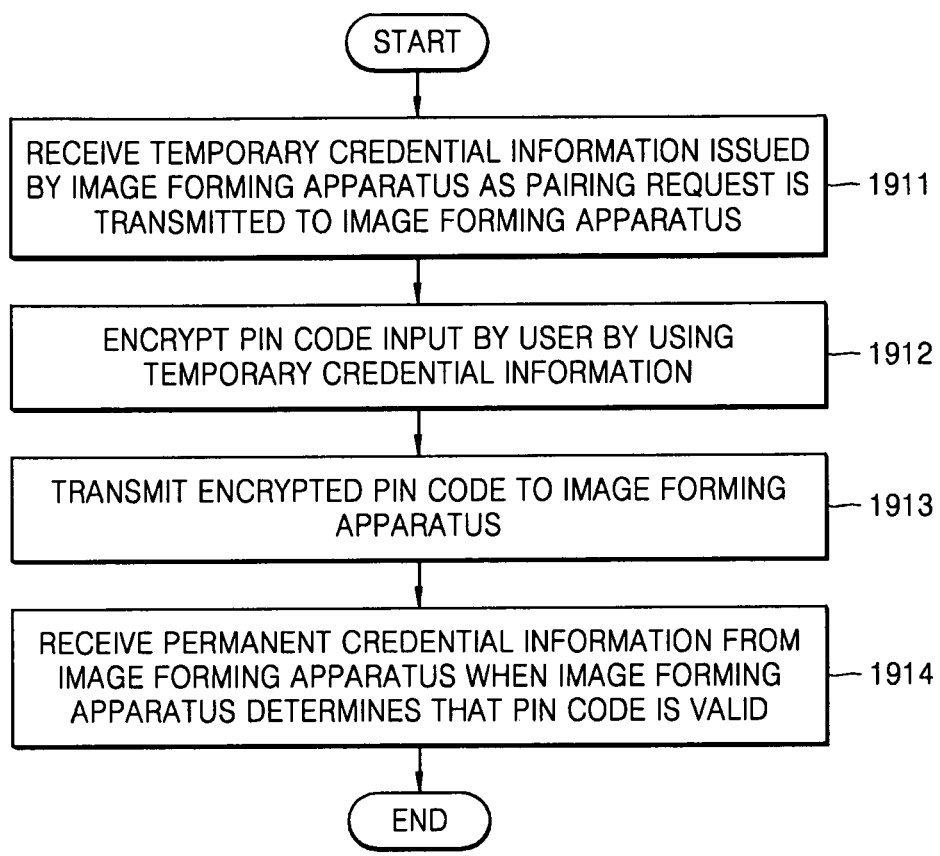
FIG. 19B is a flowchart of a method of establishing, by an image forming apparatus, a connection with a mobile device, according to an exemplary embodiment.

FIG. 19B is a flowchart of a method of establishing, by the image forming apparatus 200 (e.g., of FIG. 1), a connection with the mobile device 100 (e.g., of FIG. 1), according to an exemplary embodiment. Referring to FIG. 19B, the method includes operations that are performed by the mobile device 100 in time-series, and thus details about the mobile device 100 described above may be applied to the method of FIG. 19B even if not explicitly mentioned.

In operation 1911, the communication unit 140 of the mobile device 100 receives temporary credential information issued by the image forming apparatus 200 as the communication unit 140 transmits a pairing request to the image forming apparatus 200.

In operation 1912, the controller 110 (e.g., of FIG. 3A) of the mobile device 100 encrypts a PIN code input by a user, by using the temporary credential information.

In operation 1913, the communication unit 140 (e.g., of FIG. 3A) of the mobile device 100 transmits the encrypted PIN code to the image forming apparatus 200.

When it is determined that the PIN code is valid by the image forming apparatus 200, the communication unit 140 (e.g., of FIG. 3A) of the mobile device 100 receives permanent credential information from the image forming apparatus 200 in operation 1914.

Hereinafter, a method of setting, by a mobile device, a workform that defines an order of performing jobs by using functions of an image forming apparatus and the mobile device via a BYOD service, and performing a job by using the set workform will now be described.

Figure 20:
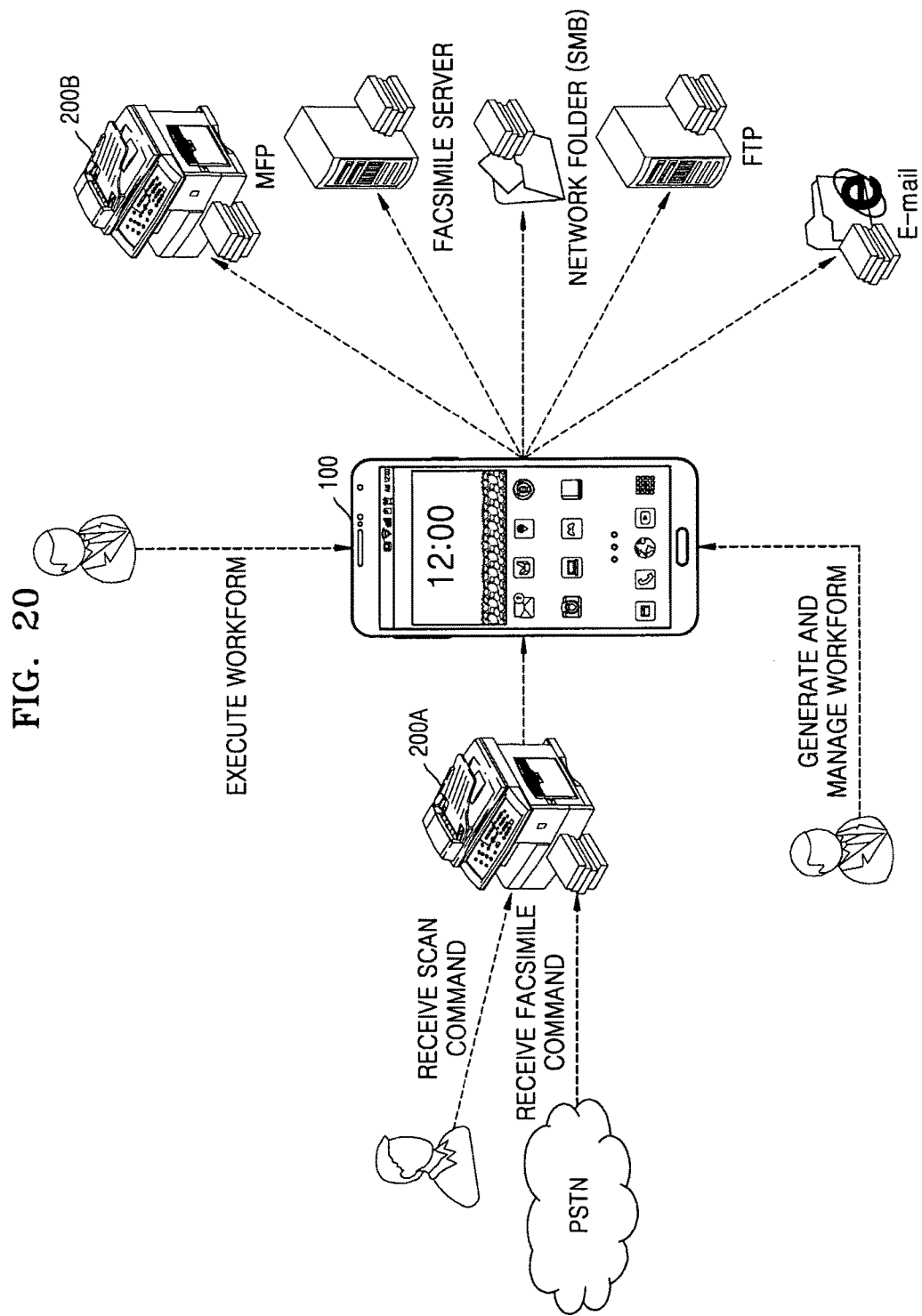
FIG. 20 is a diagram of an environment of a mobile device for generating, managing, and executing a workform by using a BYOD service, according to an exemplary embodiment.

FIG. 20 is a diagram of an environment of a mobile device 100 (similar to the mobile device 100 of FIG. 1) for generating, managing, and executing a workform by using a BYOD service, according to an exemplary embodiment.

Referring to FIG. 20, a user may generate and manage a workform by using the mobile device 100, in a BYOD environment according to an exemplary embodiment. Here, the workform defines an order of performing jobs by using functions of image forming apparatus 200A and image forming apparatus 200B (similar to the image forming apparatus 200 of FIG. 1) and the mobile device 100 (similar to the mobile device 100 of FIG. 1).

Here, the mobile device 100 is a portable electronic device that supports a wireless communication, such as a smart phone or a tablet PC, and the image forming apparatus 200A and the image forming apparatus 200B are each an apparatus that supports an image forming job, such as scanning, printing, and faxing, such as a scanner, a printer, a facsimile, or a multifunction printer (MFP).

The user may execute an application that is installed in the mobile device 100 and supports a workform using a BYOD service, and generate a workform by combining jobs using the functions of the image forming apparatus 200A, the image forming apparatus 200B and the mobile device 100 in a desired order. A method of generating a workform will be described in detail later.

A workform using a BYOD service, according to an exemplary embodiment, is generated and managed by the mobile device 100, and when the workform is executed, the mobile device 100 manages performing of jobs according to an order defined in the workform. In other words, according to the executed workform, the mobile device 100 transmits a command to perform a job to the image forming apparatus 200A and the image forming apparatus 200B when it is a turn, according to a defined order, for a job to be performed by using the functions of the image forming apparatus 200A and the image forming apparatus 200B, and performs a job by using an application installed in the mobile device 100 or a hardware component of the mobile device 100 when it is the turn, according to the defined order, for a job to be performed by using the functions of the mobile device 100.

As shown in FIG. 20, the workform may be generated by variously combining the functions of the image forming apparatus 200A and the image forming apparatus 200B and the mobile device 100. For example, the workform may be set such that an image obtained as the image forming apparatus 200A performs scanning is transmitted to the mobile device 100, and the mobile device 100 transmits the received image via an email, to a network server, such as a file transfer protocol (FTP) server or a server message block (SMB) server, or to the image forming apparatus 200B.

Alternatively, the workform may be initiated upon receiving a fax document of the image forming apparatus 200A, and the mobile device 100 may provide an editing function for a received document or image in the middle stage. Alternatively, the workform may have any one of various forms, and various exemplary embodiments of the workform will be described in detail later.

Three elements that form a workform using a BYOD service, according to an exemplary embodiment, are input, transformation, and transmission. In other words, a job is performed via a workform as a job target is "input", the job target is "transformed" according to a pre-set method, and the transformed target is "transmitted" to a transmission destination.

Accordingly, processes of setting a workform using a BYOD service, according to an exemplary embodiment, largely include three operations. First, an input source is set, a transforming method is set, and then a transmission destination is set.

Various exemplary embodiments of setting and executing a workform using a BYOD service will now be described with reference to FIGS. 21 through 32.

Figure 21:
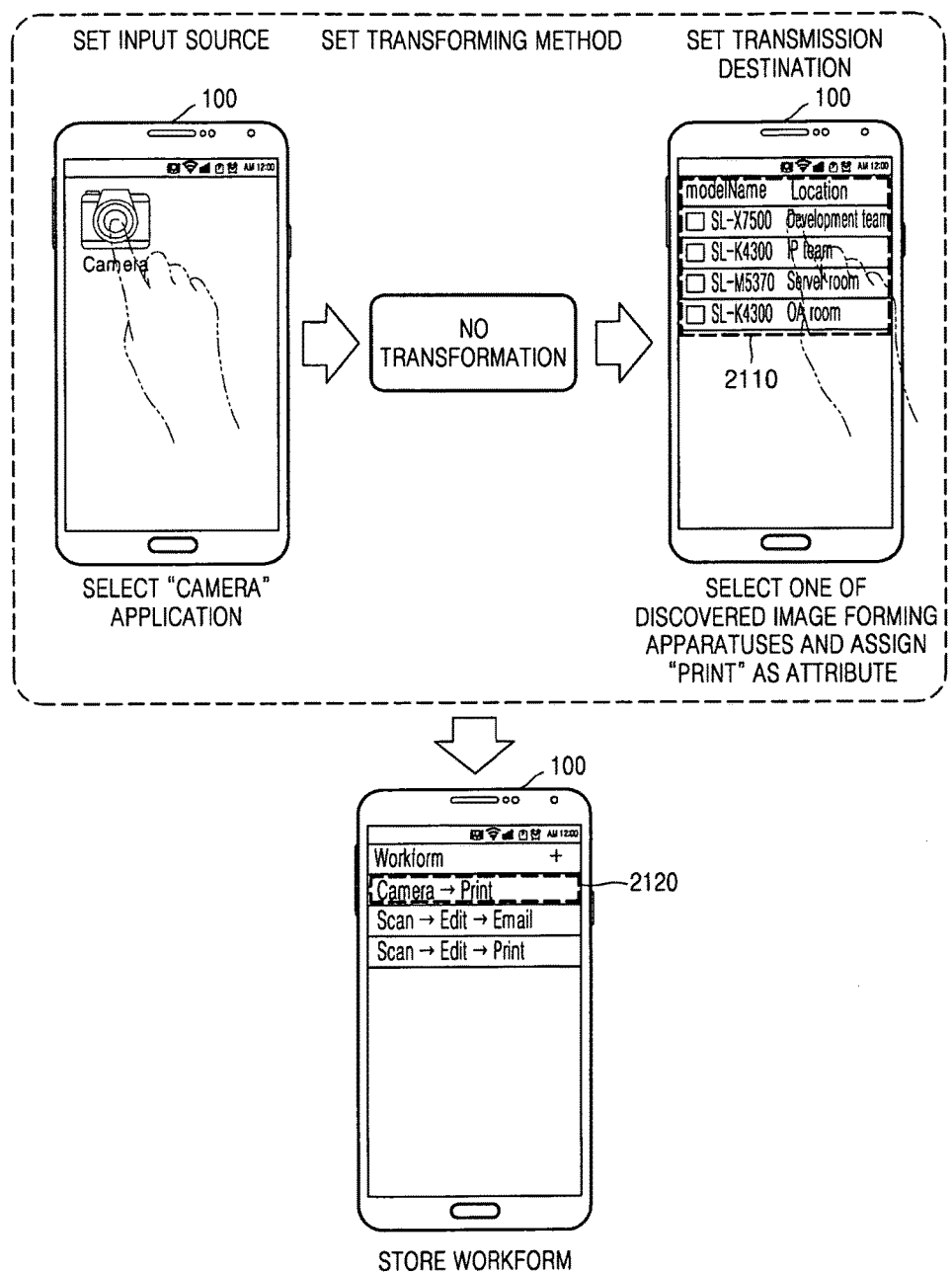
FIG. 21 is a diagram of a process of generating a workform in which a photo captured by a mobile device is printed by a multifunction printer (MFP), according to an exemplary embodiment.

FIG. 21 is a diagram of a process of generating a workform in which a photo captured by the mobile device 100 (e.g., of FIG. 1) is printed by an MW, according to an exemplary embodiment.

Referring to FIG. 21, first, a camera application installed in the mobile device 100 is selected as an input source for receiving a job target. In other words, a photo captured by a camera included in the mobile device 100 is received as a job target.

Then, a method of transforming the job target is set, but in the current embodiment, it is set not to transform the job target. In other words, the mobile device 100 transmits the photo to a transmission destination without transformation.

Lastly, a transmission destination to which the job target is to be transmitted is set. In the current embodiment, the photo captured by the mobile device 100 is to be printed, and thus the transmission destination may be an image forming apparatus for performing printing, such as a printer or an MFP. In order to set the transmission destination, the mobile device 100 discovers image forming apparatuses, and display a list 2110 of the discovered image forming apparatuses as shown in FIG. 21. The list 2110 may show model names and locations of the discovered image forming apparatuses. A user may select a desired apparatus from the list 2110 displayed on a screen of the mobile device 100, and set the transmission destination by assigning an attribute of the selected apparatus as "print".

Here, the user may set and store print options in a workform. The mobile device 100 may obtain capability of an image forming apparatus during a discovery process, and display settable options on the screen based on the obtained capability. The user may set the options displayed on the screen of the mobile device 100 to desired values.

When an image forming apparatus is selected, the mobile device 100 attempts to pair up with the selected image forming apparatus. The mobile device 100 pairs up with an image forming apparatus that is set as a transmission destination when a workform is generated so as to communicate with the image forming apparatus, and when an event is generated, i.e., when the workform is executed and a photo is captured by the mobile device 100, the mobile device 100 transmits the photo to the image forming apparatus and requests the image forming apparatus to print the photo.

Alternatively, the mobile device 100 may not pair up with the image forming apparatus that is selected as the transmission destination when the workform is generated, but may pair up with the image forming apparatus when the workform is executed and a job is performed. Such an example may be applied when an image forming apparatus is selected as an input source.

Discovering and pairing up of an image forming apparatus have been described above. Also, a process of pairing up while setting a workform will be described again later with reference to FIG. 33.

As such, when an input source, a transforming method, and a transmission destination are set, a workform 2120 is generated and stored. A name of the workform 2120 may be determined such that details and orders of jobs defined in the workform 2120 are distinguishable, such as "Camera=>Print". The user may later select and execute the workform 2120 such that jobs defined in the workform 2120 are performed in an order.

Figure 22:
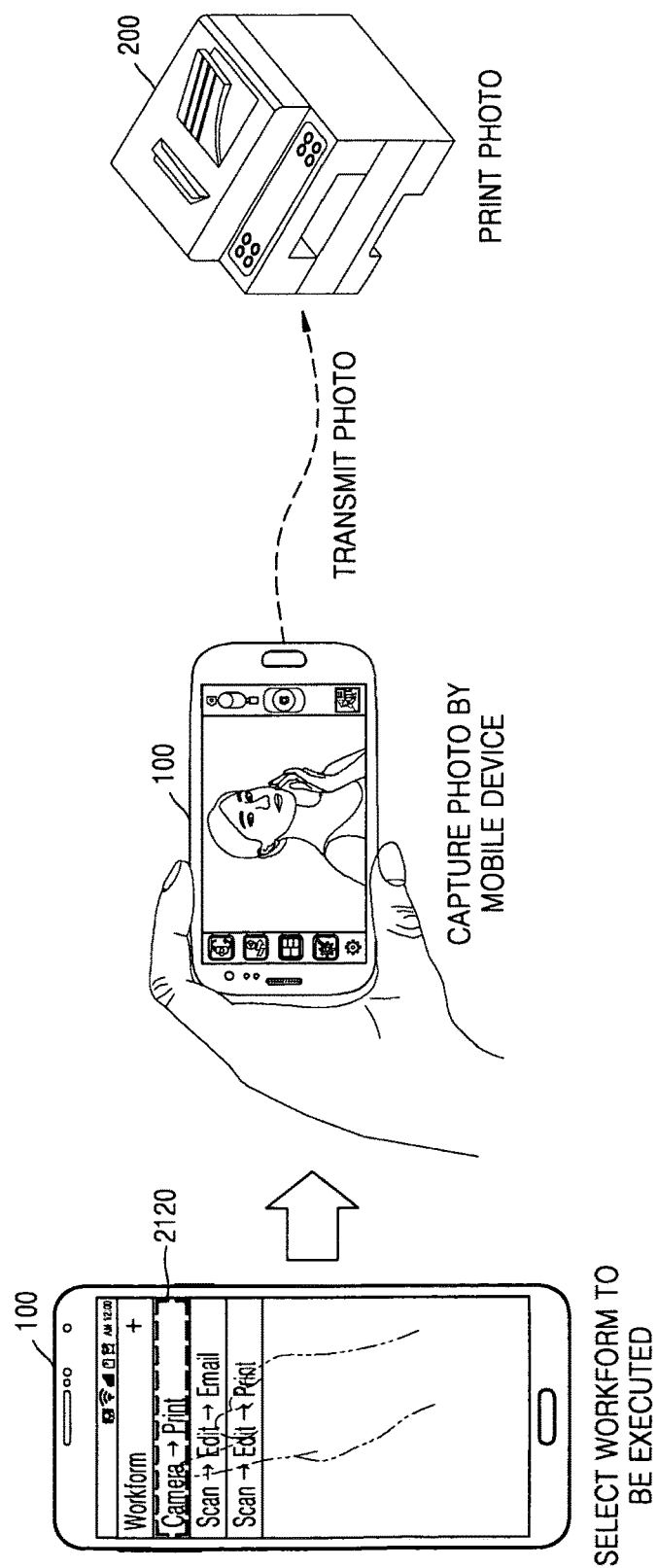
FIG. 22 is a diagram of a process of executing a workform in which a photo captured by a mobile device is printed by an image forming apparatus, according to an exemplary embodiment.

FIG. 22 is a diagram of a process of executing a workform in which a photo captured by a mobile device 100 (similar to the mobile device 100 of FIG. 1) is printed by an image forming apparatus 200 (similar to the image forming apparatus 200 of FIG. 1), according to an exemplary embodiment.

Referring to FIG. 22, when a user selects and executes the workform 2120 of "Camera=>Print" from a workform list displayed on a screen of the mobile device 100, the mobile device 100 may automatically execute a camera function or may display a message guiding the user to execute the camera function.

When the camera function is executed, the user may capture a photo by using the mobile device 100. When the photo is captured, the mobile device 100 transmits the photo to the image forming apparatus 200 that is set as a transmission destination in the workform 2120 and requests the image forming apparatus 200 to print the photo. Here, the mobile device 100 may also transmit print options pre-set and stored in the workform 2120 to the image forming apparatus 200, and the print options may be pre-set by the user while generating the workform 2120, as described above with reference to FIG. 21.

The image forming apparatus 200 prints the photo according to the print options, thereby completing the execution of the workform 2120.

Figure 23:
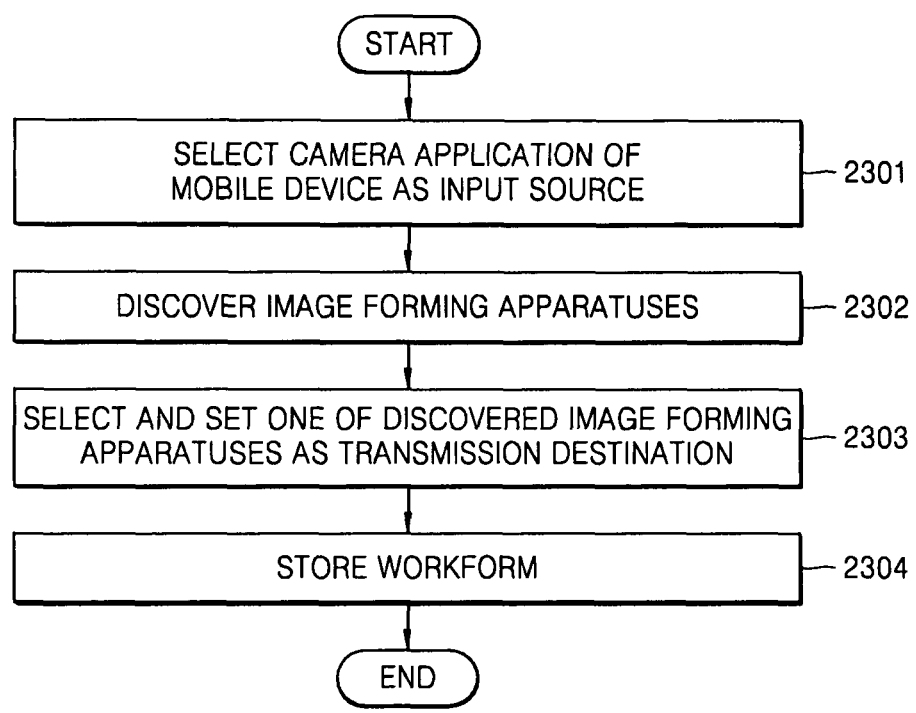
FIG. 23 is a flowchart of a process of generating a workform in which a photo captured by a mobile device is printed by an image forming apparatus, according to an exemplary embodiment.

FIG. 23 is a flowchart of a process of generating a workform in which a photo captured by a mobile device is printed by an image forming apparatus, according to an exemplary embodiment.

Referring to FIG. 23, in operation 2301, a user selects a camera application of a mobile device (similar to the mobile device 100 of FIG. 1) as an input source. In other words, a photo captured by using a camera included in the mobile device 100 is received as a job target.

In operation 2302, when the user wants to set an image forming apparatus as a transmission destination, the mobile device 100 discovers image forming apparatuses (similar to the image forming apparatus 200 of FIG. 1) and displays a list of the discovered image forming apparatuses on a screen.

In operation 2303, the user selects one of the discovered image forming apparatuses as a transmission destination, and assigns "print" as an attribute. Here, the user may set and store print options in a workform. When the user selects the transmission destination, the mobile device 100 attempts to pair up with the image forming apparatus (e.g., the image forming apparatus 200 of FIG. 1) selected as the transmission destination. A pairing process has been described in detail above.

In operation 2304, the mobile device 100 generates and stores a workform according to the set input source and the set transmission destination. Here, a name of the workform may be determined such that details and orders of jobs defined in the workform are distinguishable.

Figure 24:
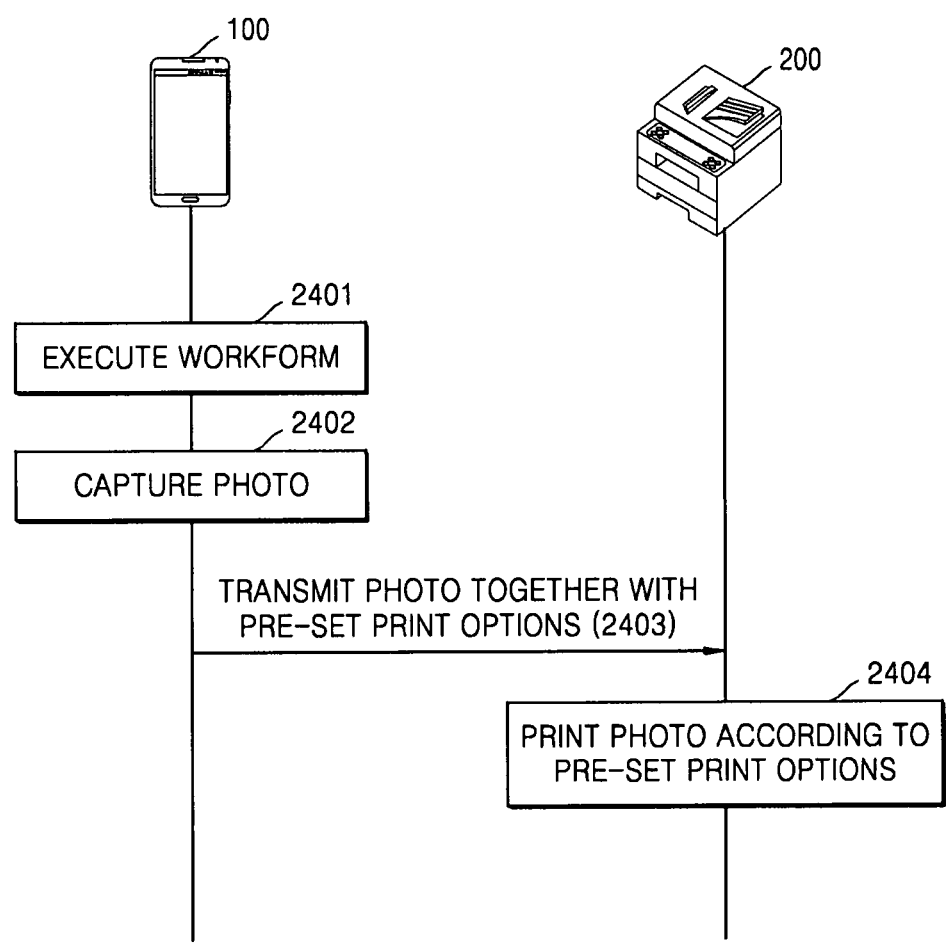
FIG. 24 is a flowchart of a process of executing a workform in which a photo captured by a mobile device is printed by an image forming apparatus, according to an exemplary embodiment.

FIG. 24 is a flowchart of a process of executing a workform in which a photo captured by a mobile device 100 (similar to the mobile device 100 of FIG. 1) is printed by an image forming apparatus 200 (similar to the image forming apparatus 200 of FIG. 1), according to an exemplary embodiment.

Referring to FIG. 24, in operation 2401, a workform stored in the mobile device 100 is executed. Here, the workform defines an order of jobs such that a photo captured by the mobile device 100 is printed by the image forming apparatus 200. When the workform is executed, the mobile device 100 may automatically execute a camera function or display a message guiding a user to execute the camera function.

In operation 2402, the user may capture the photo by using the mobile device 100.

In operation 2403, the mobile device 100 transmits the photo together with pre-set print options to the image forming apparatus 200. Here, the image forming apparatus 200 is an apparatus set as a transmission destination by the workform executed in operation 2401. As described above with reference to FIG. 21, print options may be pre-set by the user while setting the image forming apparatus 200 as the transmission destination. The image forming apparatus 200 may be connected to the mobile device 100 via a pairing process while the workform is generated, or may be paired up after the workform is executed in operation 2401.

In operation 2404, the image forming apparatus 200 prints the photo according to the pre-set print options, thereby completing the workform.

Figure 25:
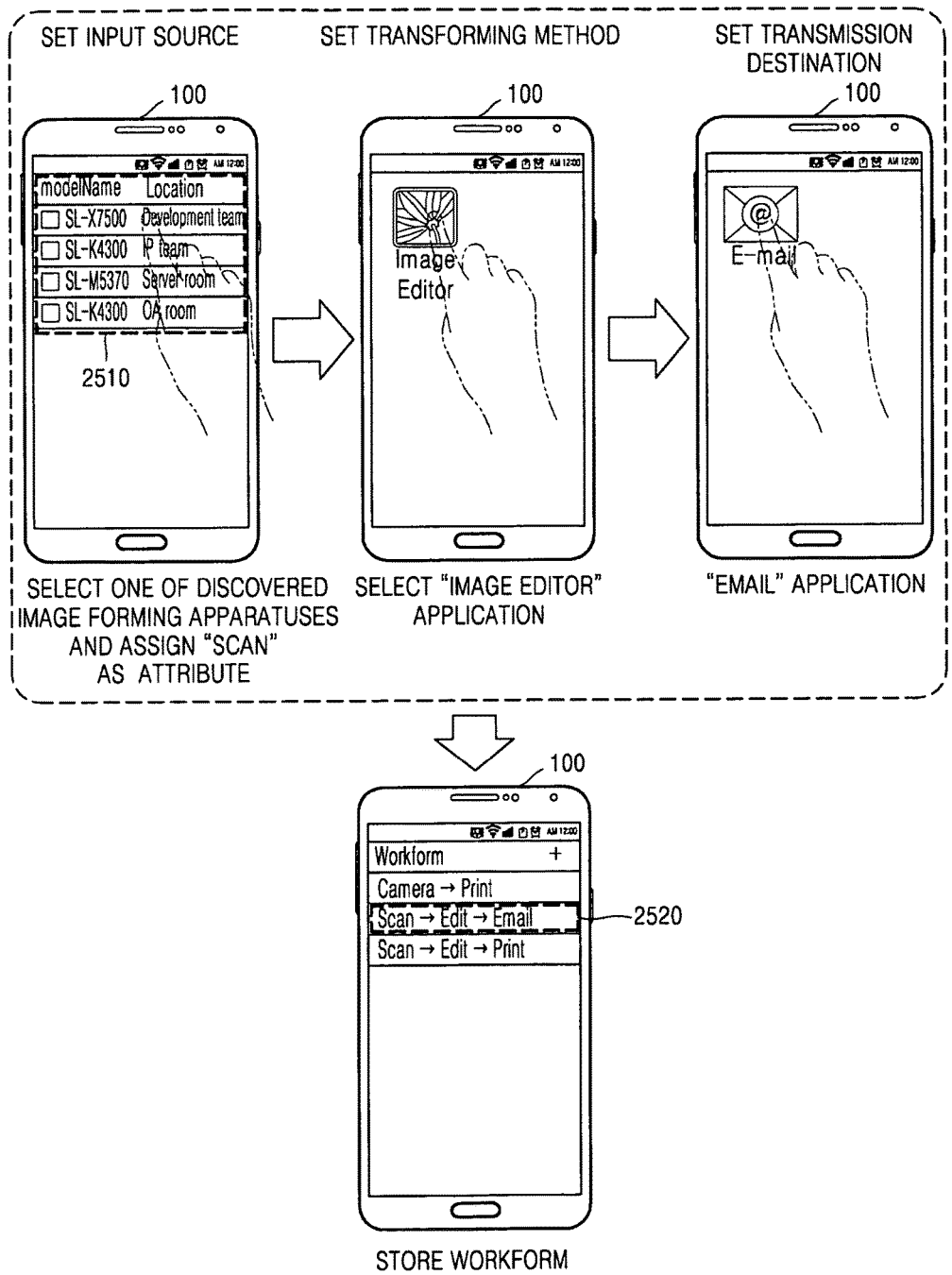
FIG. 25 is a diagram of a process of generating a workform in which an image scanned by an image forming apparatus is edited by a mobile device, and the edited image is transmitted via an email, according to an exemplary embodiment.

FIG. 25 is a diagram of a process of generating a workform 2520 in which an image scanned by an image forming apparatus (similar to the image forming apparatus 200 of FIG. 1) is edited by a mobile device 100 (similar to the mobile device 100 of FIG. 1), and the edited image is transmitted via an email, according to an exemplary embodiment.

Referring to FIG. 25, first, a user selects the image forming apparatus as an input source for receiving a job target, i.e., a scan image. In detail, the mobile device 100 discovers image forming apparatuses, and displays a list 2510 of the discovered image forming apparatuses on a screen as shown in FIG. 25. The user selects the image forming apparatus from the list 2510 displayed on the screen of the mobile device 100, and assign an attribute of the image forming apparatus to "scan" to set the image forming apparatus as an input source.

At this time, the user may set scan options and store the scan options in the workform 2520. The mobile device 100 may obtain capability of an image forming apparatus during a discovery process, and display settable scan options on the screen based on the obtained capability. The user may set the settable scan options to desired values.

When the image forming apparatus is selected, the mobile device 100 attempts to pair up with the image forming apparatus. The mobile device 100 pairs up with the image forming apparatus that is set as the input source when the workform 2520 is generated so as to communicate with the image forming apparatus, and when an event is generated, i.e., when the workform 2520 is executed and the image forming apparatus performs scanning, the mobile device 100 receives a scan image from the image forming apparatus set as the input source.

Alternatively, the mobile device 100 may not pair up with the image forming apparatus that is selected as the input source when the workform 2520 is generated, but may pair up with the image forming apparatus when the workform 2520 is executed and a job is performed.

Discovering and pairing up of an image forming apparatus have been described above. Also, a process of pairing up while setting a workform will be described again later with reference to FIG. 33.

Then, the user sets a transforming method of the scan image. In the current embodiment, the user sets an image editor application providing an editing function as the transforming method. In other words, the user may edit the scan image received from the image forming apparatus by using the image editor application installed in the mobile device 100, while executing the workform 2520.

Lastly, a transmission destination to which the edited scan image is to be transmitted is set. In the current embodiment, the user sets an email application installed in the mobile device 100 as the transmission destination. In other words, the edited scan image is transmitted to an email via the email application of the mobile device 100. Here, the user may pre-set and store an email address to which the edited scan image is to be transmitted.

As such, when the input source, the transforming method, and the transmission destination are set, the workform 2520 is generated and stored. A name of the workform 2520 may be determined such that details and orders of jobs defined by the workform 2520 are distinguishable, such as "Scan=>Edit=>Email". The user may later select and execute the workform 2520 such that jobs defined by the workform 2520 are performed according to an order.

Figure 26:
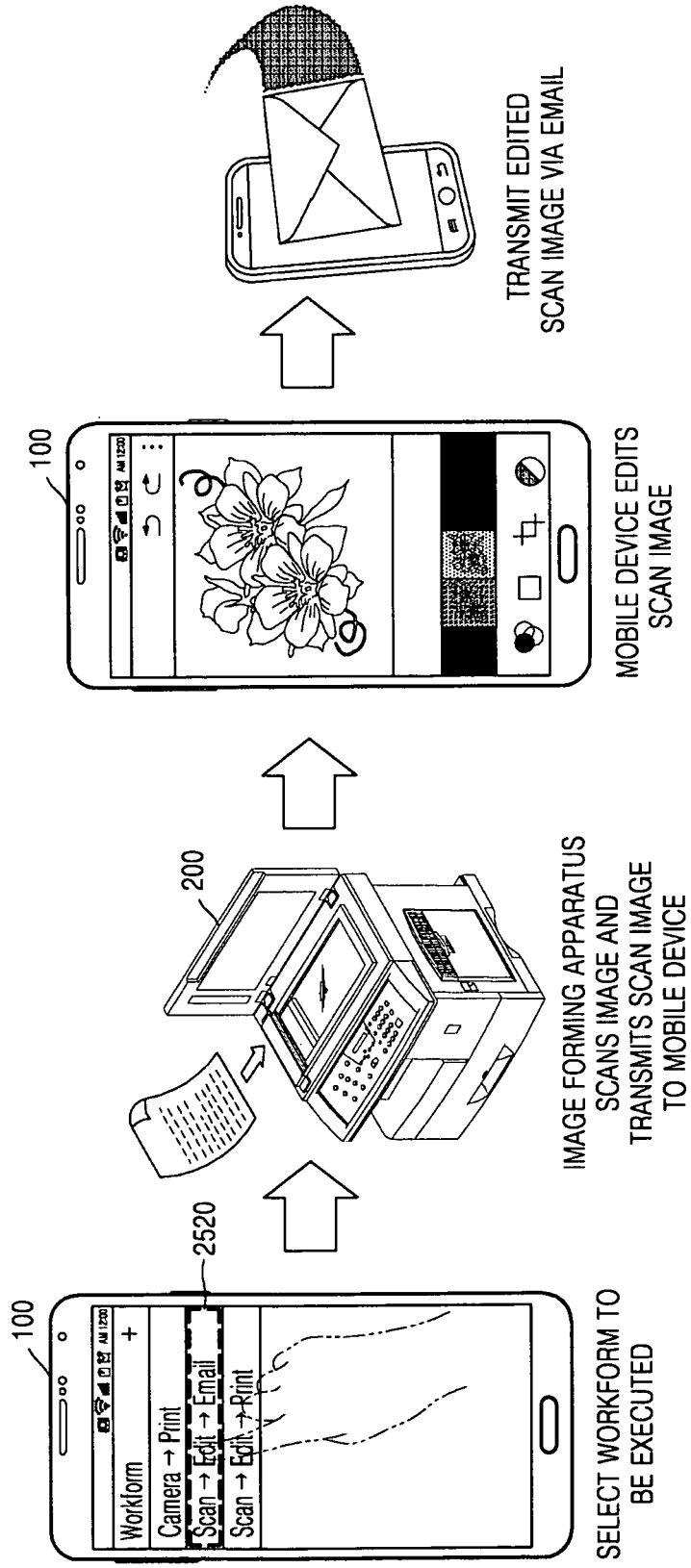
FIG. 26 is a diagram of a process of executing a workform in which an image scanned by an image forming apparatus is edited by a mobile device, and the edited image is transmitted via an email, according to an exemplary embodiment.

FIG. 26 is a diagram of a process of executing the workform 2520 in which an image scanned by an image forming apparatus 200 (similar to the image forming apparatus 200 of FIG. 1) is edited by a mobile device 100 (similar to the mobile device 100 of FIG. 1), and the edited image is transmitted via an email, according to an exemplary embodiment.

Referring to FIG. 26, when a user selects and executes the workform 2520 of "Scan=>Edit=>Email" from a workform list displayed on a screen of the mobile device 100, the mobile device 100 may notify the user about the image forming apparatus 200 set as an input source, and display a message guiding scanning.

When the user performs the scanning in the image forming apparatus 200 set as the input source based on the message, the image forming apparatus 200 transmits a scan image to the mobile device 100. Here, the mobile device 100 may pre-transmit a command requesting the image forming apparatus 200 to transmit the scan image to the mobile device 100, and accordingly, the image forming apparatus 200 may transmit the scan image to the mobile device 100.

Upon receiving the scan image from the image forming apparatus 200, the mobile device 100 automatically executes an "image editor" application 2504 according to the workform 2520. When the "image editor" application is executed, the user may edit the scan image in the mobile device 100.

After the user edits the scan image, the mobile device 100 executes an "email" application 2506, and transmits the edited scan image to an email address stored in the workform 2520. Here, the email address may be pre-set by the user while generating the workform 2520, as described above with reference to FIG. 25.

Figure 27:
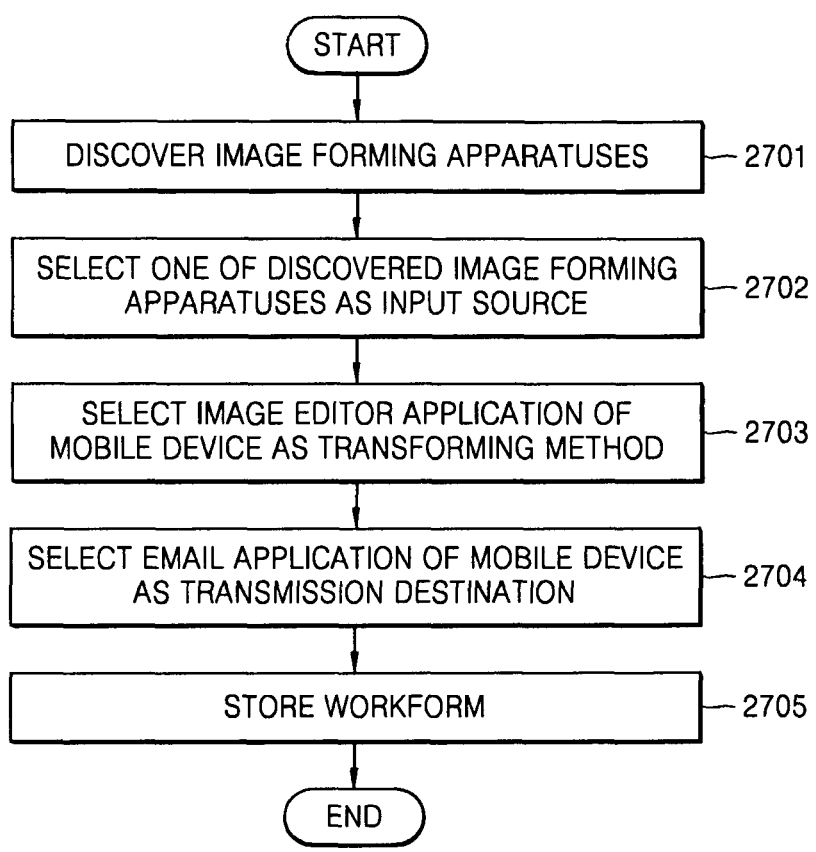
FIG. 27 is a flowchart of a process of generating a workform in which an image scanned by an image forming apparatus is edited by a mobile device, and the edited image is transmitted via an email, according to an exemplary embodiment.

FIG. 27 is a flowchart of a process of generating a workform in which an image scanned by an image forming apparatus (similar to the image forming apparatus 200 of FIG. 1) is edited by a mobile device (similar to the mobile device 100 of FIG. 1), and the edited image is transmitted via an email, according to an exemplary embodiment.

Referring to FIG. 27, when a user is to select an image forming apparatus (similar to the image forming apparatus 200 of FIG. 1) as an input source, the mobile device (similar to the mobile device 100 of FIG. 1) discovers image forming apparatuses and displays a list of discovered image forming apparatuses on a screen, in operation 2701.

In operation 2702, the user selects one of the discovered image forming apparatuses as the input source, and assigns an attribute of the selected image forming apparatus as "scan". At this time, the user may set and store scan options in a workform. When the user selects the image forming apparatus, the mobile device 100 attempts to pair up with the selected image forming apparatus (similar to the image forming apparatus 200 of FIG. 1). A pairing process (similar to the pairing process 660 of FIG. 6) has been described above in detail.

In operation 2703, the user selects an image editor application installed in the mobile device (similar to the mobile device 100 of FIG. 1) as a transforming method. In other words, the user may edit a scan image through the image editor application while executing the workform.

In operation 2704, the user selects an email application installed in the mobile device as a transmission destination. In other words, the edited scan image is transmitted to an email via the email application. Here, an email address to which the edited scan image is to be transmitted may be pre-set and stored by the user.

In operation 2705, the mobile device generates and stores the workform according to the input source, the transforming method, and the transmission destination. Here, a name of the workform may be determined such that details and orders of jobs defined in the workform are distinguishable.

Figure 28:
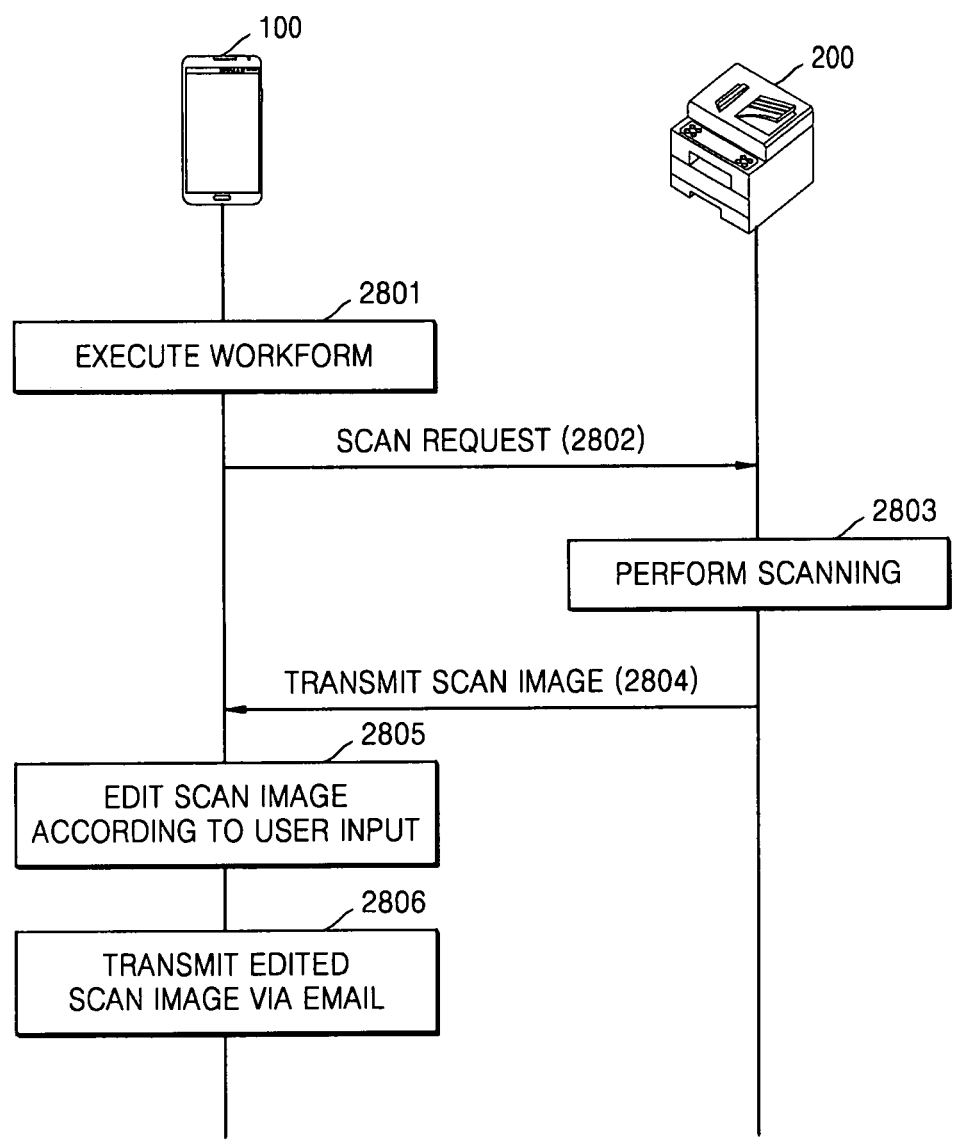
FIG. 28 is a diagram of a process of executing a workform in which an image scanned by an image forming apparatus is edited by a mobile device, and the edited image is transmitted via an email, according to an exemplary embodiment.

FIG. 28 is a diagram of a process of executing a workform in which an image scanned by an image forming apparatus 200 (similar to the image forming apparatus 200 of FIG. 1) is edited by a mobile device 100 (similar to the mobile device 100 of FIG. 1), and the edited image is transmitted via an email, according to an exemplary embodiment.

Referring to FIG. 28, a workform stored in the mobile device 100 is executed in operation 2801. Here, the workform defines an order of jobs such that an image scanned by the image forming apparatus 200 is edited by the mobile device 100 and the edited image is transmitted via an email.

In operation 2802, the mobile device 100 transmits a scan request to the image forming apparatus 200 set as an input source. Here, the mobile device 100 may display, on a screen, a guide message for a user to perform scanning via the image forming apparatus 200. Also, the mobile device 100 may transmit scan options stored in the workform, together with the scan request. As described above with reference to FIG. 25, the scan options may be pre-set by the user while setting the image forming apparatus 200 as the input source, while generating the workform.

In operation 2803, the image forming apparatus 200 performs scanning to obtain a scan image. Here, the image forming apparatus 200 may perform the scanning according to the scan options received together with the scan request in operation 2802.

In operation 2804, the image forming apparatus 200 transmits the scan image to the mobile device 100. Here, the image forming apparatus 200 may be connected to the mobile device 100 via a pairing process (similar to the pairing process 660 of FIG. 6, and the pairing processes discussed above) while generating the workform, or may be paired up after the workform is executed in operation 2801.

Upon receiving the scan image from the image forming apparatus 200, the mobile device 100 executes an image editor application as defined in the workform, and edits the scan image according to a user input in operation 2805.

After the scan image is edited, the mobile device 100 executes an email application and transmits the edited scan image via an email in operation 2806, thereby completing the workform. Here, as described above with reference to FIG. 25, an email address to which the edited scan image is to be transmitted may be pre-set by the user while generating the workform.

Figure 29:
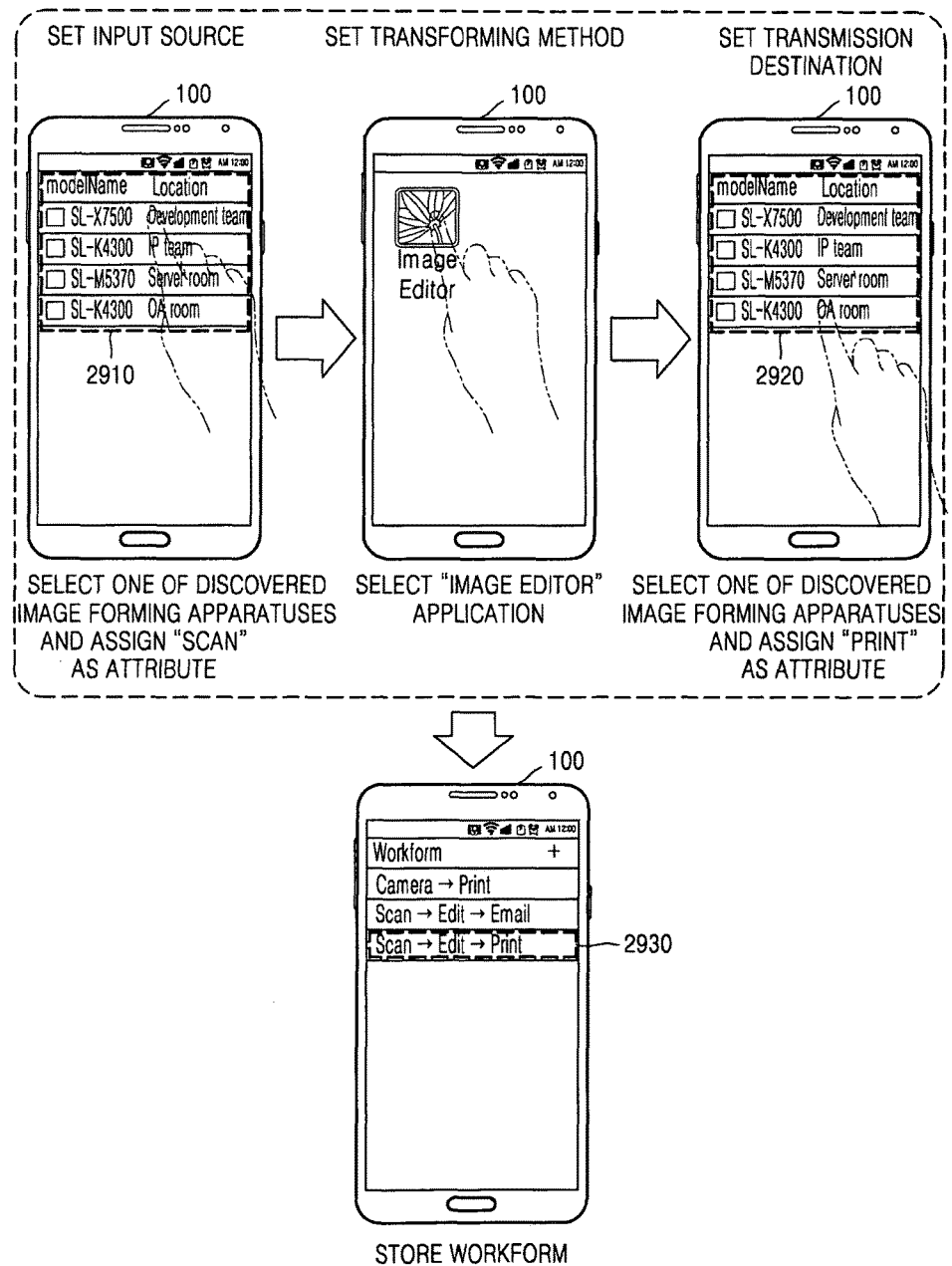
FIG. 29 is a diagram of a process of generating a workform in which an image scanned by an image forming apparatus is edited by a mobile device, and the edited image is printed by another image forming apparatus, according to an exemplary embodiment.

FIG. 29 is a diagram of a process of generating a workform 2930 in which an image scanned by an image forming apparatus (similar to the image forming apparatus 200 of FIG. 1) is edited by a mobile device 100 (similar to the mobile device 100 of FIG. 1), and the edited image is printed by another image forming apparatus, according to an exemplary embodiment.

Referring to FIG. 29, first, a user selects an image forming apparatus as an input source for receiving a job target, i.e., a scan image. In detail, the mobile device 100 may discover image forming apparatuses, and display a list 2910 of the discovered image forming apparatuses on a screen as shown in FIG. 29. The user selects an image forming apparatus from the list 2910, and set the image forming apparatus as an input source by assigning an attribute of the image forming apparatus to "scan".

At this time, the user may set and store scan options in the workform 2930. The mobile device 100 may obtain capability of an image forming apparatus during a discovery process, and display scan options settable based on the capability on the screen. The user may set the displayed scan options to desired values.

When the image forming apparatus is selected, the mobile device 100 attempts to pair up with the image forming apparatus. The mobile device 100 may pair up with the image forming apparatus set as the input source while generating the workform 2930 so as to communicate with the image forming apparatus, and when an event is generated, i.e., when the workform 2930 is executed and the image forming apparatus performs scanning, the mobile device 100 receives a scan image from the image forming apparatus set as the input source.

Alternatively, the mobile device 100 may not pair up with the image forming apparatus set as the input source while generating the workform 2930, but may pair up with the image forming apparatus while the workform 2930 is executed and a job is performed.

Discovering and pairing up of an image forming apparatus have been described above. Also, a process of pairing up while setting a workform will be described again later with reference to FIG. 33.

Then, the user sets a transforming method to transform the scan image. In the current embodiment, the user sets an "image editor" application 2902 providing an editing function as a transforming method. In other words, while the workform 2930 is executed, the user may edit the scan image received from the image forming apparatus by using the "image editor" application 2902 installed in the mobile device 100.

Lastly, a transmission destination to which the edited scan image is to be transmitted is set. In the current embodiment, an image forming apparatus that is to print the edited scan image is set as a transmission destination. In order to set the transmission destination, the mobile device 100 discovers image forming apparatus, and display a list 2920 of the discovered image forming apparatuses on the screen as shown in FIG. 29. The list 2920 may display model names and locations of the discovered image forming apparatuses. The user may select an image forming apparatus from the list 2920, and set the image forming apparatus as a transmission destination by assigning an attribute of the image forming apparatus to "print".

In the current embodiment, the image forming apparatus set as the transmission destination is different from the image forming apparatus set as the input source. Referring to FIG. 29, an image forming apparatus located at a "development team" is set as an input source, and an image forming apparatus located at an "OA room" is set as a transmission destination. The current embodiment may be useful when an image forming apparatus supports a scanning function but does not support a color printing function, whereas another image forming apparatus supports a color printing function but does not support a scanning function.

Here, the user may set and store print options in the workform 2930. A method of setting print options while setting an image forming apparatus as a transmission destination has been described above with reference to FIG. 21.

Meanwhile, when the image forming apparatus is set as the transmission destination, the mobile device 100 attempts to pair up with the image forming apparatus. The mobile device 100 pairs up with the image forming apparatus set as the transmission destination while generating the workform 2930 to communicate with the image forming apparatus at any time, and when an event is generated, i.e., when the workform 2930 is executed and the mobile device 100 completes editing of the scan image, requests the image forming apparatus to print the edited scan image by transmitting the edited scan image.

Alternatively, the mobile device 100 may not pair up with the image forming apparatus set as the transmission destination while generating the workform 2930, but may pair up with the image forming apparatus when the workform 2930 is executed and a job is performed.

Discovering and pairing up of an image forming apparatus have been described above. Also, a process of pairing up while setting a workform will be described again later with reference to FIG. 33.

When the input source, the transforming method, and the transmission destination are set as above, the workform 2930 is generated and stored. A name of the workform 2930 may be determined such that details and orders of jobs defined in the workform 2930 are distinguishable, for example, "Scan=>Edit=>Print".

Figure 30:
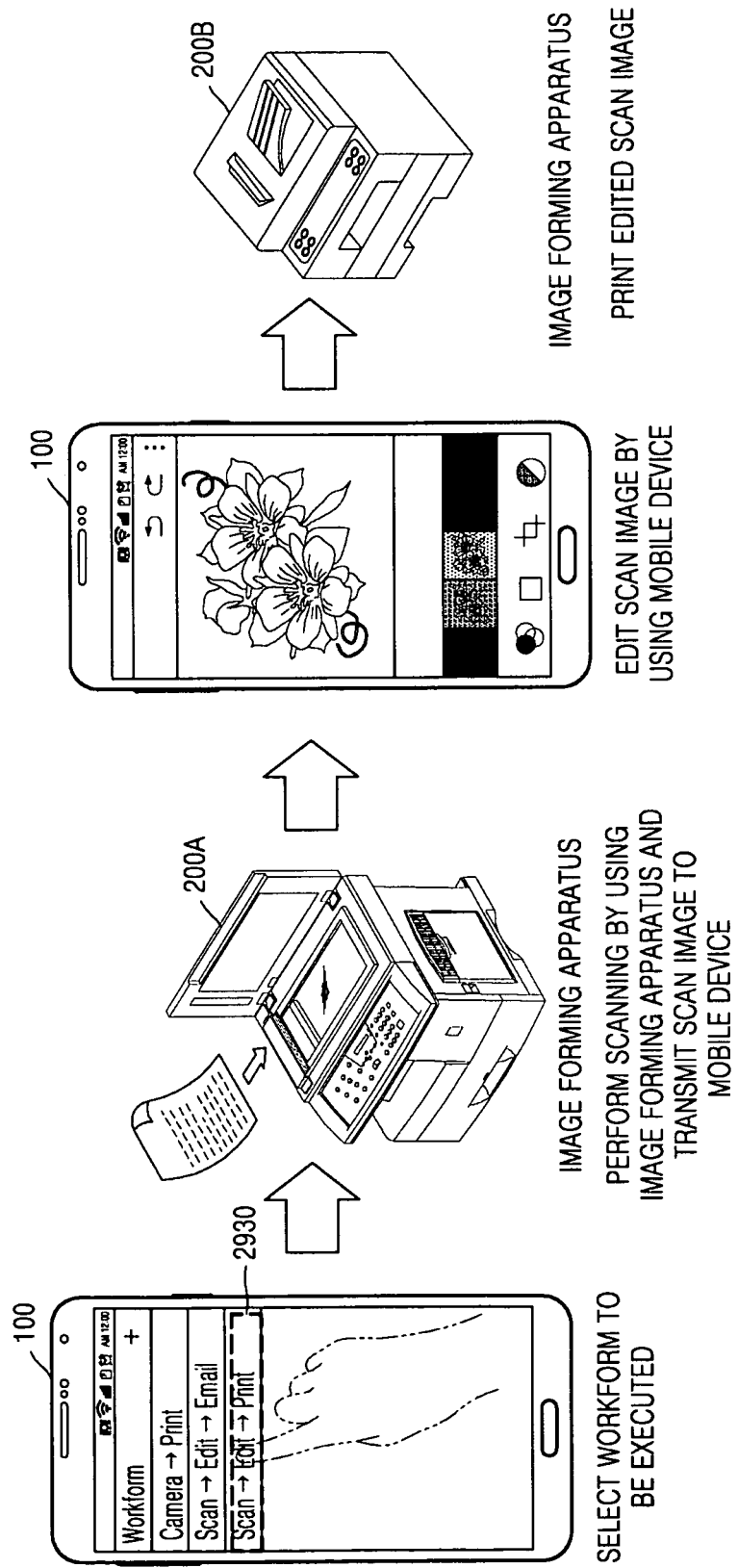
FIG. 30 is a diagram of a process of executing a workform in which an image scanned by an image forming apparatus is edited by a mobile device, and the edited image is printed by another image forming apparatus, according to an exemplary embodiment.

FIG. 30 is a diagram of a process of executing the workform 2930 in which an image scanned by the image forming apparatus 200A (similar to the image forming apparatus 200 of FIG. 1) is edited by the mobile device 100 (similar to the mobile device 100 of FIG. 1), and the edited image is printed by the image forming apparatus 200B (similar to the image forming apparatus 200 of FIG. 1), according to an exemplary embodiment.

Referring to FIG. 30, when a user selects and executes the workform 2930 of "Scan=>Edit=>Print" from a workform list displayed on a screen of the mobile device 100, the mobile device 100 may notify the user about the image forming apparatus 200A set as an input source and display a message guiding the user to perform scanning.

When the user performs scanning by using the image forming apparatus 200A according to the message, the image forming apparatus 200 transmits a scan image to the mobile device 100. Here, the mobile device 100 may pre-transmit a command to the image forming apparatus 200A requesting to transmit the scan image to the mobile device 100 after scanning, and accordingly, the image forming apparatus 200A may transmit the scan image to the mobile device 100 after the scanning.

Upon receiving the scan image from the image forming apparatus 200A, the mobile device 100 automatically executes an "image editor" application as defined in the workform 2930. When the "image editor" application is executed, the user may edit the scan image by using the mobile device 100.

After the user edits the scan image, the mobile device 100 transmits the edited scan image to the image forming apparatus 200B set as a transmission destination in the workform 2930 to request the image forming apparatus 200B to print the edited scan image. At this time, the mobile device 100 may also transmit print options pre-set and stored in the workform 2930 to the image forming apparatus 200B, and as described above with reference to FIG. 29, the print options may be pre-set by the user while generating the workform 2930.

The image forming apparatus 200B prints the edited scan image according to the print options, thereby completing the executing of the workform 2930.

Figure 31:
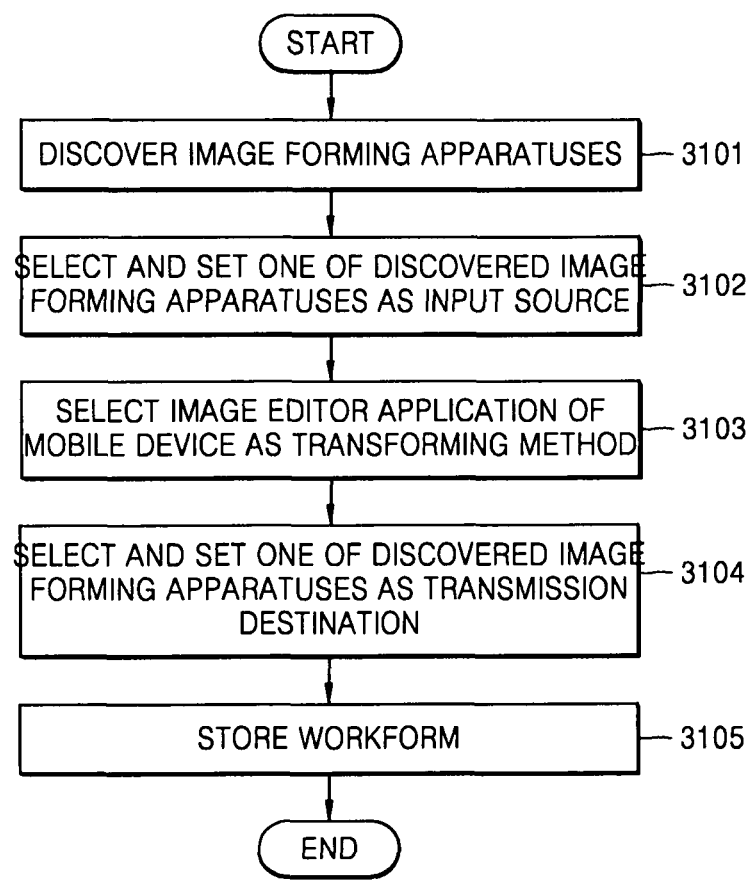
FIG. 31 is a flowchart of a process of generating a workform in which an image scanned by an image forming apparatus is edited by a mobile device, and the edited image is printed by another image forming apparatus, according to an exemplary embodiment.

FIG. 31 is a flowchart of a process of generating a workform in which an image scanned by an image forming apparatus (similar to the image forming apparatus 200 of FIG. 1) is edited by a mobile device (similar to the mobile device 100 of FIG. 1), and the edited image is printed by another image forming apparatus (similar to the image forming apparatus 200 of FIG. 1), according to an exemplary embodiment.

Referring to FIG. 31, when a user is to select an image forming apparatus as an input source, the mobile device discovers image forming apparatuses and displays a list of the discovered image forming apparatuses on a screen, in operation 3101.

In operation 3102, the user selects and set one of the discovered image forming apparatuses as an input source, and assigns "scan" as an attribute. Here, the user may set and store scan options in the workform. When the user sets the image forming apparatus as the input source, the mobile device attempts to pair up with the image forming apparatus set as the input source. A pairing process has been described in detail above.

In operation 3103, the user selects an "image editor" application installed in the mobile device as a transforming method. In other words, the user may edit a scan image through the "image editor" application of the mobile device while executing the workform.

In operation 3104, the user may select and set one of the image forming apparatuses discovered in operation 3101 as a transmission destination, and assign "print" as an attribute. Here, the image forming apparatus set as the transmission destination may be different from that set as the input source in operation 3102. Also, the user may set and store print options in the workform. When the transmission destination is set, the mobile device attempts to pair up with the image forming apparatus set as the transmission destination. A pairing process has been described in detail above.

In operation 3105, the mobile device generates and stores the workform according to the input source, the transforming method, and the transmission destination. Here, a name of the workform may be determined such that details and orders of jobs defined in the workform are distinguishable.

Figure 32:
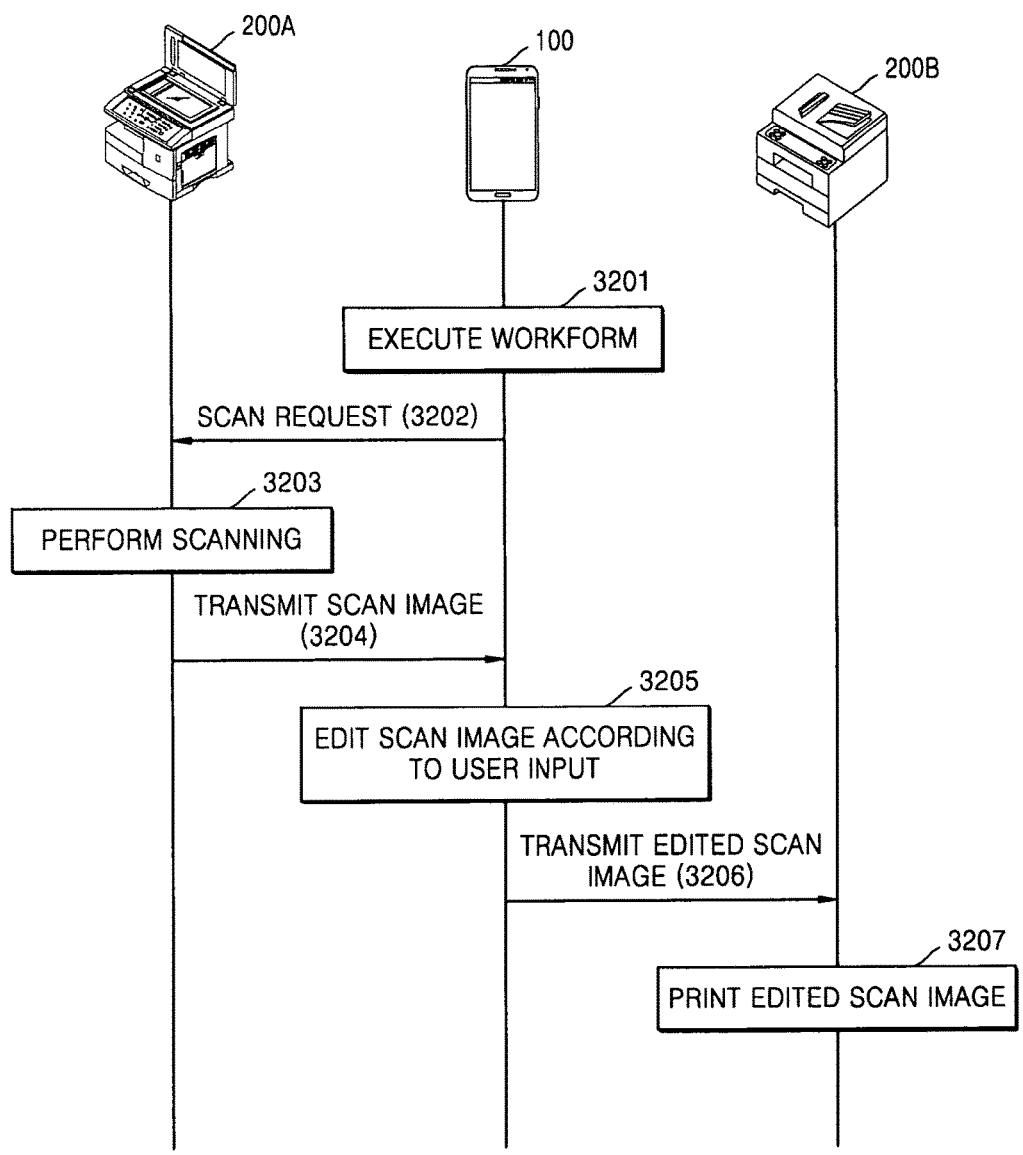
FIG. 32 is a diagram of a process of executing a workform in which an image scanned by an image forming apparatus is edited by a mobile device, and the edited image is printed by another image forming apparatus, according to an exemplary embodiment.

FIG. 32 is a diagram of a process of executing a workform in which an image scanned by the image forming apparatus 200A (similar to the image forming apparatus 200 of FIG. 1) is edited by the mobile device 100 (similar to the mobile device 100 of FIG. 1), and the edited image is printed by the image forming apparatus 200B (similar to the image forming apparatus 200 of FIG. 1), according to an exemplary embodiment.

Referring to FIG. 32, the workform stored in the mobile device 100 is executed in operation 3201. Here, the workform defines an order of performing jobs such that an image scanned by the image forming apparatus 200A is edited by the mobile device 100, and the edited image is printed by the image forming apparatus 200B.

In operation 3202, the mobile device 100 transmits a scan request to the image forming apparatus 200A that is set as an input source. Here, the mobile device 100 may display a guide message guiding a user to perform scanning by using the image forming apparatus 200A, on a screen. Also, the mobile device 100 may transmit scan options stored in the workform together with the scan request. As described above with reference to FIG. 29, the scan options may be pre-set by the user while setting the image forming apparatus 200A as the input source while generating the workform.

In operation 3203, the image forming apparatus 200A obtains a scan image by performing scanning. Here, the image forming apparatus 200A may perform the scanning according to the scan options received together with the scan request in operation 3202.

In operation 3204, the image forming apparatus 200A transmits the scan image to the mobile device 100. Here, the image forming apparatus 200A may be connected to the mobile device 100 via a pairing process while generating the workform, or may be paired up after the workform is executed in operation 3201.

Upon receiving the scan image from the image forming apparatus 200A, the mobile device 100 executes an "image editor" application as define din the workform, and edits the scan image according to a user input in operation 3205.

After the scan image is edited, the mobile device 100 transmits the edited scan image to the image forming apparatus 200B that is set as a transmission destination, in operation 3206. Here, the mobile device 100 may transmit print options that are pre-set to the image forming apparatus 200B, together with the edited scan image. As described above with reference to FIG. 29, the print options may be pre-set by the user while setting the image forming apparatus 200B as the transmission destination while generating the workform. The image forming apparatus 200B may be connected to the mobile device 100 via a pairing process while generating the workform, or may be paired up after the workform is executed in operation 3201.

In operation 3207, the image forming apparatus 200*b* prints the edited scan image according to the print options, thereby completing the workform.

As described above, when an image forming apparatus is selected as an input source or a transmission destination, a mobile device may be connected to the image forming apparatus via a pairing process. The pairing process while generating a workform will now be described in detail with reference to FIG. 33.

Figure 33:
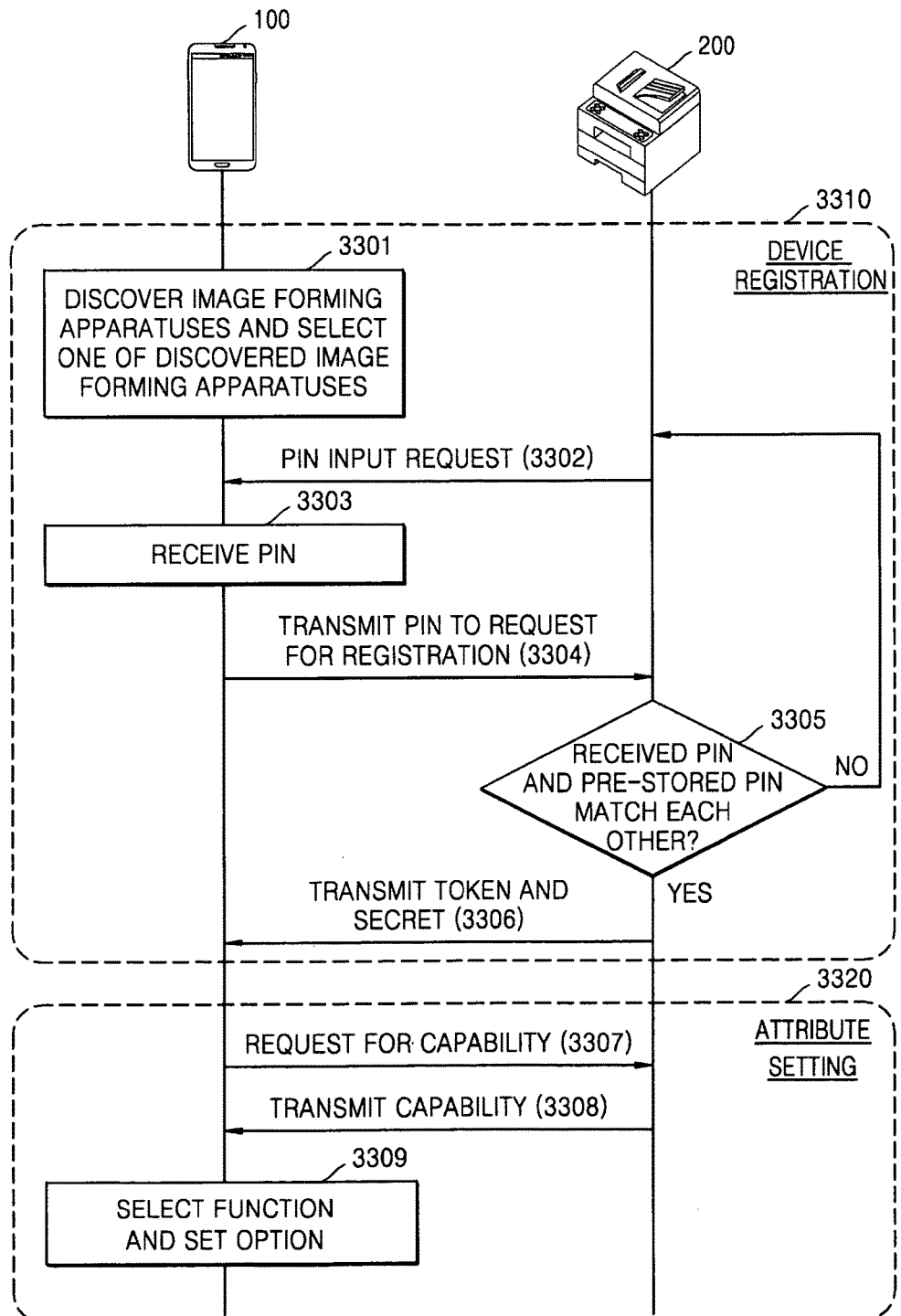
FIG. 33 is a diagram of detailed processes of a mobile device and an image forming apparatus performing pairing while a workform is generated, according to an exemplary embodiment.

FIG. 33 is a diagram of detailed processes of a mobile device 100 (similar to the mobile device 100 of FIG. 1) and an image forming apparatus 200 (similar to the image forming apparatus 200 of FIG. 1) performing pairing while a workform is generated, according to an exemplary embodiment.

When a user is to select an image forming apparatus as an input source or a transmission destination, the mobile device 100 discovers image forming apparatuses, and the user selects one of the discovered image forming apparatuses, for example, the image forming apparatus 200, in operation 3301.

When the image forming apparatus 200 is selected, the image forming apparatus 200 transmits a PIN input request to the mobile device 100 in operation 3302.

In operation 3303, the mobile device 100 displays a screen for receiving a PIN, and receives the PIN from the user.

In operation 3304, the mobile device 100 transmits the PIN to the image forming apparatus 200 to request for registration.

In operation 3305, the image forming apparatus 200 determines whether the received PIN matches a pre-stored PIN. When the received PIN and the pre-stored PIN do not match, operation 3302 is performed for another PIN, and when the received PIN and the pre-stored PIN match, credential information, such as a token and a secret, is transmitted to the mobile device 100 in operation 3306. The mobile device 100 may access the image forming apparatus 200 later by using the token and the secret received in operation 3306.

Operations 3301 through 3306 correspond to a device registration operation 3310, and after the device registration operation 3310, an attribute setting operation 3320 is performed. The attribute setting operation 3320 includes operations 3307 through 3309.

In operation 3307, the mobile device 100 requests the image forming apparatus 200 for capability, and in operation 3308, the image forming apparatus 200 transmits the capability to the mobile device 100. Here, the capability may contain information about functions performable by the image forming apparatus 200, about a status of the image forming apparatus 200, and about options settable by the image forming apparatus 200.

In operation 3309, the mobile device 100 may display selectable functions and settable options on the screen, and select a function and set an option based on a user input. For example, when the image forming apparatus 200 is to be used as an input source for obtaining a scan image, the user may assign "scan" as an attribute and set scan options. Alternatively, when the image forming apparatus 200 is to be used as a transmission destination for printing, the user may assign "print" as an attribute and set print options.

Meanwhile, as described above, the mobile device 100 and the image forming apparatus 200 may pair up while the workform is performed, instead of when the workform is generated.

Figure 34:
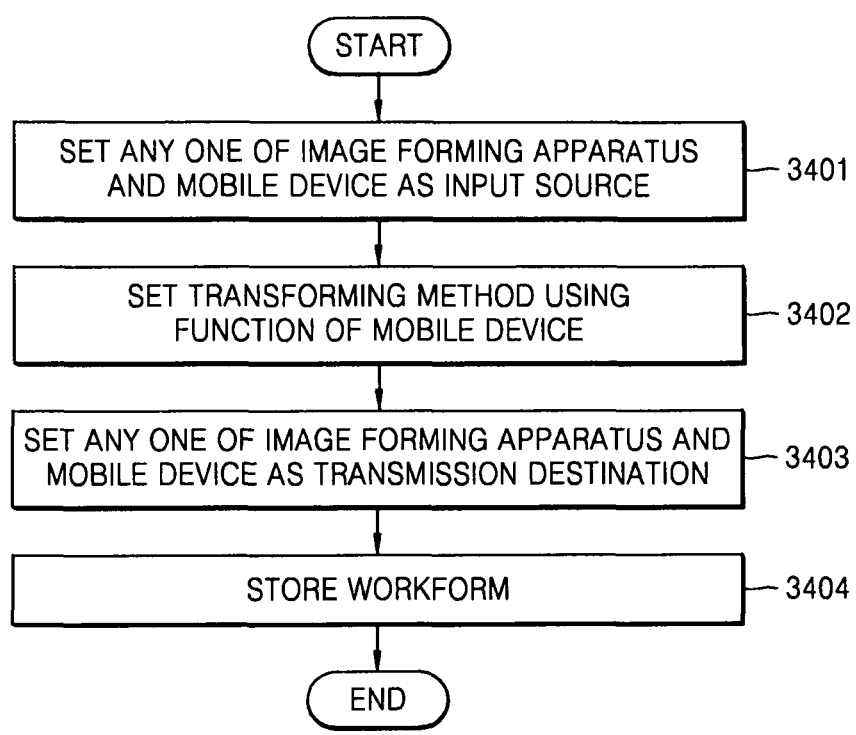
FIG. 34 is a flowchart of a method of generating a workform, according to an exemplary embodiment.

FIG. 34 is a flowchart of a method of generating a workform, according to an exemplary embodiment.

Referring to FIG. 34, a user executes an application supporting a workform using a BYOD service by using a mobile device (similar to the mobile device 100 of FIG. 1), and sets any one of an image forming apparatus (similar to the image forming apparatus 200 of FIG. 1) and the mobile device as an input source in operation 3401. In other words, the user selects any one of the image forming apparatus and the mobile device as an input source for receiving a job target, and sets a function for obtaining the job target.

In operation 3402, the user sets a transforming method using a function of the mobile device by using the mobile device. In other words, a method of transforming the job target received from the input source is set.

In operation 3403, the user sets any one of the image forming apparatus and the mobile device as a transmission destination. In other words, any one of the image forming apparatus and the mobile device is selected as a destination of the job target that is transformed by the transforming method set in operation 3402, and information for transmission, for example, an email address, is set.

In operation 3404, the mobile device stores a workform defining the input source, the transforming method, and the transmission destination, which are set above.

Meanwhile, when the user requests the image forming apparatus to perform a job but the image forming apparatus is already performing another job, the user may have to wait until the other job is finished. Accordingly, one or more exemplary embodiments provide a method of reserving a job by using a BYOD service.

Figure 35:
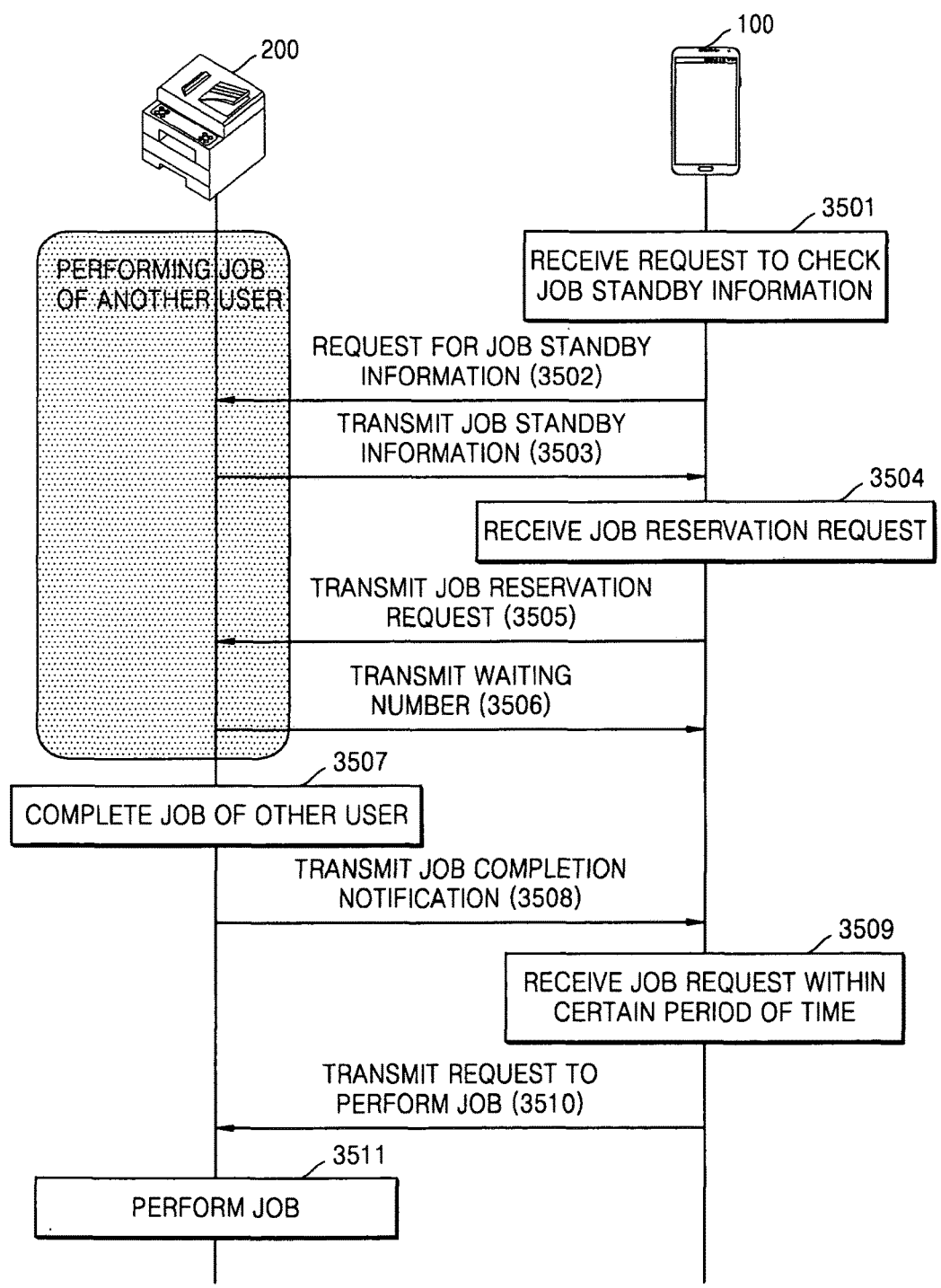
FIGS. 35 through 37 are diagrams describing a method of reserving a job by using a BYOD service, according to an exemplary embodiment.
Figure 36:
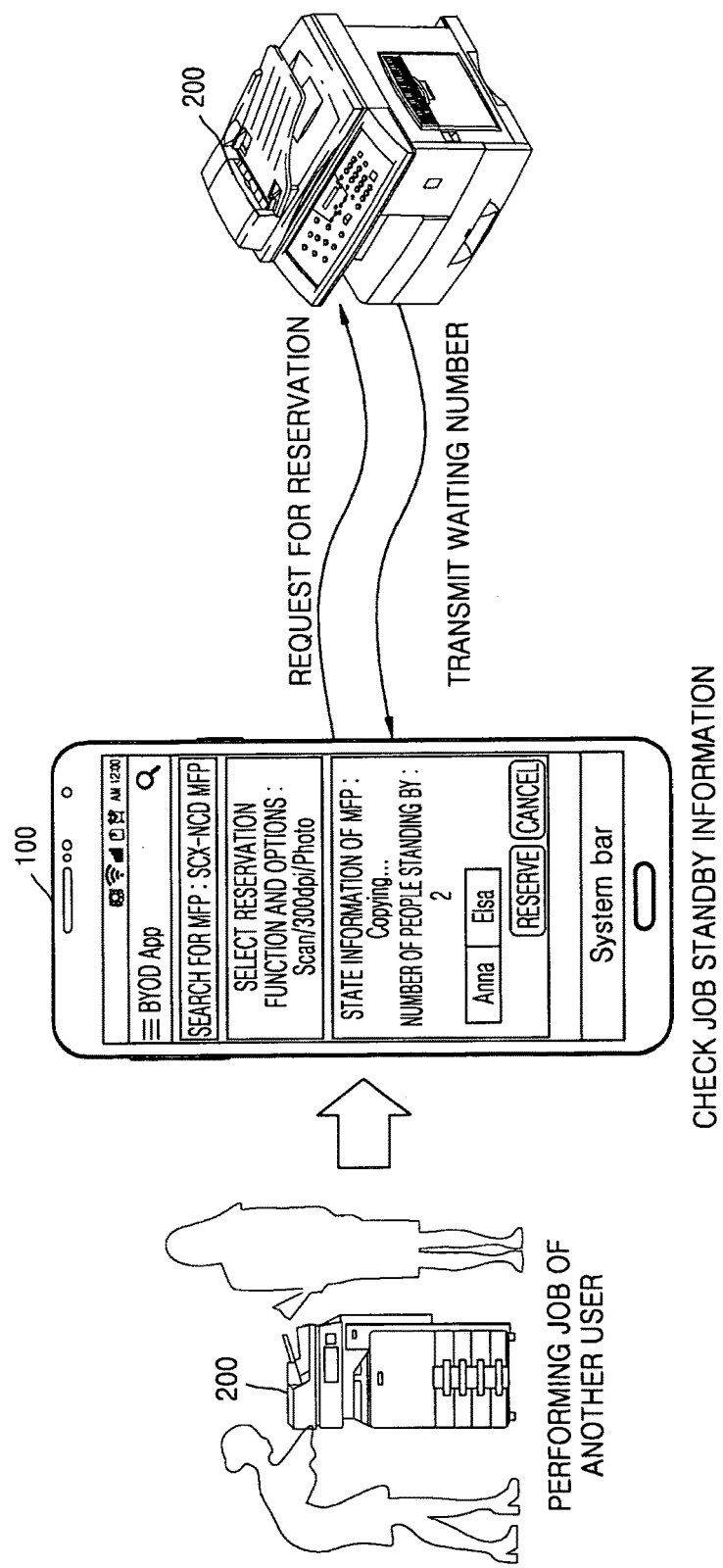
Figure 37:
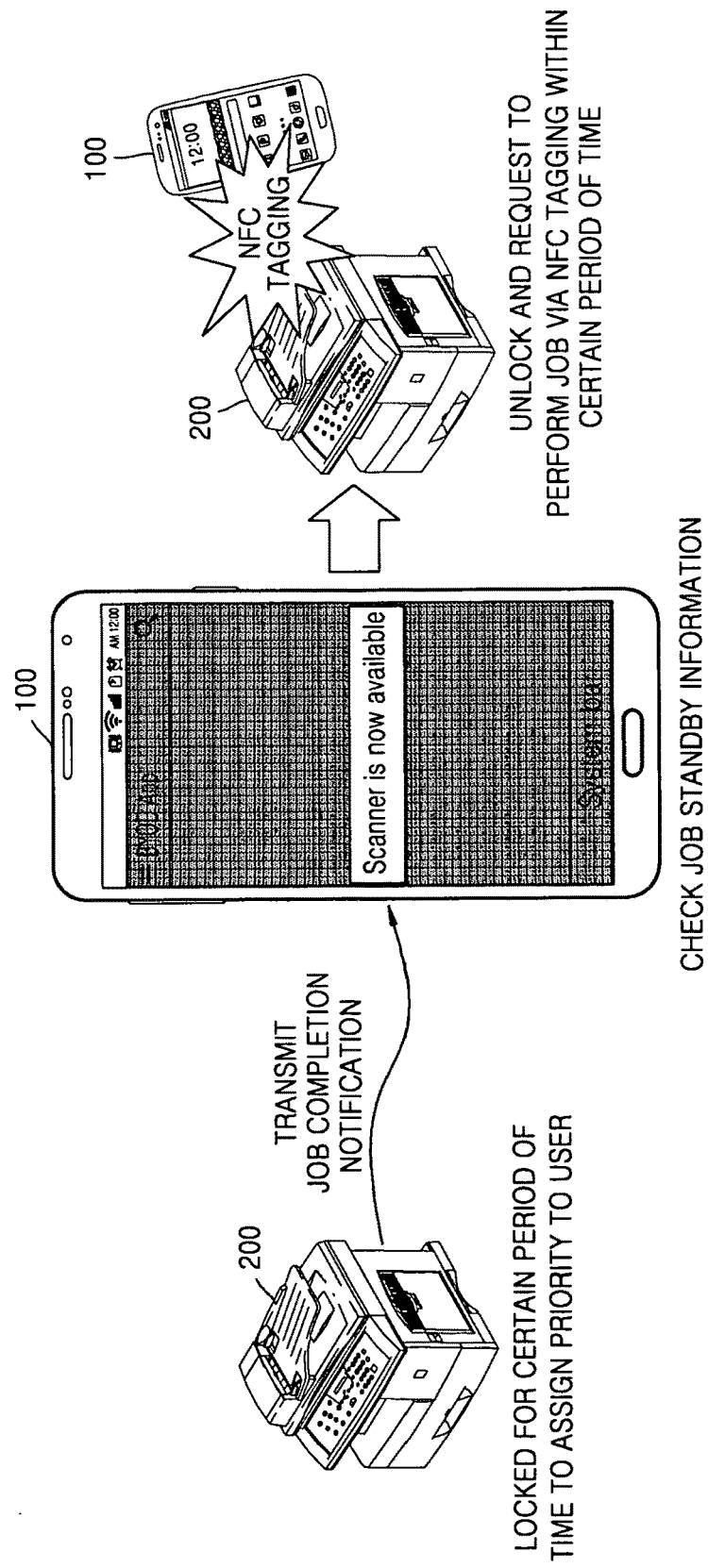

FIGS. 35 through 37 are diagrams for describing a method of reserving a job by using a BYOD service, according to an exemplary embodiment.

Referring to FIG. 35, in operation 3501, a mobile device 100 (similar to the mobile device 100 of FIG. 1) receives a request to check job standby information from a user. In other words, the user may request the mobile device 100 to check whether the user has to standby for a new job since an image forming apparatus 200 (similar to the image forming apparatus 200 of FIG. 1) is performing a current job.

In operation 3502, the mobile device 100 requests the image forming apparatus 200 for the job standby information, and in operation 3503, the image forming apparatus 200 transmits the job standby information to the mobile device 100. At this time, when the image forming apparatus 200 is performing the current job requested by another user, the image forming apparatus 200 may transmit the job standby information containing current status information of the image forming apparatus 200 and a number of people who requested job reservations to the mobile device 100.

Upon receiving a job reservation request from the user in operation 3504, the mobile device 100 transmits the job reservation request to the image forming apparatus 200 in operation 3505.

Upon receiving the job reservation request, the image forming apparatus 200 transmits a waiting number to the mobile device 100 in operation 3506.

When the image forming apparatus 200 completes the current job of the other user in operation 3507, the image forming apparatus 200 transmits a job completion notification to the mobile device 100 in operation 3508. Accordingly, a screen of the mobile device 100 displays a notification that the current job of the other user is completed.

Priority is given to a user who reserved a job for a certain period of time from a point of time when the mobile device 100 receives the job completion notification. Accordingly, during the certain period of time, the image forming apparatus 200 stands by even when another user transmits a job request, instead of the user who reserved a job. However, if the user who reserved a job does not transmit a job request for the certain period of time, the priority disappears.

When the mobile device 100 receives a job request from the user within the certain period of time from the point of time when the job completion notification is received in operation 3509, the mobile device 100 transmits a request to perform a job to the image forming apparatus 200 in operation 3501, and the image forming apparatus 200 performs the job in operation 3511.

FIGS. 36 and 37 illustrate in detail processes of performing the method of reserving a job by using a BYOD service.

Referring to FIG. 36, when am image forming apparatus 200 (similar to the image forming apparatus 200 of FIG. 1) is performing a job of another user, a user may check job standby information through a mobile device 100 (similar to the mobile device 100 of FIG. 1). Here, as shown in FIG. 36, the job standby information may contain information that the image forming apparatus 200 is performing a copy job and information that there are two other users who reserved jobs.

When the user selects "reserve" from a screen displayed on the mobile device 100, the mobile device 100 transmits a reservation request to the image forming apparatus 200, and in response, the image forming apparatus 200 transmits a waiting list to the mobile device 100.

Referring to FIG. 37, the image forming apparatus 200 transmits a notification to the mobile device 100 when the job of the other user is completed. A notification that the image forming apparatus 200 is currently available, such as "scanner is now available", may be displayed on the screen of the mobile device 100.

When the notification is transmitted to the mobile device 100, the image forming apparatus 200 is locked for a certain period of time after a point of time when the notification is transmitted, and priority is assigned to the user. If the user requests the image forming apparatus 200 to perform a job within the certain period of time by NFC-tagging the mobile device 100 to the image forming apparatus 200, the image forming apparatus 200 is unlocked and performs the job.

As described above, in a BYOD environment, the user may manipulate the image forming apparatus 200 by using the mobile device 100 via a BYOD service. At this time, various product types of image forming apparatuses may be connected to the mobile device 100. The image forming apparatuses connected to the mobile device 100 may have different UIs based on product types and model types. However, as described above, the mobile device 100 and the image forming apparatuses commonly perform a UP communication to support the BYOD service, regardless of the product types and model types of the image forming apparatuses. Accordingly, the user may control the image forming apparatuses performing the UP communication in the same method by using the UI provided by a BYOD application installed in the mobile device 100, regardless of different UIs of the image forming apparatuses.

Furthermore, a function that is not supported by the image forming apparatuses connected to the mobile device 100 but is supported by the mobile device 100 may be expanded by using resources of the mobile device 100, and thus a workflow that is not solely processable by the image forming apparatus may be processed. Hereinafter, a method of processing a workflow in which a function supported by the image forming apparatus 200 and a function supported by the mobile device 100 are combined, and the mobile device 100 performing the method will be described in detail.

Figure 38:
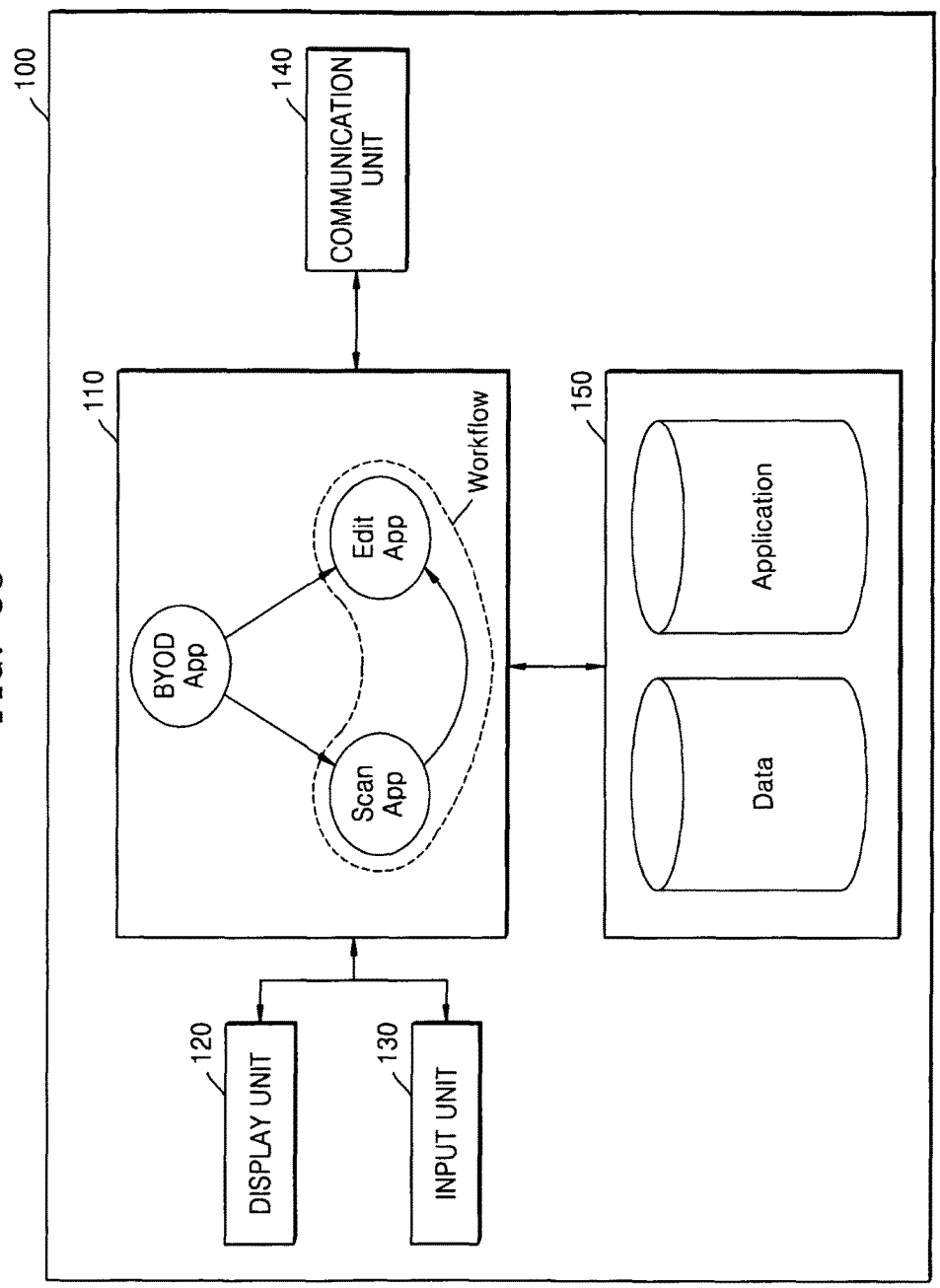
FIG. 38 is a diagram of a structure of a mobile device that processes a workflow, according to an exemplary embodiment.

FIG. 38 is a diagram of a structure of the mobile device 100 (e.g., of FIG. 1) that processes a workflow, according to an exemplary embodiment. It would be obvious to one of ordinary skill in the art that the mobile device 100 may further include general-purpose components other than those shown in FIG. 38.

Referring to FIG. 38, the mobile device 100 may include a controller 110 (similar to the controller 110 of FIG. 3A), a display unit 120 (similar to the controller 110 of FIG. 3A), an input unit 130 (similar to the controller 110 of FIG. 3A), a communication unit 140 (similar to the controller 110 of FIG. 3A), and a storage unit 150 (similar to the controller 110 of FIG. 3A).

The controller 110 may include, although not shown, at least one of a random access memory (RAM), a read-only memory (ROM), a central processing unit (CPU), and a graphics processing unit (GPU). The RAM, the ROM, the CPU, and the GPU may be connected to each other via a data bus.

The CPU may access the storage unit 150 and perform booting by using an operating system (OS) stored in the storage unit 150. Also, the CPU may perform various operations by using various programs, various contents, and various data stored in the storage unit 150.

The ROM may store a command set for system booting. For example, when power is supplied to the mobile device 100 as a turn-on command is input to the mobile device 100, the CPU may copy the OS stored in the storage unit 150 to the RAM according to a command stored in the ROM, and execute the OS to boot a system of the mobile device 100. When the booting is completed, the CPU may copy various programs stored in the storage unit 150 to the RAM, and perform various operations by executing the various programs copied to the RAM. When the booting is completed, the GPU may display a UI screen on a region of the display unit 120. In detail, the GPU may generate a screen including various objects, such as content, an icon, and a menu. The GPU may calculate attribute values, such as coordinate values, shapes, sizes, and colors, of the objects displayed on the screen, according to a layout of the screen. Then, the GPU may generate the screen in one of various layouts including the objects based on the calculated attribute values. The screen generated by the GPU may be provided to the display unit 120, and displayed on a region of the display unit 120.

The controller 110 may display a part of content stored in the storage unit 150 on the display unit 120. Alternatively, the controller 110 may perform a control operation corresponding to user manipulation that is input to the input unit 130.

The input unit 130 may receive various commands from a user. The input unit 130 may include at least one of a keypad (not shown), a touch panel (not shown), and a pen recognition panel (not shown).

The keypad may include various types of keys, such as a mechanical button and a wheel, which are formed on various regions of the mobile device 100, such as a front region, a side region, and a rear region of an outer body of the mobile device 100.

The touch panel may detect a touch input of the user, and output a touch event value corresponding to a touch signal. When the touch panel combines with a display panel to form a touch screen, the touch screen may be realized as any one of various types of touch sensors, such as an electrostatic type or a piezoelectric type. A touch event generated on the touch screen is generally generated by a finger of a person, but may alternatively be generated by a conductive object that applies a capacitance change.

The pen recognition panel may detect a proximity input or a touch input of a touch pen as the user uses the touch pen, and output a pen proximity event or a pen touch event.

The communication unit 140 may communicate with any type of external device according to any one of various communication methods. Also, as described above, the communication unit 140 may communicate with various product types or various model types of image forming apparatuses by using UP, such that the image forming apparatuses are controlled by using one BYOD application installed in the mobile device 100.

The storage unit 150 may store various types of programs and data required to operate the mobile device 100. In detail, the storage unit 150 may store control programs required for the controller 110 to control the mobile device 100, and data generated as the mobile device 100 operates. For example, the storage unit 150 may store information about image forming apparatuses connected to the mobile device 100, data received from the image forming apparatuses, workflows pre-defined by the user in the mobile device 100, and data about various UP commands corresponding to user inputs. Also, the storage unit 150 may store the BYOD application and functional applications corresponding to functions included in the workflows. For example, the storage unit 150 may store functional applications for executing functions supported by image forming apparatuses connected to the mobile device 100, and various types of applications executing functions of the mobile device 100.

When the user requests a BYOD service through the input unit 130 of the mobile device 100, the controller 110 may bring and execute the BYOD application from the storage unit 150. The controller 110 that executes the BYOD application may bring a workflow pre-determined by the user from the storage unit 150, display the workflow on the display unit 120, and enable the user to select the workflow through the input unit 130. At least one function supported by the image forming apparatus 200 and at least one function supported by the mobile device 100 are combined in the workflow. The function supported by the mobile device 100 included in the workflow may not be supported by the image forming apparatus 200. According to control of the controller 110, the communication unit 140 may connect the image forming apparatus 200 and the mobile device 100, which are used to process the workflow. The controller 110 may execute the functions included in the workflow based on an order of processing the functions included in the workflow. Here, the controller 110 may execute a function after another function from earlier in the order is completed.

For example, when the user who requested for the BYOD service selects a workflow in which a scanning function of the image forming apparatus 200 and an editing function of the mobile device 100 are combined in the stated order from the mobile device 100, the controller 110 executing the BYOD application may execute the workflow as pre-determined by the user, as shown in FIG. 38. Accordingly, in order to connect the image forming apparatus 200 having the scanning function to the mobile device 100, the communication unit 140 may perform the discovery process, the pairing process, and the event registration process described above. When the image forming apparatus 200 that is used to execute the workflow is connected via a UP communication and the scanning function is executed, the controller 110 may automatically execute the editing function based on the stated order stored in the workflow. The controller 110 controls the image forming apparatus 200 connected to the mobile device 100 so as to not only execute a function supported by the image forming apparatus 200, such as the scanning function, but also to execute a function of the mobile device 100, such as the editing function, by using resources of the mobile device 100, thereby processing the workflow requested by the user.

Figure 39:
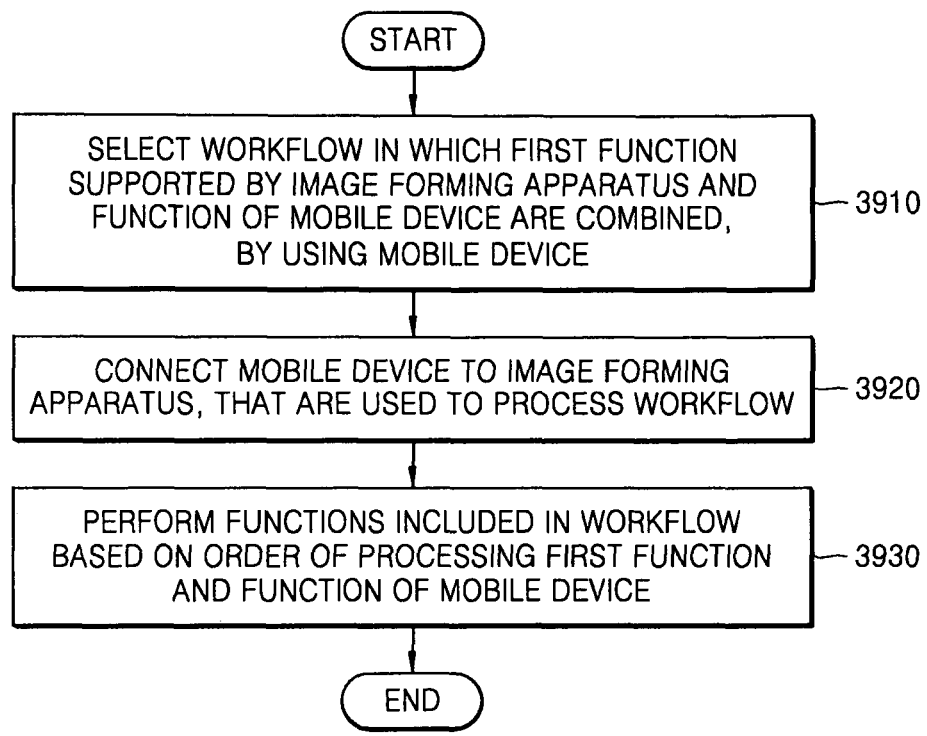
FIG. 39 is a flowchart of a method of processing a workflow, according to an exemplary embodiment.

FIG. 39 is a flowchart of a method of processing a workflow, according to an exemplary embodiment. Details about a mobile device 100 (e.g., of FIG. 1) that processes a workflow, which have been described above, may be applied to the method of FIG. 39, even if not explicitly mentioned.

In operation 3910, the mobile device 100 may receive an input of selecting a workflow in which a first function supported by an image forming apparatus 200 (e.g., of FIG. 1) and a function of the mobile device 100 are combined. In other words, a user of the mobile device 100 may select the workflow by using the mobile device 100. At this time, the mobile device 100 is executing a BYOD application according to a request of the user for a BYOD service, and receives the input of selecting the workflow according to execution of the BYOD application. The function of the mobile device 100 included in the workflow may be optionally or selectively supported by the image forming apparatus 200.

In operation 3920, the mobile device 100 may be connected to the image forming apparatus 200 that is used to process the workflow. The mobile device 100 may be connected to the image forming apparatus 200 by performing the discovery process, the pairing process, and the event registering process described above.

In operation 3930, the mobile device 100 executes the first function and the function based on an order of processing the first function and the function. The mobile device 100 may perform a function after another function in a previous order is completed, based on the order of processing the first function and the function.

For example, when an order of processing the first function is prior to an order of processing the function, the mobile device may receive a result of performing the first function from the image forming apparatus 200 in response to a command to perform the first function, and then perform the function based on the received result. At this time, in order to receive the result of performing the first function, the mobile device 100 may transmit the command to the image forming apparatus 200 based on capability information about the first function, which is provided from the image forming apparatus 200. Also, when the function is performed based on the result, the mobile device 100 may perform the function in connection with an application executable in the mobile device 100.

Hereinafter, a method of processing a workflow in which at least one function supported by the image forming apparatus 200 and at least one function supported by the mobile device are combined, and the mobile device 100 performing the method will be described in detail with reference to workflows.

Figure 40:
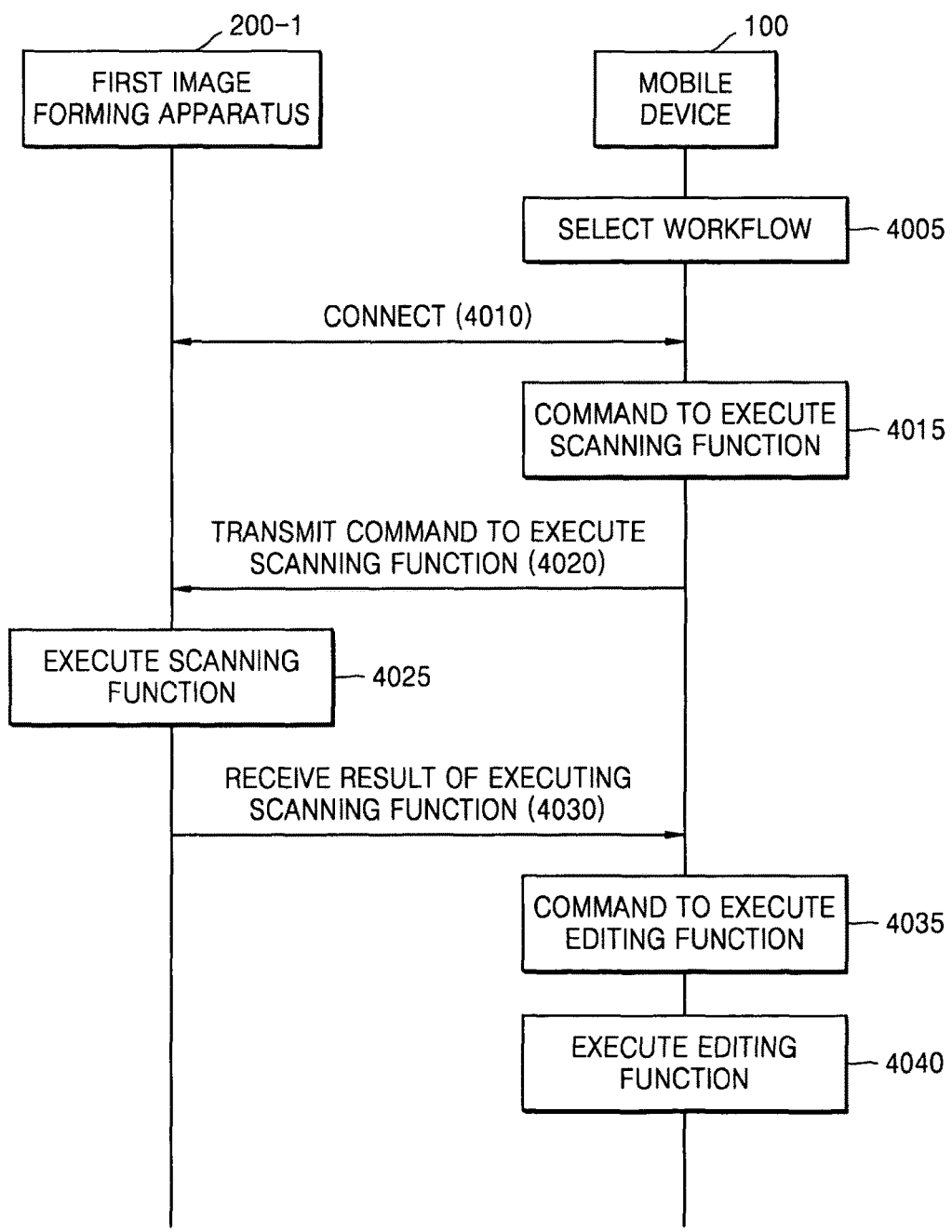
FIG. 40 is a diagram of operations of processing a workflow in which a scanning function of a first image forming apparatus and an editing function of a mobile device are combined, according to an exemplary embodiment.

FIG. 40 is a diagram of operations of processing a workflow in which a scanning function of a first image forming apparatus 200-1 (similar to the image forming apparatus 200 of FIG. 1) and an editing function of a mobile device 100 (similar to the mobile device 100 of FIG. 1) are combined, according to an exemplary embodiment. At least one image forming apparatus used to process the workflow may be connected to the mobile device 100, and for convenience of description, it is assumed that the first image forming apparatus 200-1 is connected to the mobile device 100.

When processing of the scanning function of the first image forming apparatus 200-1 is prior to processing of the editing function of the mobile device 100 in the order defined in the workflow, the workflow may be processed as follows.

In operation 4005, the mobile device 100 may execute a BYOD application according to a BYOD service request, and receive an input of selecting the workflow in which the scanning function of the first image forming apparatus 200-1 and the editing function of the mobile device 100 are combined, from a user.

In operation 4010, the mobile device 100 may be connected to the first image forming apparatus 200-1 that is used to process the workflow. In order to be connected to the first image forming apparatus 200-1 that is capable of executing the scanning function, the mobile device 100 may perform the discovery process, the pairing process, and the event registering process described above.

Figure 41:
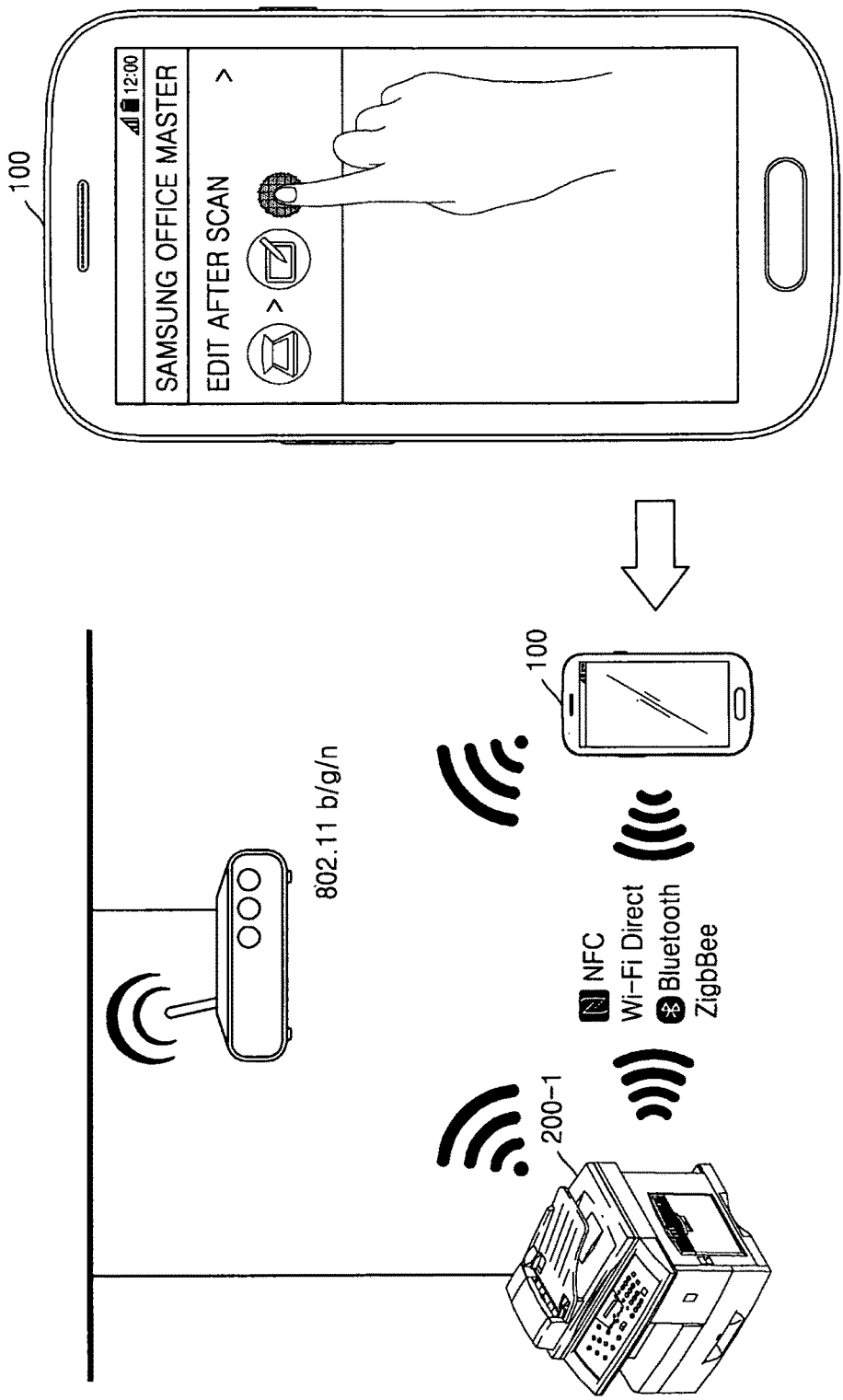
FIG. 41 is a diagram describing connecting of a first image forming apparatus and a mobile device, which are used to process a workflow, as the mobile device selects the workflow.

FIG. 41 is a diagram describing connecting of a first image forming apparatus 200-1 (similar to the image forming apparatus 200 of FIG. 1) and a mobile device 100 (similar to the mobile device 100 of FIG. 1), which are used to process a workflow, as the mobile device 100 selects the workflow.

When a user requests a BYOD service, the mobile device 100 executing a BYOD application may display a workflow in a pre-defined form. For example, as shown in FIG. 41, a workflow of "edit after scan" may be displayed. When there are a plurality of pre-defined workflows, a list of the pre-defined workflows may be displayed.

The user may view the list of pre-defined workflows displayed on the mobile device 100, and select one of the workflows. As shown in FIG. 41, the user may touch the workflow displayed on the mobile device 100 to select the workflow.

In order to process the workflow selected by the user, the mobile device 100 executing the BYOD application may be connected to the first image forming apparatus 200-1 executing a function included in the workflow. In order to be connected to the first image forming apparatus 200-1 capable of executing the scanning function, the mobile device 100 may perform the discovery process, the pairing process, and the event registering process described above. If the mobile device 100 and the first image forming apparatus 200-1 are connected for the first time, a registering process of registering each other is performed, and if not, the mobile device 100 and the first image forming apparatus 200-1 may be connected to each other without a separate registering process. Then, the mobile device 100 may collect information about the first image forming apparatus 200-1 to prepare to process the workflow.

Referring back to FIG. 40, in operation 4015, the mobile device 100 may receive a command to execute the scanning function of the first image forming apparatus 200-1, which has a priority, based on an order of processing jobs included in the workflow. In other words, the mobile device 100 executing the BYOD application may receive the command to execute the scanning function by executing a scan application installed in the mobile device 100 such that the scanning function is executed in the first image forming apparatus 200-1 by controlling the first image forming apparatus 200-1.

In operation 4020, the mobile device 100 may transmit the command to execute the scanning function to the first image forming apparatus 200-1. When the command to execute the scanning function is received by executing the scan application installed in the mobile device 100, a UP command corresponding to the command to execute the scanning function may be transmitted to the first image forming apparatus 200-1 according to a UP communication method such that the first image forming apparatus 200-1 supporting the scanning function is controlled by the mobile device 100 executing the BYOD application.

In operation 4025, the first image forming apparatus 200-1 may execute the scanning function. The first image forming apparatus 200-1 may check the UP command received from the mobile device 100, and execute a function corresponding to the UP command.

In operation 4030, the mobile device 100 may receive a result of executing the scanning function. In other words, the mobile device 100 may receive a scanned document obtained by the first image forming apparatus 200-1 according to a UP communication method.

Figure 42:
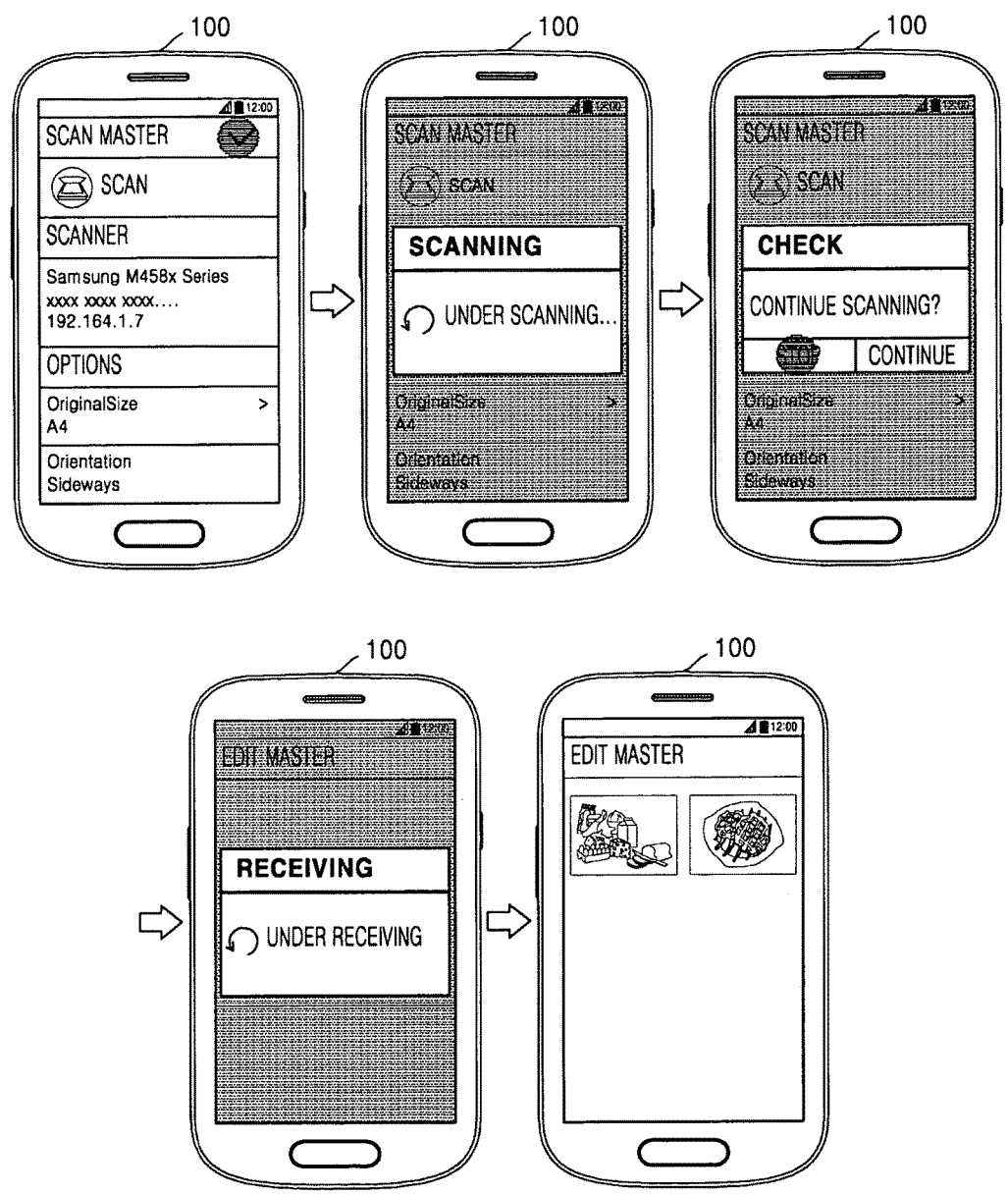
FIG. 42 is a diagram of a process of receiving a result of executing a scanning function of a first image forming apparatus after a mobile device executes the scanning function.

FIG. 42 is a diagram of a process of receiving the result of executing the scanning function of a first image forming apparatus 200-1 (similar to the image forming apparatus 200 of FIG. 1) after a mobile device 100 (similar to the mobile device 100 of FIG. 1) executes the scanning function.

In order to process the workflow of "edit after scan" selected by the user, the mobile device 100 executing the BYOD application may first execute the scanning function of the first image forming apparatus 200-1 based on the order of jobs included in the workflow.

Referring to FIG. 42, the mobile device 100 executing the BYOD application may execute the scan application installed in the mobile device 100 in order to control the first image forming apparatus 200-1 supporting the scanning function. The mobile device 100 may display a UI screen for receiving the command to execute the scanning function as an execution screen of the scan application, based on capability information regarding the scanning function provided from the first image forming apparatus 200-1. For example, the execution screen of the scan application may be configured by reflecting the capability information currently provided by the first image forming apparatus 200-1, such as a manuscript size, a manuscript direction, double-side scanning, and a color mode. The mobile device 100 may receive the command to execute the scanning function from the user who checked the execution screen of the scan application.

When the command to execute the scanning function is input to the mobile device 100, a UP command containing scan options set by the user, a storage location of a scanned document, and a file name, may be transmitted to the first image forming apparatus 200-1 executing the scanning function.

The first image forming apparatus 200-1 may execute the scanning function according to the UP command. The first image forming apparatus 200-1 may transmit a status of executing the scanning function to the mobile device 100 while executing the scanning function, according to a web socket method. For example, while the scanning function is executed by the first image forming apparatus 200-1, the mobile device 100 may display a pop-up screen indicating that scanning is being performed. When there are several pages to be scanned by the first image forming apparatus 200-1, the mobile device 100 may display a pop-up screen enquiring the user whether to scan a next page.

When the executing of the scanning function is completed in the first image forming apparatus 200-1, the mobile device 100 may receive the result of executing the scanning function. While receiving the scanned document from the first image forming apparatus 200-1, the mobile device 100 may display a pop-up screen indicating that the scanned document is being received.

After the scanned document is received from the first image forming apparatus 200-1, the mobile device 100 may determine that the scanning function included in the workflow of "edit after scan" is completed, and execute an edit application installed in the mobile device 100 in order to execute an editing function. An execution screen of the edit application, which is displayed on the mobile device 100, may automatically display the scanned document received from the first image forming apparatus 200-1, thereby preparing to execute the editing function.

Referring back to FIG. 40, in operation 4035, the mobile device 100 may receive a command to execute the editing function on the scanned document. In other words, the mobile device 100 executing the BYOD application may receive the command to execute the editing function by executing the edit application installed in the mobile device 100. The editing function of the mobile device 100 may not be supported by the first image forming apparatus 200-1. When the scanned document is received from the first image forming apparatus 200-1, the mobile device 100 may determine that the scanning function included in the workflow is completed, and receive the command to execute the editing function that is performed after the scanning function from the user.

In operation 4040, the mobile device 100 may execute the editing function on the scanned document received from the first image forming apparatus 200-1, according to the command to execute the editing function. Accordingly, the mobile device 100 may generate an edited document obtained by executing the editing function on the scanned document.

Figure 43:
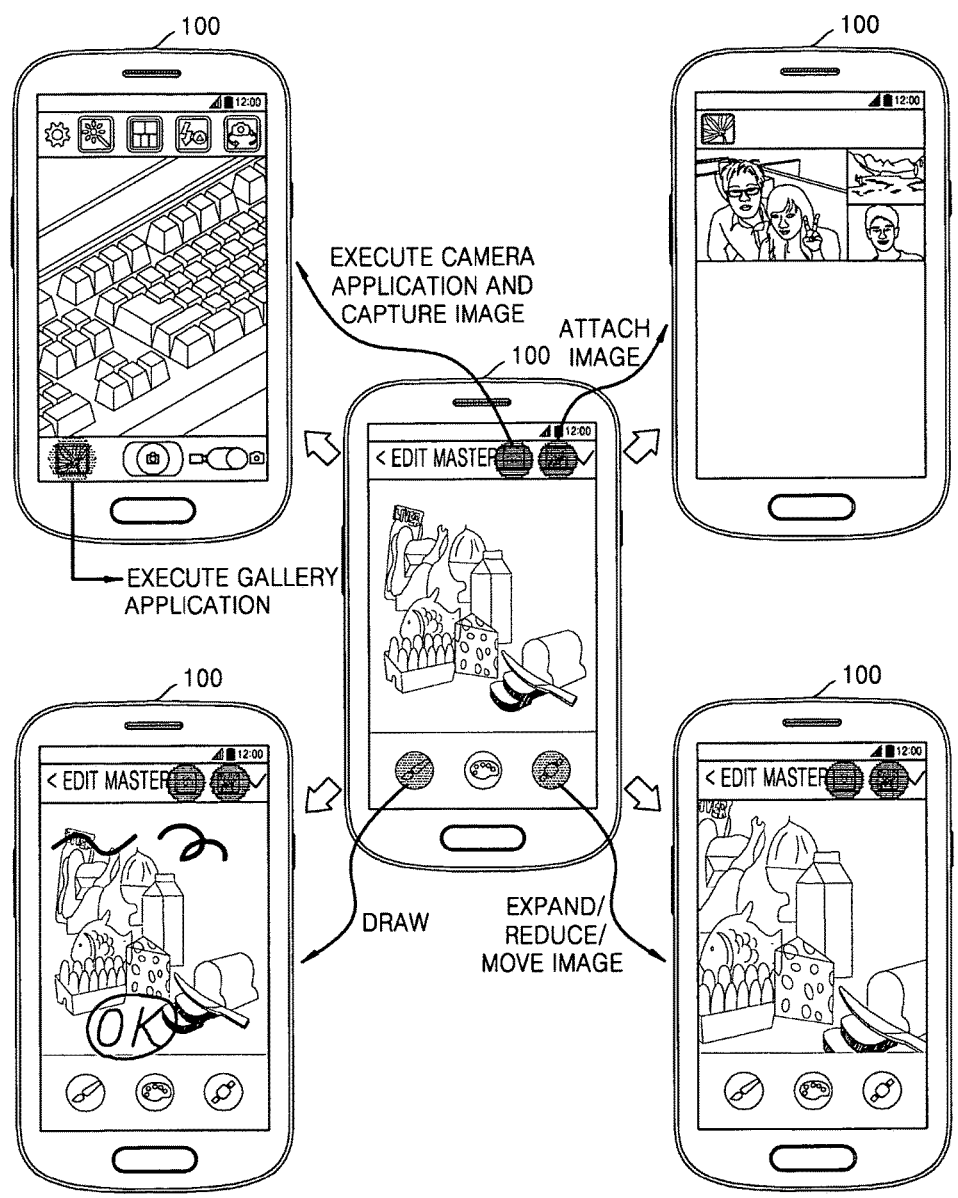
FIG. 43 is a diagram describing executing of an editing function of a mobile device by using a resource of the mobile device.

FIG. 43 is a diagram describing executing of the editing function of a mobile device 100 (similar to the mobile device 100 of FIG. 1) by using a resource of the mobile device 100.

As shown in FIG. 43, the user may edit the scanned document by using various edit tools displayed together with the scanned document, on the execution screen of the edit application of the mobile device 100. An application interworking with the edit tools included in the execution screen of the edit application may be an application embedded in the mobile device 100 or installed in the mobile device 100 by the user. For example, a camera tool included in the execution screen of the edit application may interwork with a camera application, a drawing tool may interwork with a drawing broad application, and an image attaching tool may interwork with a gallery application.

Figure 44:
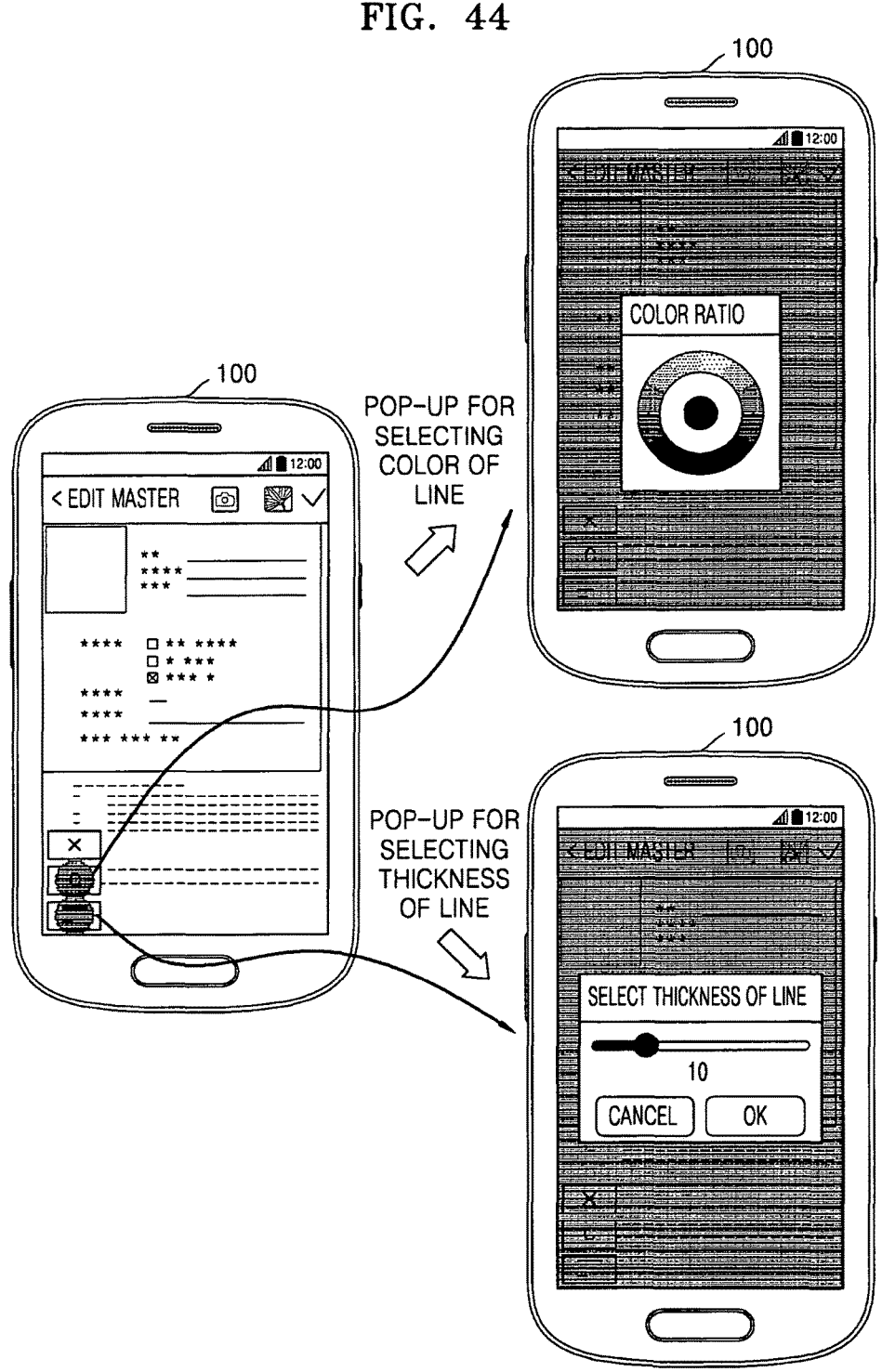
FIG. 44 is a diagram describing a manipulation interface regarding drawing when an editing function of a mobile device is executed.

FIG. 44 is a diagram describing a manipulation interface regarding drawing when the editing function of a mobile device 100 (similar to the mobile device 100 of FIG. 1) is executed.

When the drawing tool is selected from the execution screen of the edit application of FIG. 43, the manipulation interface regarding drawing may be displayed as shown in FIG. 44. The user may use the manipulation interface to draw a line or a shape on an image of a scanned document. The manipulation interface may display a pop-up screen for selecting a color of a line and a pop-up screen for selecting a thickness of a line. When the drawing tool is to be ended, an "X" button on the manipulation interface may be touched to end the drawing tool.

Figure 45:
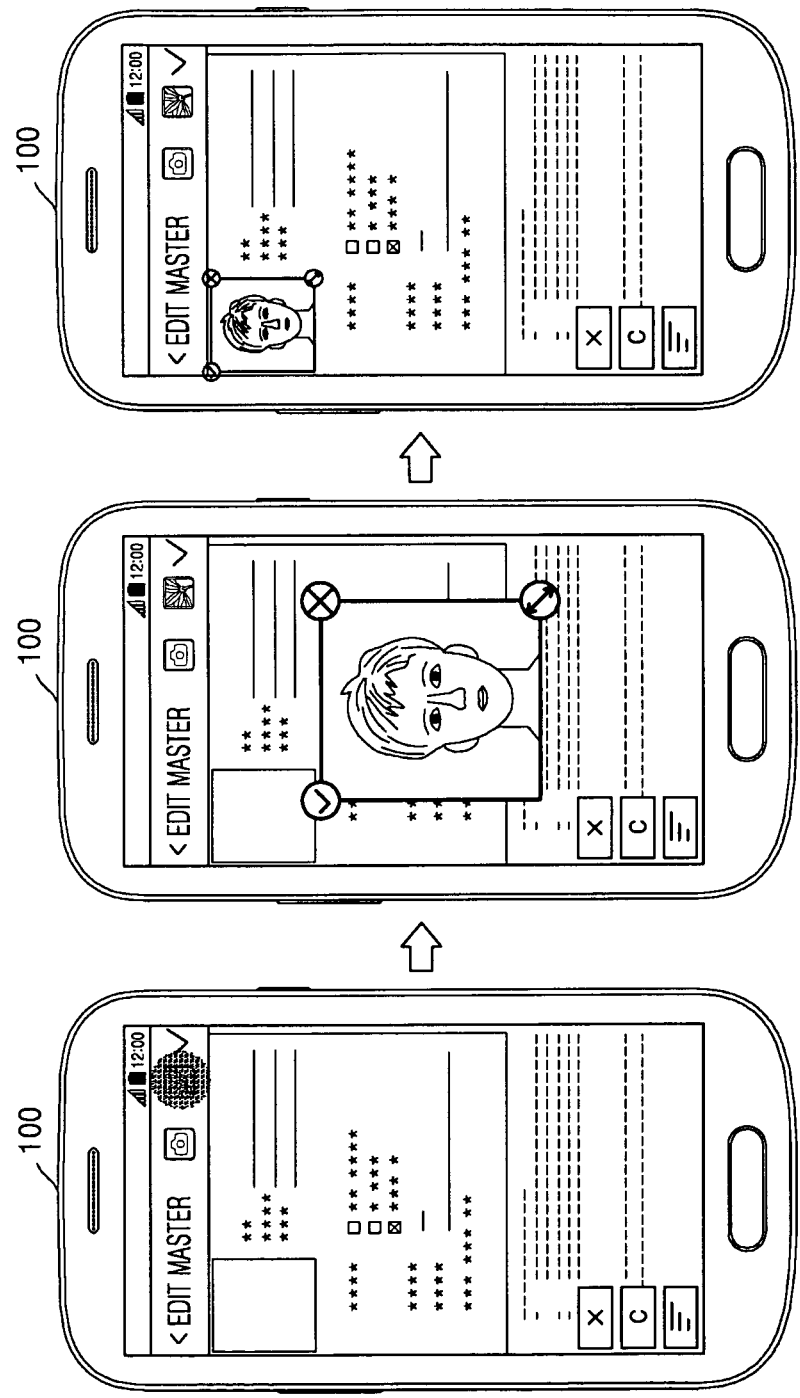
FIG. 45 is a diagram describing a manipulation interface regarding attaching an image when an editing function of a mobile device is executed.

FIG. 45 is a diagram describing a manipulation interface 4502 regarding attaching an image when the editing function of a mobile device 100 (similar to the mobile device 100 of FIG. 1) is executed.

When the image attaching tool is selected from the execution screen of the edit application, the gallery application interworking with the image attaching tool may be executed. The user may select one of images stored in the gallery application. When an image 4504 is selected, the manipulation interface regarding attaching an image may be displayed as shown in FIG. 44. The user may use the manipulation interface to attach the selected image to a scanned document 4506. The manipulation interface may be displayed together with the selected image, at an edge of the selected image. For example, as shown in FIG. 45, a location of the image may be adjusted by lengthily pressing a location adjusting button at a right bottom of the image, and the image may be inserted to the adjusted location by pressing an OK button at a left top of the image. Alternatively, the image may be removed by pressing a remove button at the right top of the image. After the image is attached, the scanned document with the attached image may be stored.

A size or location of a document to be edited may be adjusted by using an image expanding/reducing/moving tool included in the execution screen of the edit application.

As a result, the workflow of "edit after scan" is unable to be processed by the first image forming apparatus 200-1 alone, but by using the edit application and various applications interworking with an edit tool, which correspond to resources of the mobile device 100, the workflow may be processed.

Figure 46:
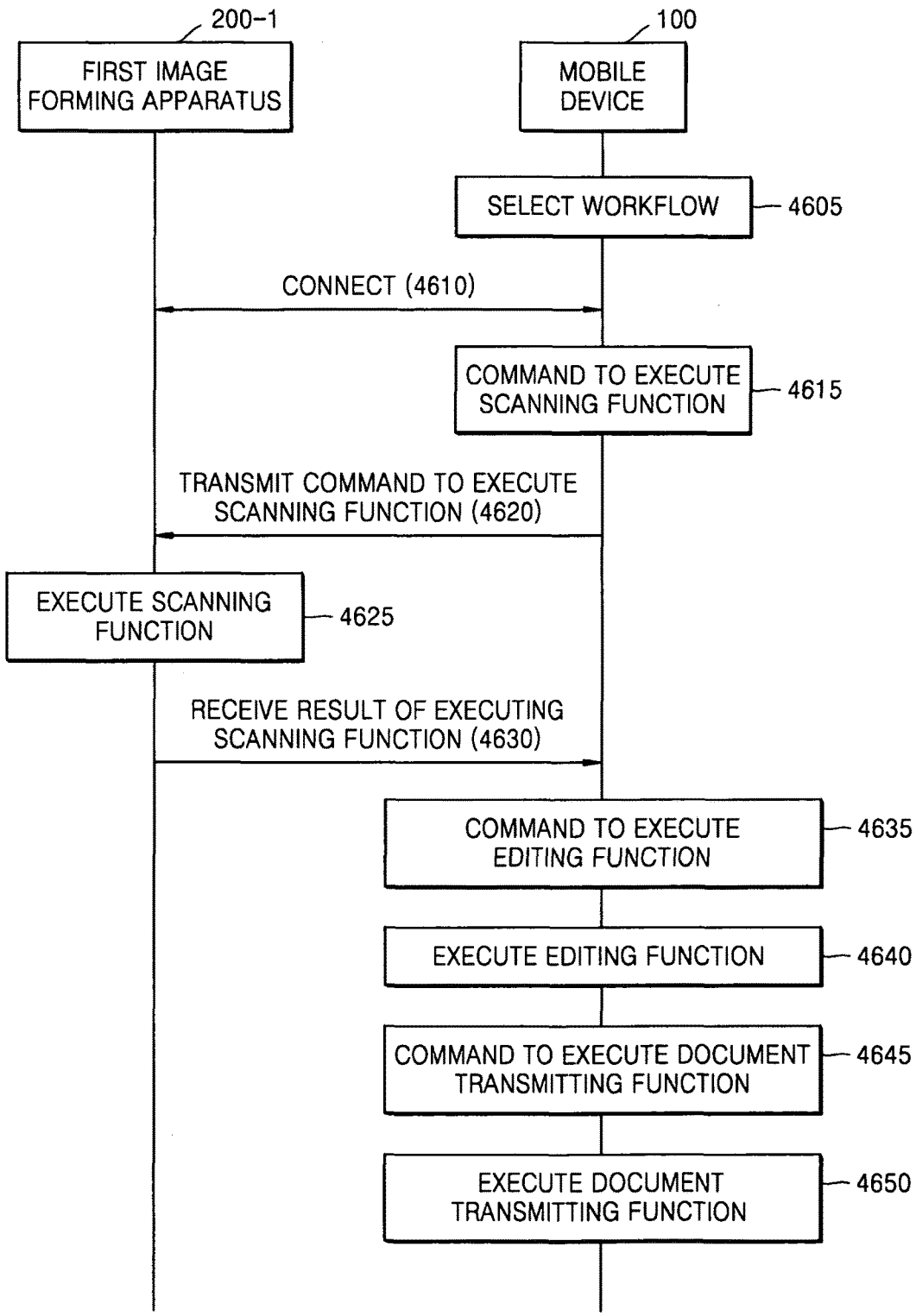
FIG. 46 is a diagram of processes of processing a workflow in which a scanning function of a first image forming apparatus, and an editing function and a document transmitting function of a mobile device are combined, according to an exemplary embodiment.

FIG. 46 is a diagram of processes of processing a workflow in which a scanning function of the first image forming apparatus 200-1 (similar to the image forming apparatus 200 of FIG. 1), and an editing function and a document transmitting function of a mobile device 100 (similar to the mobile device 100 of FIG. 1) are combined, according to an exemplary embodiment. Comparing the workflows of FIGS. 40 and 46, the workflow of FIG. 46 further includes the document transmitting function of the mobile device 100. Such a workflow of FIG. 46 may be named "edit and transmit after scan".

The mobile device 100 may support both the editing function and the document transmitting function that may not be supported by the first image forming apparatus 200-1. When the scanning function of the first image forming apparatus 200-1 is performed first and the document transmitting function of the mobile device 100 is performed last, the workflow may be processed as follows.

Since operations 4605 through 4640 of FIG. 46 correspond to operations 4005 through 4040 of FIG. 40, details thereof are not provided again, and the processes from operation 4645 is described.

In operation 4645, the mobile device 100 may receive a command to execute the document transmitting function of the mobile device 100, which is performed last based on the order of performing jobs included in the workflow. In other words, the mobile device 100 executing the BYOD application may receive the command to execute the document transmitting function by executing a document transmitting application installed in the mobile device 100 such that the document transmitting function is executed. The mobile device 100 may receive the command to execute the document transmitting function on an edited document obtained by editing the scanned document using the editing function of the mobile device 100.

In operation 4650, the mobile device 100 may execute the document transmitting function by transmitting the edited document to an external device. In other words, the mobile device 100 may execute the document transmitting function on the edited document.

Figure 47:
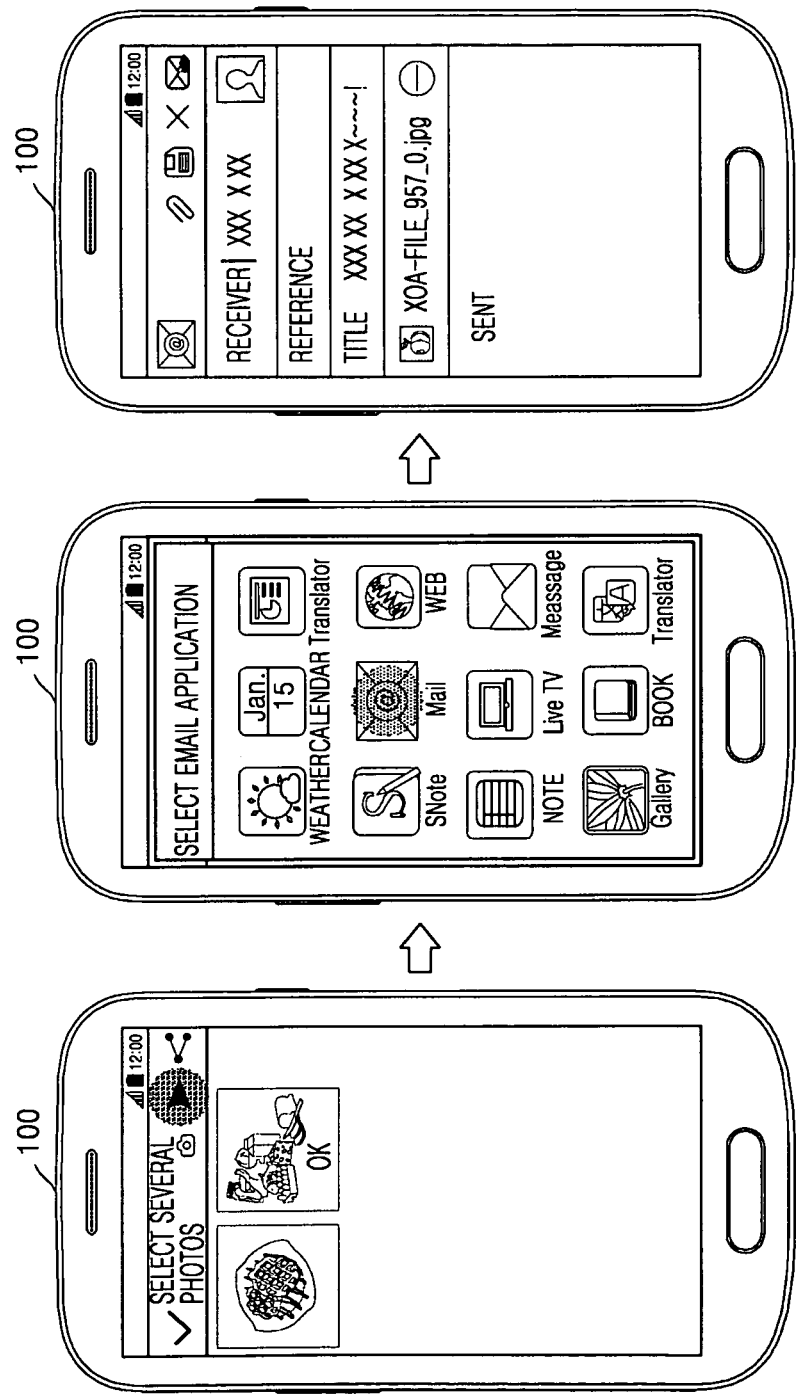
FIG. 47 is a diagram of a process of executing a document transmitting function of a mobile device regarding an edited document obtained by editing a scanned document.

FIG. 47 is a diagram of a process of executing a document transmitting function of a mobile device 100 (similar to the mobile device 100 of FIG. 1) regarding an edited document obtained by editing a scanned document.

The mobile device 100 executing a BYOD application may display a screen for selecting a document to be transmitted when document editing is ended, in order to process a workflow of "edit and transmit after scan" selected by a user. The user may check the edited document from the screen for selecting a document to be transmitted. When the user selects the edited document from the mobile device 100 and inputs a command to execute the document transmitting function, various applications installed in the mobile device 100 may be displayed. As shown in FIG. 47, the user may select an email application in order to transmit the edited document. The mobile device 100 may transmit the edited document by using the email application, and display a document transmittance status.

As a result, the workflow of "edit and transmit after scan" is unable to be solely processed by the first image forming apparatus 200-1, but may be processed by using an edit application and a document transmitting application, which correspond to resources of the mobile device 100.

Figure 48:
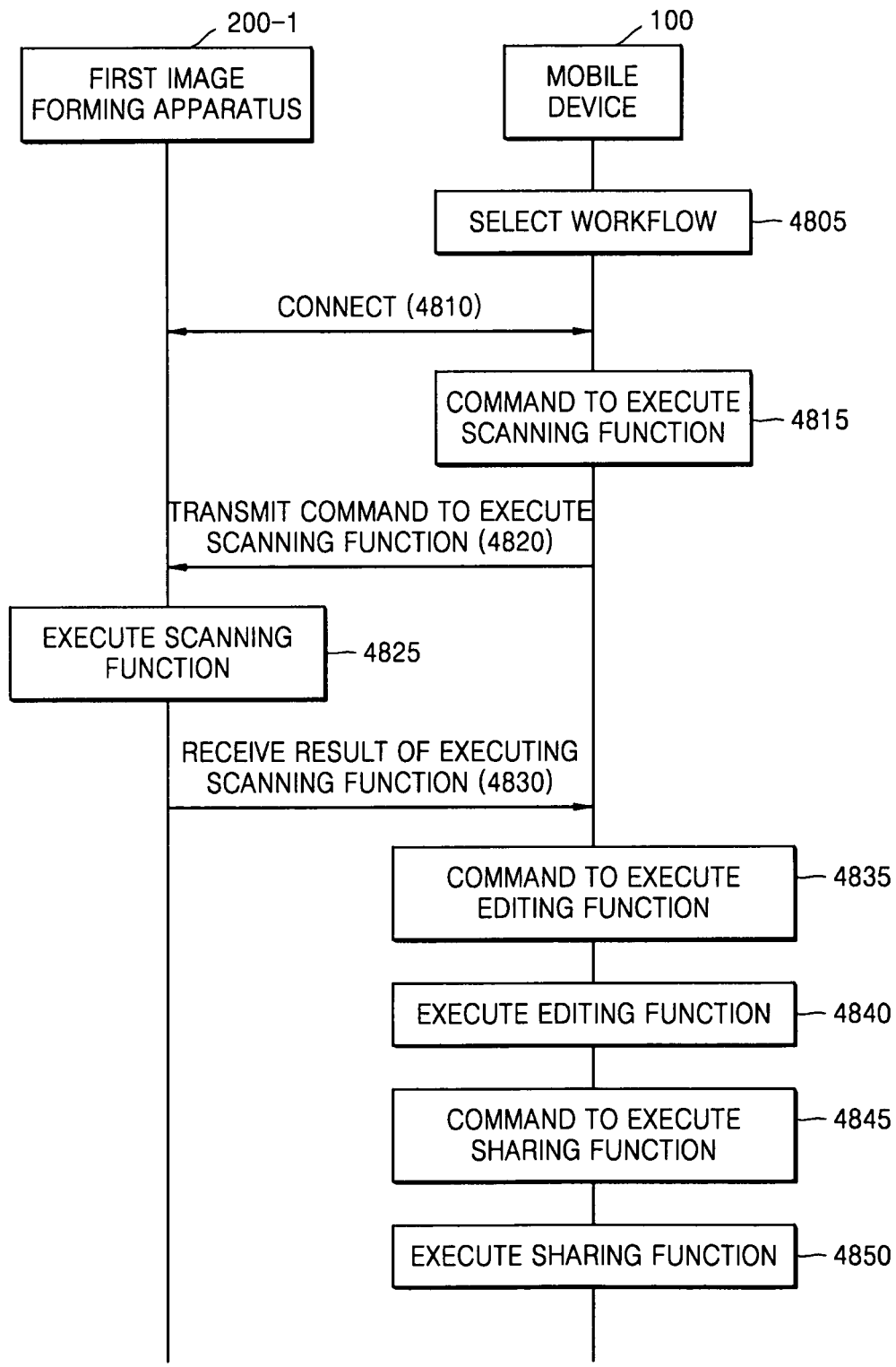
FIG. 48 is a diagram of processes of processing a workflow in which a scanning function of a first image forming apparatus, and an editing function and a sharing function of a mobile device are combined, according to an exemplary embodiment.

FIG. 48 is a diagram of processes of processing a workflow in which a scanning function of a first image forming apparatus 200-1 (similar to the image forming apparatus 200 of FIG. 1), and an editing function and a sharing function of a mobile device 100 (similar to the mobile device 100 of FIG. 1) are combined, according to an exemplary embodiment. Comparing the workflow of FIG. 48 with the workflow of FIG. 40, the workflow of FIG. 48 further includes the sharing function of the mobile device 100. Such a workflow may be named "edit and share after scan".

The mobile device 100 may support the editing function and the sharing function that are not supported by the first image forming apparatus 200-1. When the scanning function of the first image forming apparatus 200-1 is performed first and the sharing function of the mobile device 100 is performed last, the workflow may be processed as follows.

Since operations 4805 through 4840 of FIG. 48 correspond to operations 4005 through 4040 of FIG. 40, details thereof are not provided again, and the processes from operation 4845 will be described.

In operation 4845, the mobile device 100 may receive a command to execute the sharing function of the mobile device 100, which is performed last based on an order of processing functions included in the workflow. In other words, the mobile device 100 executing a BYOD application may receive the command to execute the sharing function by executing a sharing application installed in the mobile device 100, such that the sharing function is executed. The mobile device 100 may receive the command to execute the sharing function on an edited document that obtained by editing a scanned document by using the editing function of the mobile device 100.

In operation 4850, the mobile device 100 may execute the sharing function to share the edited document obtained by editing the scanned document by using the editing function. In other words, the mobile device 100 may execute the sharing function on the edited document.

Figure 49:
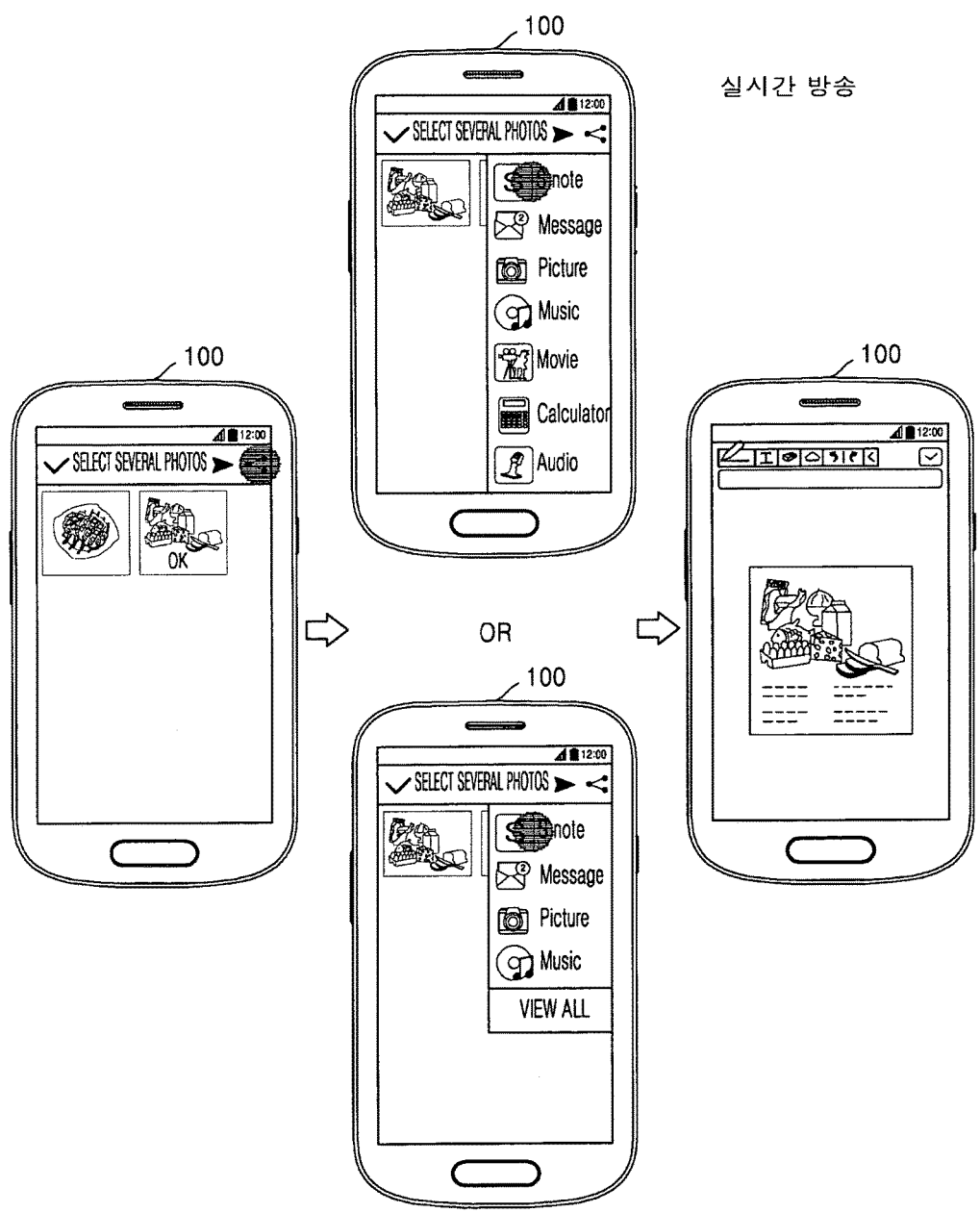
FIG. 49 is a diagram of a process of executing a sharing function of a mobile device regarding an edited document obtained by editing a scanned document.

FIG. 49 is a diagram of a process of executing a sharing function of a mobile device 100 (similar to the mobile device 100 of FIG. 1) regarding an edited document obtained by editing a scanned document.

The mobile device 100 executing a BYOD application may display a screen for selecting a document to be shared when document editing is ended, in order to process a workflow of "edit and share after scan" selected by a user. The user may check the edited document from the screen for selecting a document to be shared. When the user selects the edited document from the mobile device 100 and inputs a command to execute the sharing function, various sharing applications installed in the mobile device 100 may be displayed. As shown in FIG. 49, the user may select an "S note application" 4902 for transmitting and sharing a document, in order to share the edited document. Alternatively, the user may select the "S note application" 4902 according to a short-cut function that separately displays recently used sharing applications. The mobile device 100 may share the edited document with another mobile device (not shown) by using a sharing application.

As a result, the workflow of "edit and share after scan" is unable to be solely processed by the first image forming apparatus 200-1, but may be processed by using an editing application and a sharing application, which correspond to resources of the mobile device 100.

Figure 50:
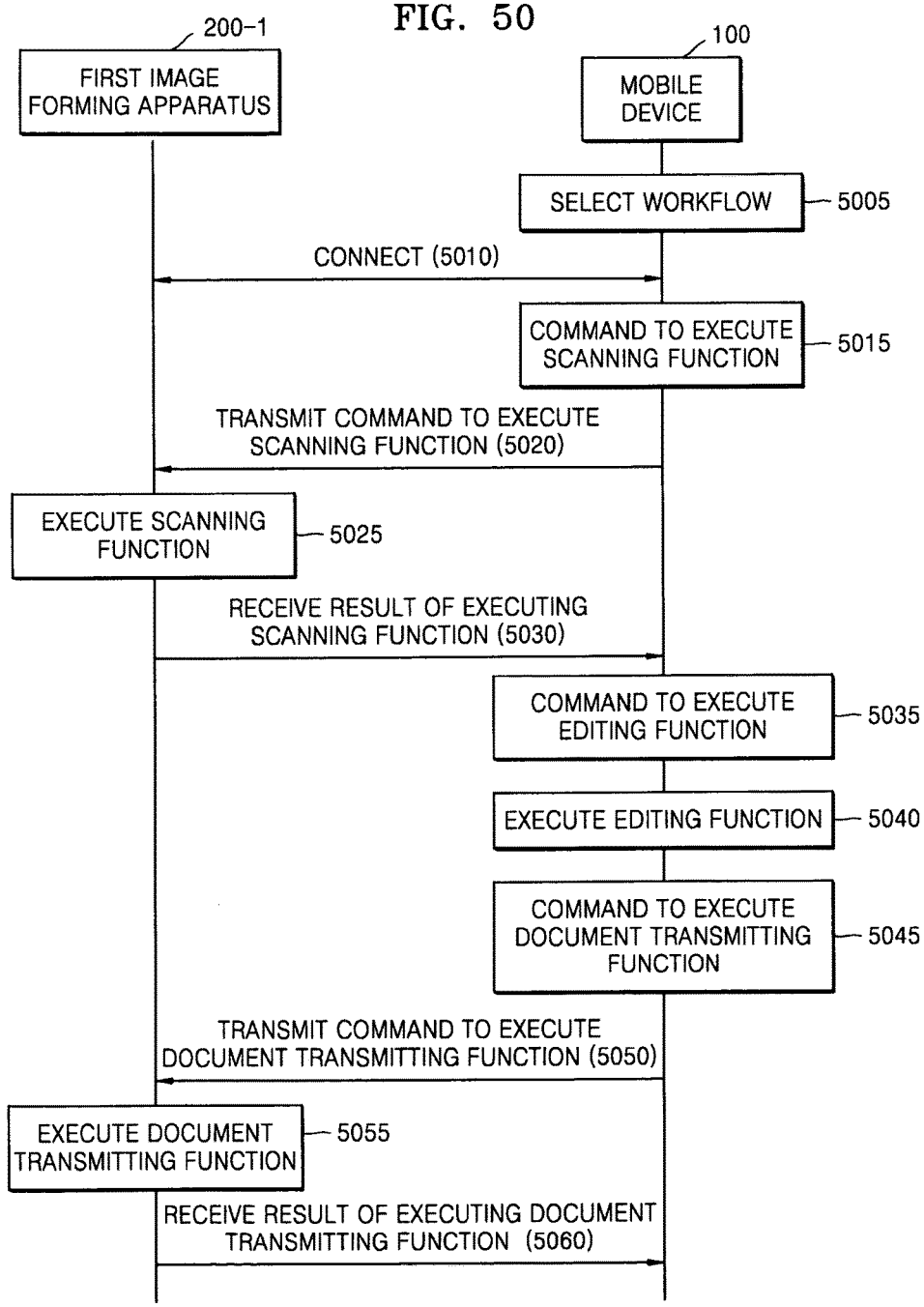
FIG. 50 is a diagram of processes of processing a workflow in which a scanning function of a first image forming apparatus, an editing function of a mobile device, and a document transmitting function of the first image forming apparatus are combined, according to an exemplary embodiment.

FIG. 50 is a diagram of processes of processing a workflow in which a scanning function of the first image forming apparatus 200-1 (similar to the image forming apparatus 200 of FIG. 1), an editing function of a mobile device 100 (similar to the mobile device 100 of FIG. 1), and a document transmitting function of the first image forming apparatus 200-1 are combined, according to an exemplary embodiment. Comparing the workflow of FIG. 50 with the workflow of FIG. 40, the workflow of FIG. 50 further includes the document transmitting function of the first image forming apparatus 200-1. Also, comparing the workflow of FIG. 50 with the workflow of FIG. 46, a subject that executes the document transmitting function is not the mobile device 100, but the first image forming apparatus 200-1. The workflow of FIG. 50 may be named "edit and proxy-transmit after scan".

The mobile device 100 may support the editing function that is not supported by the first image forming apparatus 200-1. When the scanning function of the first image forming apparatus 200-1 is performed first and the document transmitting function of the first image forming apparatus 200-1 is performed last, the workflow may be processed as follows.

Since operations 5005 through 5040 of FIG. 50 correspond to operations 4005 through 4040 of FIG. 40, details thereof are not provided again, and the processes from operation 5045 will be described.

In operation 5045, the mobile device 100 may receive a command to execute the document transmitting function of the first image forming apparatus 200-1, which is performed last, based on an order of processing functions included in the workflow. In other words, the mobile device 100 executing a BYOD application may receive the command the execute the document transmitting function by executing a document transmitting application installed in the mobile device 100, such that the document transmitting function is executed in the first image forming apparatus 200-1 by controlling the first image forming apparatus 200-1 supporting the document transmitting function. The mobile device 100 may receive the command to execute the document transmitting function of the first image forming apparatus 200-1 regarding an edited document obtained by editing a scanned document by using the editing function of the mobile device 100.

In operation 5050, the mobile device 100 may transmit the command to execute the document transmitting function to the first image forming apparatus 200-1. When the command to execute the document transmitting function is received by executing the document transmitting application installed in the mobile device 100, a UP command corresponding to the command to execute the document transmitting function may be transmitted to the first image forming apparatus 200-1 according to a UP communication method, such that the mobile device 100 executing the BYOD application controls the first image forming apparatus 200-1 supporting the document transmitting function.

In operation 5055, the first image forming apparatus 200-1 may execute the document transmitting function on the edited document. The first image forming apparatus 200-1 may check the UP command received from the mobile device 100, and execute a function of the first image forming apparatus 200-1, which corresponds to the UP command.

In operation 5060, the mobile device 100 may receive a result of executing the document transmitting function. For example, the mobile device 100 may receive a status of executing the document transmitting function on the edited document from the first image forming apparatus 200-1.

Figure 51:
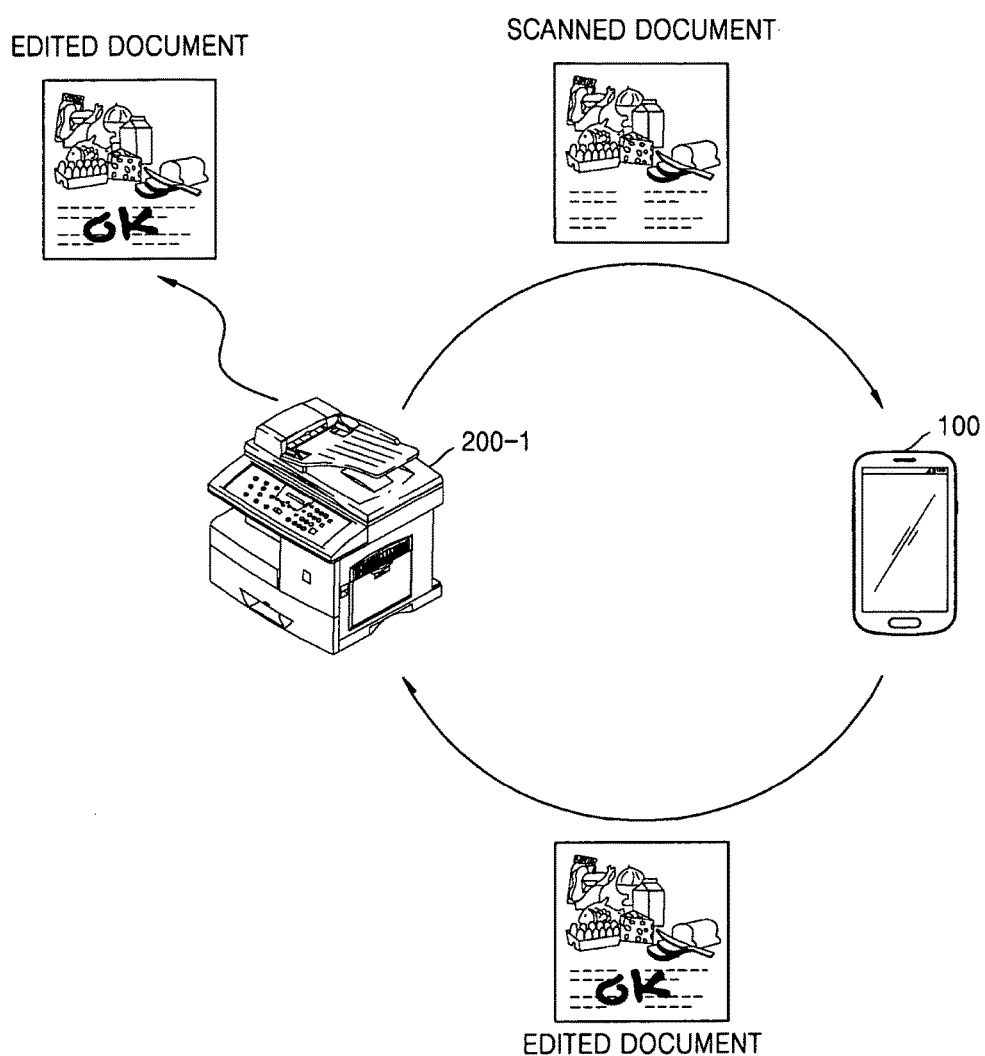
FIG. 51 is a diagram of a process of executing a document transmitting function of a first image forming apparatus regarding an edited document obtained by editing a scanned document.

FIG. 51 is a diagram of a process of executing a document transmitting function of a first image forming apparatus 200-1 (similar to the image forming apparatus 200 of FIG. 1) regarding an edited document obtained by editing a scanned document.

In order to process a workflow of "edit and proxy-transmit after scan" selected by a user, a mobile device 100 (similar to the mobile device 100 of FIG. 1) executing a BYOD application may display a screen for selecting a document to be transmitted when document editing is ended. The user may check the edited document from the screen for selecting a document to be transmitted. When the user selects the edited document from the mobile device 100 and inputs a command to execute the document transmitting function of the first image forming apparatus 200-1, the mobile device 100 executing the BYOD application may transmit a UP command corresponding to the command to execute the document transmitting function on the edited document to the first image forming apparatus 200-1 according to a UP communication method. The first image forming apparatus 200-1 may receive a destination of the edited document and the UP command together with the edited document from the mobile device 100, and transmit the edited document to the destination. According to such a workflow, when it is difficult for the mobile device 100 to transmit the edited document, the edited document may be transmitted by the first image forming apparatus 200-1 that supports the document transmitting function.

As a result, the workflow of "edit and proxy-transmit after scan" is unable to be solely performed by the first image forming apparatus 200-1, but may be processed by using an editing application corresponding to a resource of the mobile device 100.

Figure 52:
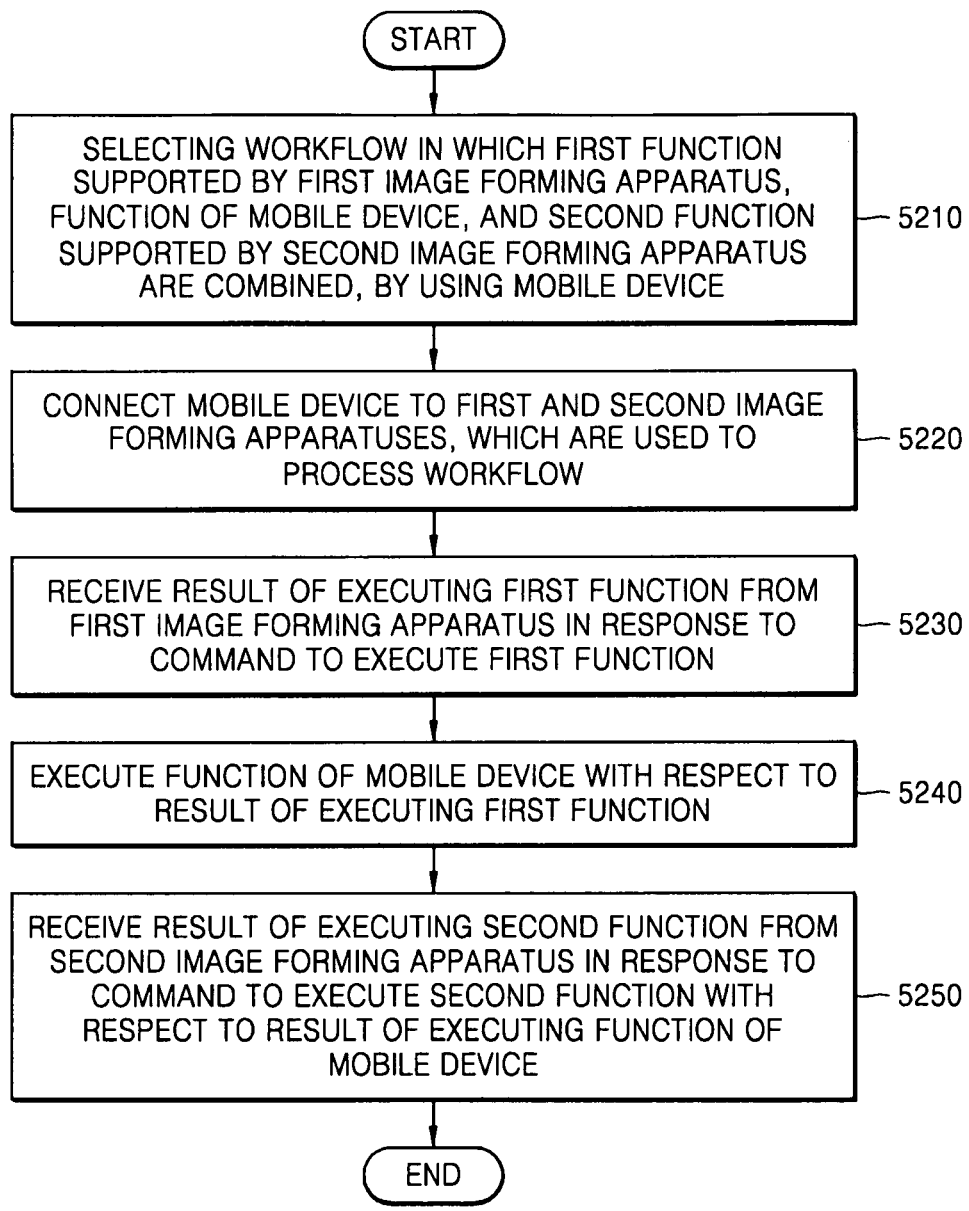
FIG. 52 is a flowchart of a method of processing a workflow, according to another exemplary embodiment.

FIG. 52 is a flowchart of a method of processing a workflow, according to another exemplary embodiment. Details about a mobile device 100 (similar to the mobile device 100 of FIG. 1) for processing the workflow described above may be applied to the method of FIG. 52, even if not explicitly mentioned. At least one image forming apparatus (similar to the image forming apparatus 200 of FIG. 1) that is used to process the workflow may be connected to the mobile device 100, and for convenience of description, it is assumed that the first image forming apparatus 200-1 and a second image forming apparatus 200-2 (similar to the image forming apparatus 200 of FIG. 1) are connected to the mobile device 100. The first image forming apparatus 200-1 may execute a first function included in a workflow, and the second image forming apparatus 200-2 may execute a second function included in the workflow.

In operation 5210, the mobile device 100 may receive an input of selecting a workflow in which the first function supported by the first image forming apparatus 200-1, a function of the mobile device 100, and the second function supported by the second image forming apparatus 200-2 are combined. In other words, a user of the mobile device 100 may select the workflow in which the first function supported by the first image forming apparatus 200-1, the function of the mobile device 100, and the second function supported by the second image forming apparatus 200-2 are combined. At this time, the mobile device 100 may execute a BYOD application according to a BYOD service request of the user, and receive the input of selecting the workflow according to the execution of the BYOD application. The function of the mobile device 100 included in the workflow may not be supported by the first image forming apparatus 200-1 and the second image forming apparatus 200-2.

In operation 5220, the mobile device 100 may be connected to the first image forming apparatus 200-1 and the second image forming apparatus 200-2, which are used to process the workflow. The mobile device 100 may be connected to the first image forming apparatus 200-1 and the second image forming apparatus 200-2 by performing a discovery process (similar to the discovery process 650 of FIG. 6), a pairing process (similar to the pairing process 660 of FIG. 6), and an event registration process (similar to the event registration process 670 of FIG. 6), which are described above.

The mobile device 100 may execute functions included in the workflow based on an order of processing the functions, which is defined in the workflow, and when the first function supported by the first image forming apparatus 200-1 is performed first and the second function supported by the second image forming apparatus 200-2 is performed last, the workflow may be processed as follows.

In operation 5230, in response to a command to execute the first function, the mobile device 100 may receive a result of executing the first function from the first image forming apparatus 200-1. In order to receive the result of executing the first function, the mobile device 100 may transmit the command to execute the first function to the first image forming apparatus 200-1 based on capability information about the first function, which is provided by the first image forming apparatus 200-1.

In operation 5240, the mobile device 100 may execute the function of the mobile device 100 with respect to the result of executing the first function. Here, when the mobile device 100 is executing the function of the mobile device 100 with respect to the result of executing the first function, the function of the mobile device 100 may be executed by interworking with an application executable in the mobile device 100.

In operation 5250, in response to a command to execute a second function with respect to a result of executing the function of the mobile device 100, the mobile device 100 may receive a result of executing the second function from the second image forming apparatus 200-2.

Hereinafter, a method of processing a workflow in which at least one function supported by the first image forming apparatus 200-1, at least one function supported by the mobile device 100, and at least one function supported by the second image forming apparatus 200-2 are combined, and the mobile device 100 executing the workflow will now be described with respect to examples of the workflow.

Figure 53:
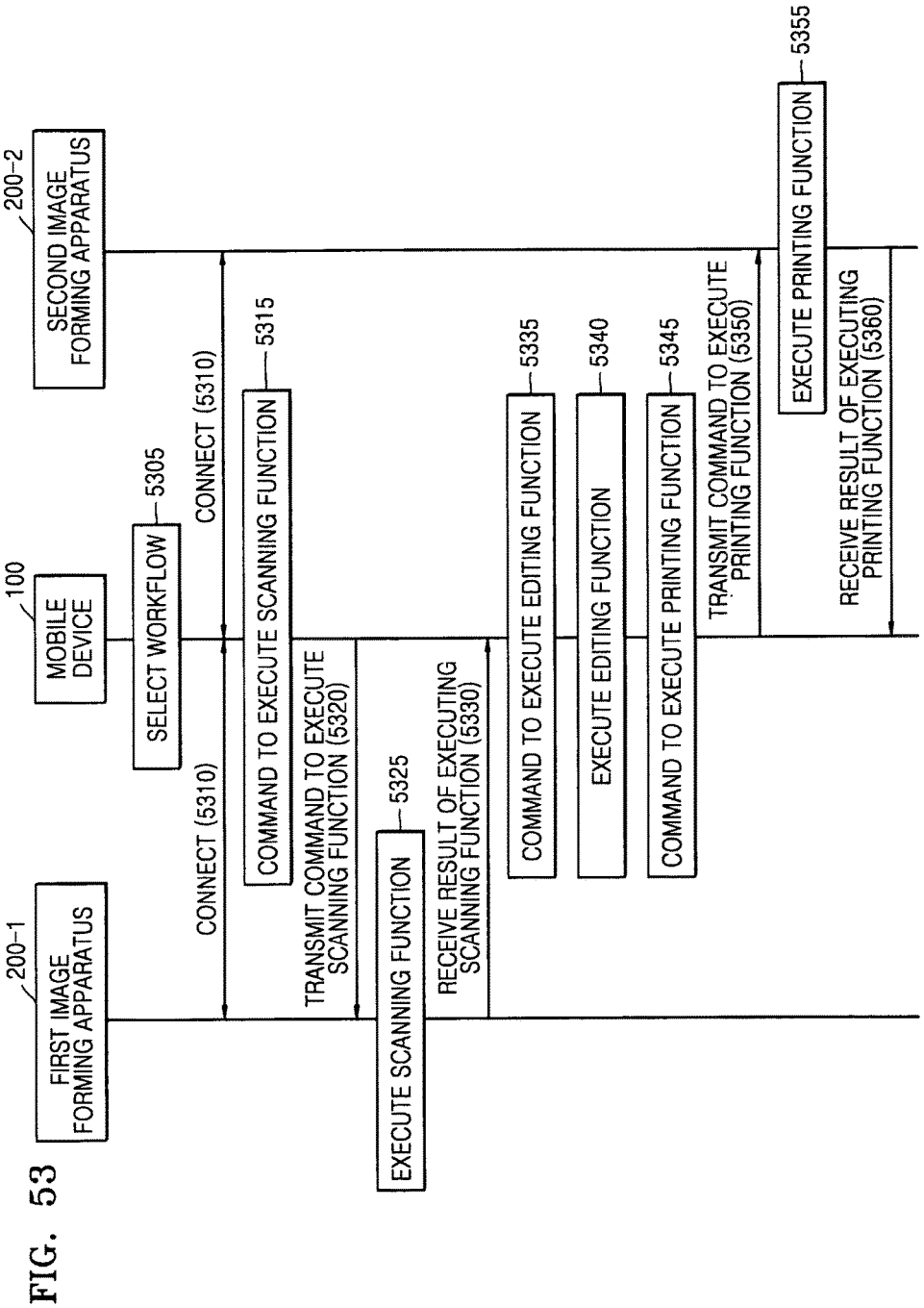
FIG. 53 is a diagram of processes of processing a workflow in which a scanning function of a first image forming apparatus, an editing function of a mobile device, and a printing function of a second image forming apparatus are combined, according to an exemplary embodiment.

FIG. 53 is a diagram of processes of processing a workflow in which a scanning function of a first image forming apparatus 200-1 (similar to the image forming apparatus 200 of FIG. 1), an editing function of a mobile device 100 (similar to the mobile device 100 of FIG. 1), and a printing function of a second image forming apparatus 200-2 (similar to the image forming apparatus 200 of FIG. 1) are combined, according to an exemplary embodiment. Such a workflow may be named "edit and print after scan"

The mobile device 100 may support the editing function that is not supported by the first image forming apparatus 200-1, and the second image forming apparatus 200-2 may support the printing function that is not supported by the first image forming apparatus 200-1. When the scanning function supported by the first image forming apparatus 200-1 is processed first, and the printing function supported by the second image forming apparatus 200-2 is performed last, the workflow may be processed as follows.

In operation 5305, the mobile device 100 executes a BYOD application according to a BYOD service request, and receives an input of selecting the workflow, in which the scanning function of the first image forming apparatus 200-1, the editing function of the mobile device 100, and the printing function of the second image forming apparatus 200-2 are combined, from the user.

In operation 5310, the mobile device 100 may be connected to the first image forming apparatus 200-1 used to process the workflow, and connected to the second image forming apparatus 200-2. In order to be connected to the first image forming apparatus 200-1 capable of executing the scanning function and the second image forming apparatus 200-2 capable of executing the printing function, the mobile device 100 may perform a discovery process (similar to the discovery process 650 of FIG. 6), a pairing process (similar to the pairing process 660 of FIG. 6), and an event registration process (similar to the event registration process 670 of FIG. 6), which are described above.

Figure 54:
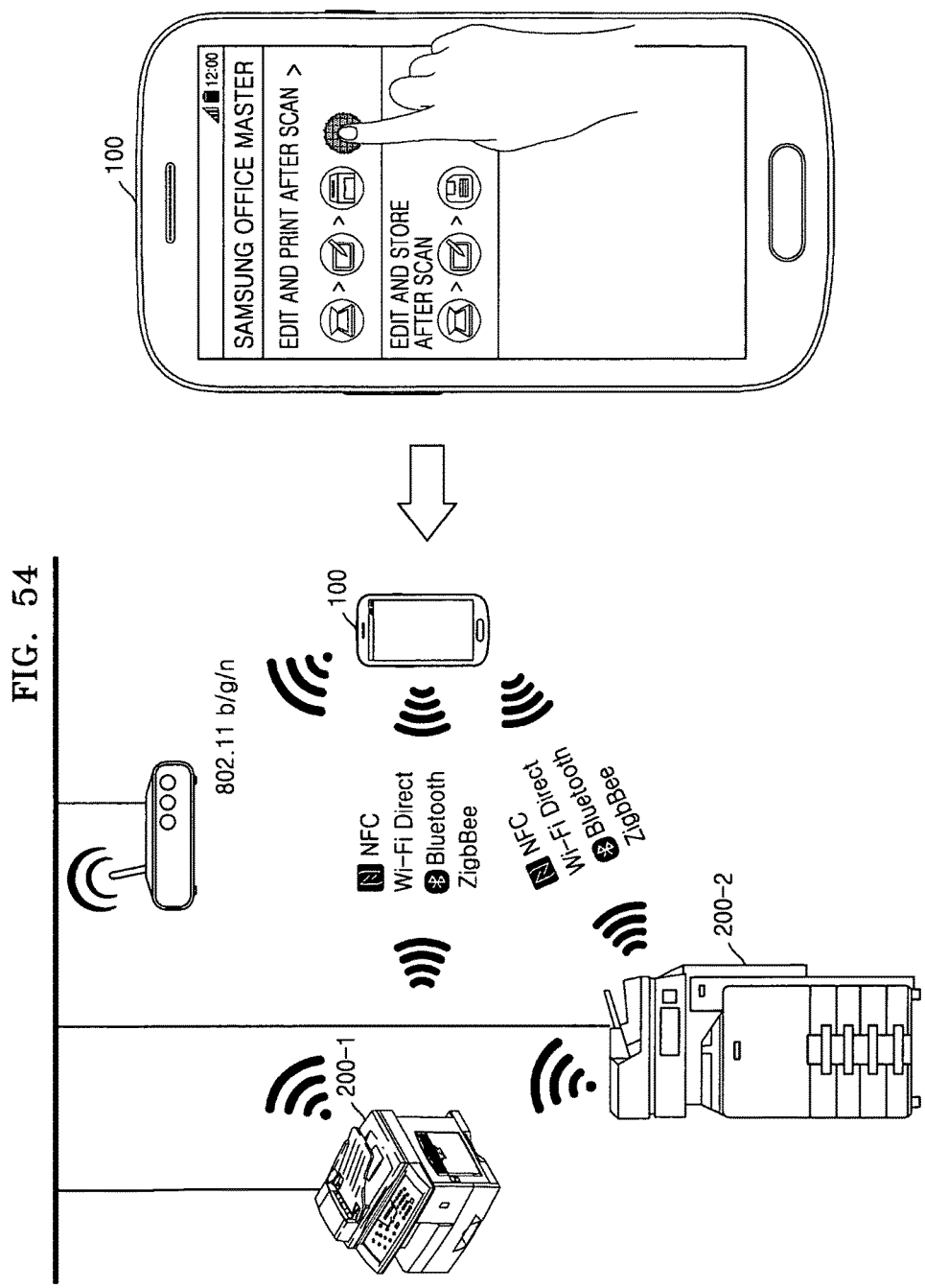
FIG. 54 is a diagram describing connecting of a first image forming apparatus and a second image forming apparatus, which are used to process a workflow, to a mobile device, as the mobile device selects the workflow.

FIG. 54 is a diagram describing connecting of a first image forming apparatus 200-1 (similar to the image forming apparatus 200 of FIG. 1) and a second image forming apparatus 200-2 (similar to the image forming apparatus 200 of FIG. 1), which are used to process a workflow, to a mobile device 100 (similar to the mobile device 100 of FIG. 1), as the mobile device 100 selects the workflow.

According to a BYOD service request of a user, a workflow in a pre-defined form may be displayed on the mobile device 100 executing a BYOD application. For example, as shown in FIG. 54, a list of workflows, such as "edit and print after scan" and "edit and store after scan" may be displayed.

The user may check the list of workflows displayed on the mobile device 100, and select a desired workflow. As shown in FIG. 41, the user may select the workflow of "edit and print after scan" from the mobile device 100.

In order to process the workflow selected by the user, the mobile device 100 executing the BYOD application may be connected to the first image forming apparatus 200-1 executing the scanning function and the second image forming apparatus 200-2 executing the printing function, which are included in the workflow. In order to be connected to the first image forming apparatus 200-1 and the second image forming apparatus 200-2, the mobile device 100 may perform a discovery process (similar to the discovery process 650 of FIG. 6), a pairing process (similar to the pairing process 660 of FIG. 6), and an event registration process (similar to the event registration process 670 of FIG. 6), which are described above. The mobile device 100 may collect information about the first image forming apparatus 200-1 and the second image forming apparatus 200-2 to prepare to process the workflow.

Referring back to FIG. 53, in operation 5315, the mobile device 100 may receive a command to execute the scanning function of the first image forming apparatus 200-1, which is performed first, based on an order of processing functions included in the workflow. In other words, the mobile device 100 executing the BYOD application may receive the command to execute the scanning function by executing a scanning application installed in the mobile device 100 such that the scanning function is performed by the first image forming apparatus 200-1 by controlling the first image forming apparatus 200-1 supporting the scanning function.

In operation 5320, the mobile device 100 may transmit the command to execute the scanning function to the first image forming apparatus 200-1. When the command to execute the scanning function is received by executing the scanning application installed in the mobile device 100, a UP command corresponding to the command to execute the scanning function may be transmitted to the first image forming apparatus 200-1 according to a UP communication method such that the first image forming apparatus 200-1 supporting the scanning function is controlled by the mobile device 100 executing the BYOD application.

In operation 5325, the first image forming apparatus 200-1 may execute the scanning function. The first image forming apparatus 200-1 may check the UP command received from the mobile device 100, and execute the scanning function corresponding to the UP command.

In operation 5330, the mobile device 100 may receive a result of executing the scanning function. In other words, the mobile device 100 may receive a scanned document obtained by the first image forming apparatus 200-1 according to a UP communication method.

In operation 5335, the mobile device 100 may receive a command to execute the editing function of the mobile device 100 on the scanned document. In other words, the mobile device 100 executing the BYOD application may receive the command to execute the editing function by executing an editing application installed in the mobile device 100. The editing function of the mobile device 100 may not be supported by the first image forming apparatus 200-1. When the scanned document is received from the first image forming apparatus 200-1, the mobile device 100 may determine that executing of the scanning function included in the workflow is completed, and thus receive the command to execute the editing function that is performed next from the user.

In operation 5340, the mobile device 100 may execute the editing function on the scanned document received from the first image forming apparatus 200-1. Accordingly, the mobile device 100 may generate an edited document obtained by executing the editing function on the scanned document.

In operation 5345, the mobile device 100 may receive a command to execute the printing function of the second image forming apparatus 200-2, which is executed last based on the order of processing the functions included in the workflow. In other words, the mobile device 100 executing the BYOD application may receive the command to execute the printing function by executing a printing application installed in the mobile device 100 such that the printing function is executed by the second image forming apparatus 200-2 by controlling the second image forming apparatus 200-2 supporting the printing function. The mobile device 100 may receive the command to execute the printing function of the second image forming apparatus 200-2 with respect to the edited document obtained by editing the scanned document by using the editing function of the mobile device 100.

In operation 5350, the mobile device 100 may transmit the command to execute the printing function to the second image forming apparatus 200-2. When the command to execute the printing function is received by executing the printing application installed in the mobile device 100, a UP command corresponding to the command to execute the printing function may be transmitted to the second image forming apparatus 200-2 according to a UP communication method such that the second image forming apparatus 200-2 supporting the printing function is controlled by the mobile device 100 executing the BYOD application.

In operation 5355, the second image forming apparatus 200-2 may execute the printing function on the edited document. The printing function supported by the second image forming apparatus 200-2 may not be supported by the first image forming apparatus 200-1 and the mobile device 100. The second image forming apparatus 200-2 may check the UP command received from the mobile device 100 to execute the printing function corresponding to the UP command.

In operation 5360, the mobile device 100 may receive a result of executing the printing function. For example, the mobile device 100 may receive a status of executing the printing function on the edited document from the second image forming apparatus 200-2.

Figure 55:
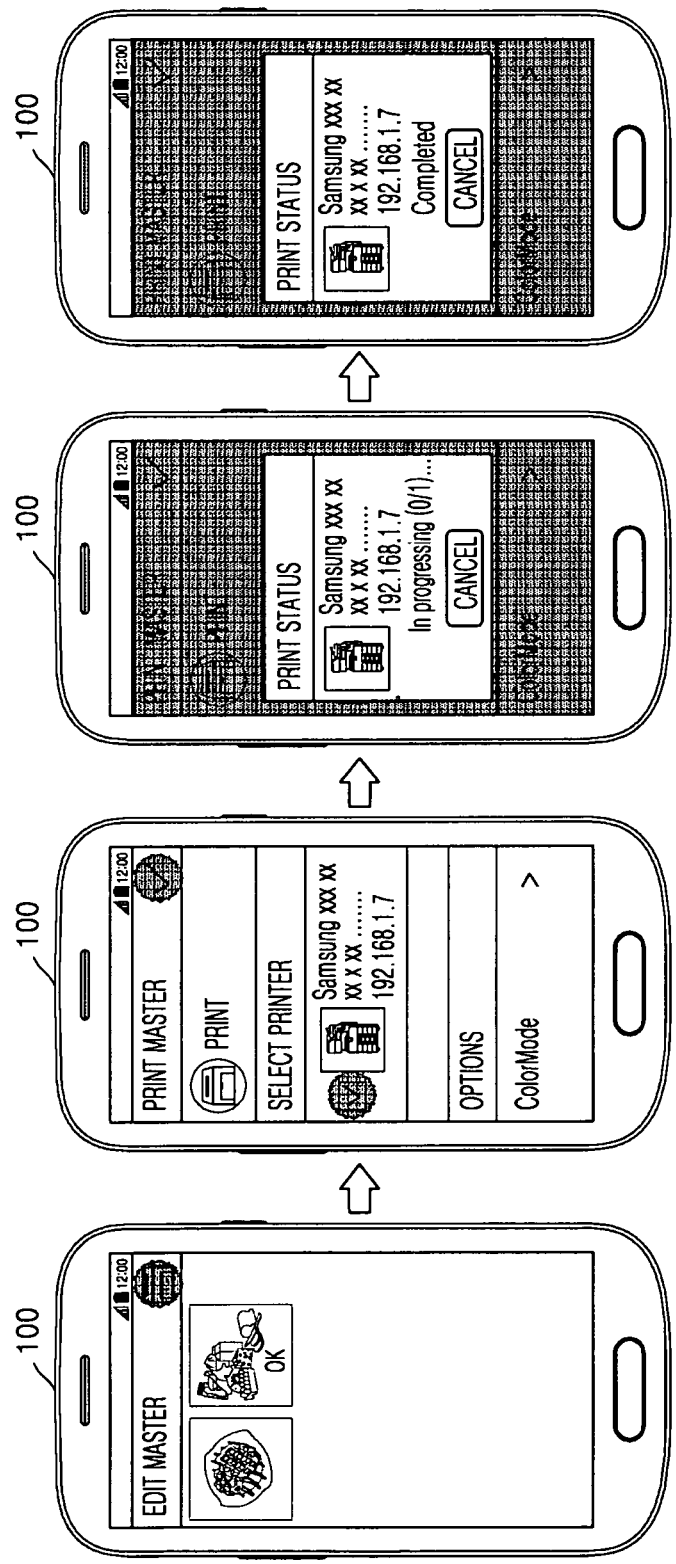
FIG. 55 is a diagram of a process of executing a printing function of a second image forming apparatus regarding an edited document obtained by editing a scanned document.

FIG. 55 is a diagram of a process of executing a printing function of a second image forming apparatus 200-2 (similar to the image forming apparatus 200 of FIG. 1) regarding an edited document obtained by editing a scanned document.

In order to process a workflow of "edit and print after scan" selected by a user, a mobile device 100 (similar to the mobile device 100 of FIG. 1) executing a BYOD application may display a screen of selecting a document to be printed after document editing is ended. The user may check the edited document from the screen of selecting a document to be printed. The user may select the edited document from the mobile device 100, execute a printing application for controlling the second image forming apparatus 200-2, and input a command to execute the printing function of the second image forming apparatus 200-2. Accordingly, the mobile device 100 executing the BYOD application may transmit a UP command corresponding to the command to execute the printing function to the second image forming apparatus 200-2 according to a UP communication method. The second image forming apparatus 200-2 may execute the printing function on the edited document received from the mobile device 100. Accordingly, the mobile device 100 may receive a status of executing the printing function executed by the second image forming apparatus 200-2.

As a result, the workflow of "edit and print after scan" is unable to be solely performed by the first or second image forming apparatus 200-1 or 200-2, but may be processed by using an editing application corresponding to a resource of the mobile device 100.

Processes of generating a workform defining a workflow have been described above with reference to FIGS. 20 through 34, and processes of performing a job according to a workflow defined by a workform have been described above with reference to FIGS. 38 through 55.

However, in the embodiments described above, examples of generating a workform by combining basic functions of an image forming apparatus and a mobile device (e.g., scanning and printing in the image forming apparatus, and capturing an image, editing the image, and transmitting the image in the mobile device) have been described.

However, a workform may be generated not only by combining functions or applications (e.g., an Out of Box (OOB) application, hereinafter, referred to as a "basic application") generally included in an image forming apparatus and a mobile device, but also by combining an application provided by a third party (hereinafter, referred to as a "third party application") and a basic application or by combining only third party applications.

A third party application is an application prepared by a third party according to various needs and allows an image forming apparatus or a mobile device to perform a function that is not generally supported by the image forming apparatus or the mobile device. The third party application is not generally installed in the image forming apparatus or the mobile device, but may be downloaded from an online store (e.g., a Google store or an Appstore) if a user wants to. Meanwhile, various third party applications may be used to generate a workform irrespective of a type of the workform.

In exemplary embodiments described hereinbelow, a workflow is generated by using a third party application, such as an optical character reader (OCR) application, an email client application, a translation application, an application providing travel information, or an application performing image recognition and search. However, the exemplary embodiments are not limited thereto, and any type of a third party application suitable for generating a workform may be used.

Figure 56A:
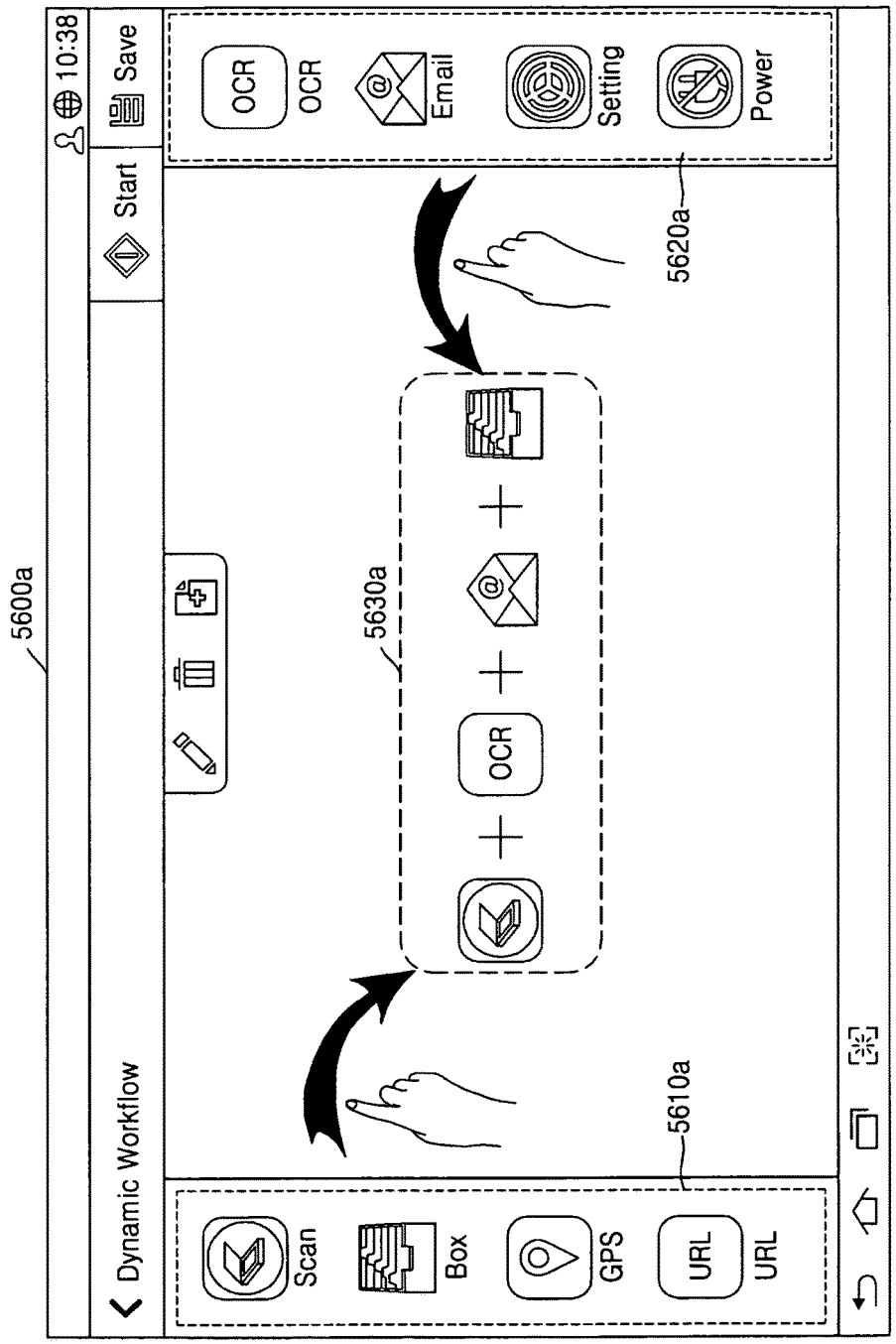
FIGS. 56A through 56C illustrate UIs for generating a workform by combining applications, according to an exemplary embodiment.

FIG. 56A illustrates a UI screen 5600a for generating a workform by combining applications, according to an exemplary embodiment. The UI screen 5600a of FIG. 56A may be displayed on a display panel of an image forming apparatus or a screen of a mobile device. Referring to FIG. 56A, the UI screen 5600a displays lists 5610a and 5620a of applications that may be used to generate a workform. A user may select an application having a function to be included in the workform from the lists 5610a and 5620a, and then drag and drop the selected application to a workform generating region 5630a to generate the workform including selected applications.

Here, the lists 5610a and 5620a include not only basic applications of the image forming apparatus and the mobile device, but also various third party applications. Since a third party application is installed in the image forming apparatus or the mobile device, when the UI screen 5600a is displayed on the screen of the mobile device, the user may be able to check the basic application and the third party application installed in the image forming apparatus through the mobile device. On the other hand, when the UI screen 5600a is displayed on the display panel of the image forming apparatus, the user may be able to check the basic application and the third party application installed in the mobile device through the image forming apparatus.

In FIG. 56A, the workform is generated by combining a scan application and a box application, which are basic applications of the image forming apparatus, an email application that is a basic application of the mobile device, and an OCR application that is a third party application. Here, the OCR application may be installed in any one of the image forming apparatus and the mobile device.

When the workform generated in FIG. 56A is executed, the image forming apparatus scans a document to obtain a scan image, the OCR application installed in any one of the image forming apparatus and the mobile device generates a document using text information extracted by reading the scan image, the mobile device transmits the generated document via email, and the image forming apparatus stores the generated document in an assigned folder through the box application.

In other words, by including the third party application in the workform, a workflow including an OCR function that is not supported by a basic application of the image forming apparatus or the mobile device may be executed.

UI screens 5600b and 5600c, lists 5610b and 5620b, and 5610c and 5620c, and workform generating regions 5630b and 5630c of FIGS. 56B and 56C operate in a similar manner as described with reference to FIG. 56A.

Figure 56B:
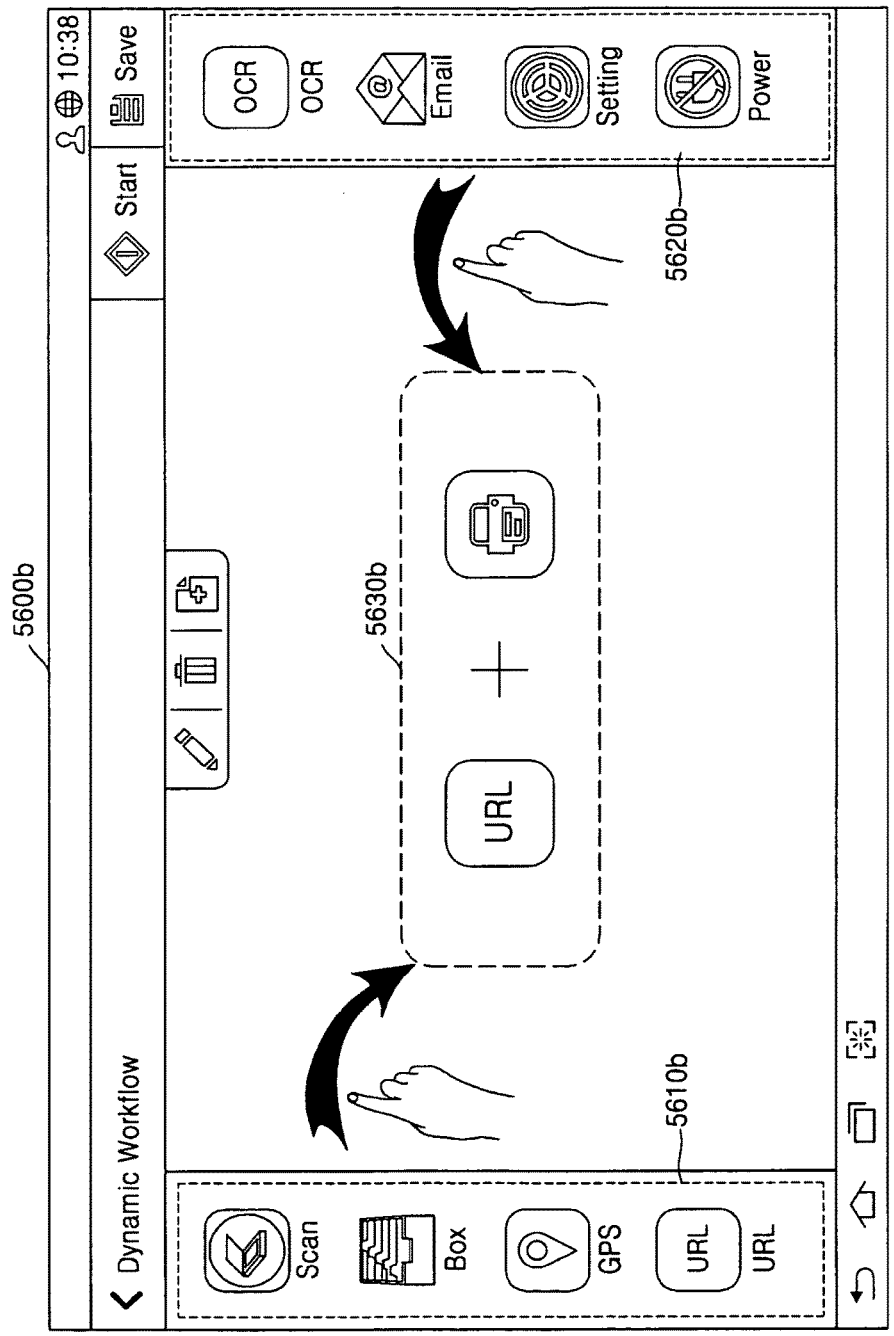

FIG. 56B is a diagram describing an embodiment of generating a workform in which, when URL where content is stored is transmitted to an image forming apparatus, the image forming apparatus accesses the URL to download the content and then prints the content. In other words, in FIG. 56B, the workform is generated by combining a URL transmission application and a print application.

When the workform generated in FIG. 56B is executed, a mobile device transmits the URL where the content is stored to the image forming apparatus, and the image forming apparatus downloads and prints the content by using the received URL. When a user finds content he/she wants to print while searching the Web by using the mobile device, the user executes the workform defined in FIG. 56B. When the workform is executed, the URL transmission application is automatically executed and transmits the URL where the content is stored to the image forming apparatus. Alternatively, when the URL transmission application is executed as the user executes the workform, the user may directly input the URL where the content is stored. As such, a network load during transmission may be reduced as the mobile device transmits only the URL to the image forming apparatus instead of directly downloading and transmitting the content to the image forming apparatus.

Figure 56C:
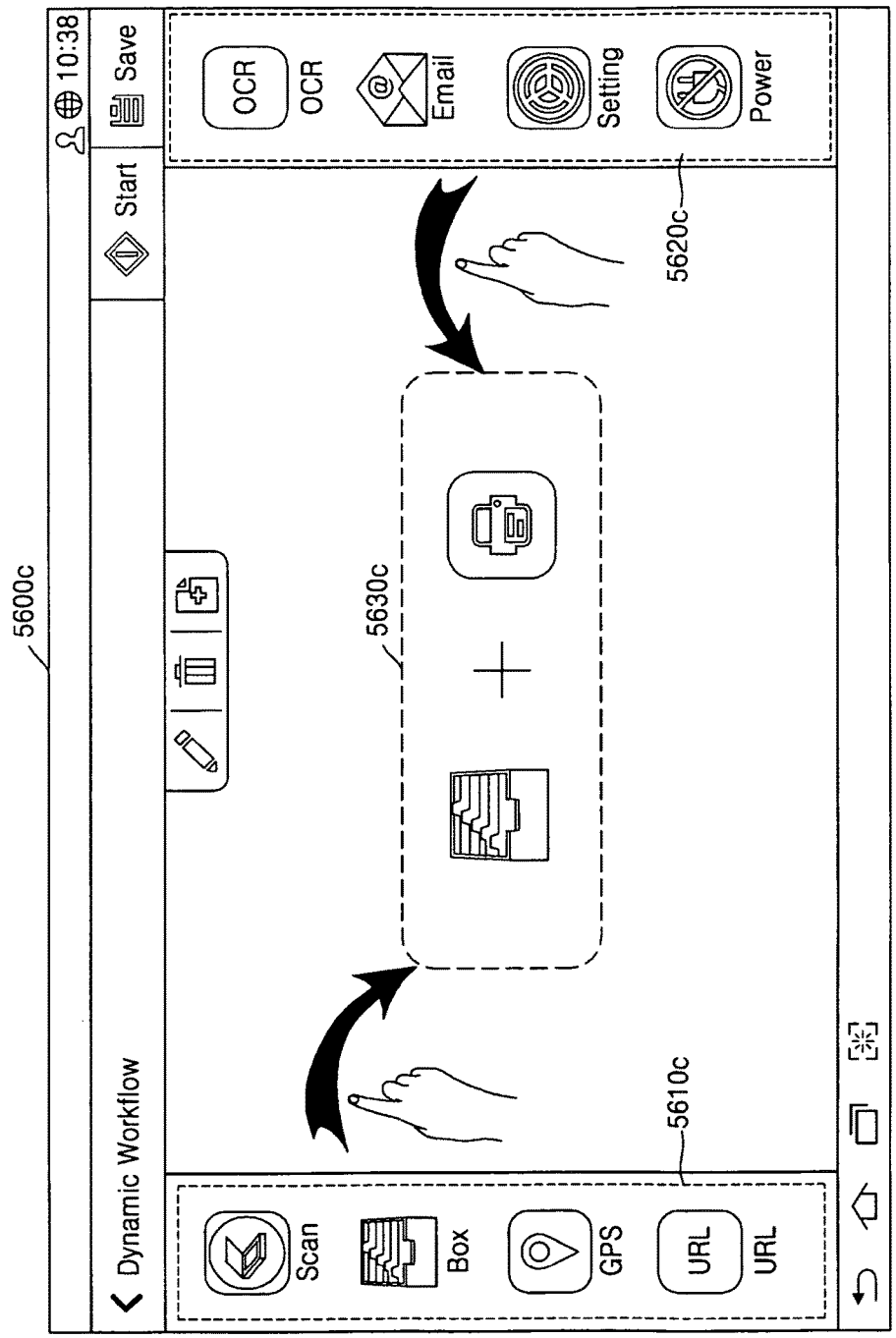

FIG. 56C is a diagram describing an embodiment of generating a workform in which, when a uniform resource identifier (URI) of a directory where content is stored is transmitted to an image forming apparatus through a box application, the image forming apparatus downloads and prints the content by accessing the received URI. In other words, in FIG. 56C, the workform is generated by combining the box application and a print application.

Here, a user may set the workform to be periodically executed. When the workform is set to be periodically executed, the image forming apparatus may download and print the content stored in the directory corresponding to the URI whenever the workform is executed. In other words, the user may only update the content to the directory corresponding to the URI, and the updated content is automatically printed according to a set period.

Hereinafter, embodiments of generating a workform by combining various basic applications and third party applications will now be described with reference to FIGS. 57 through 63.

Figure 57:
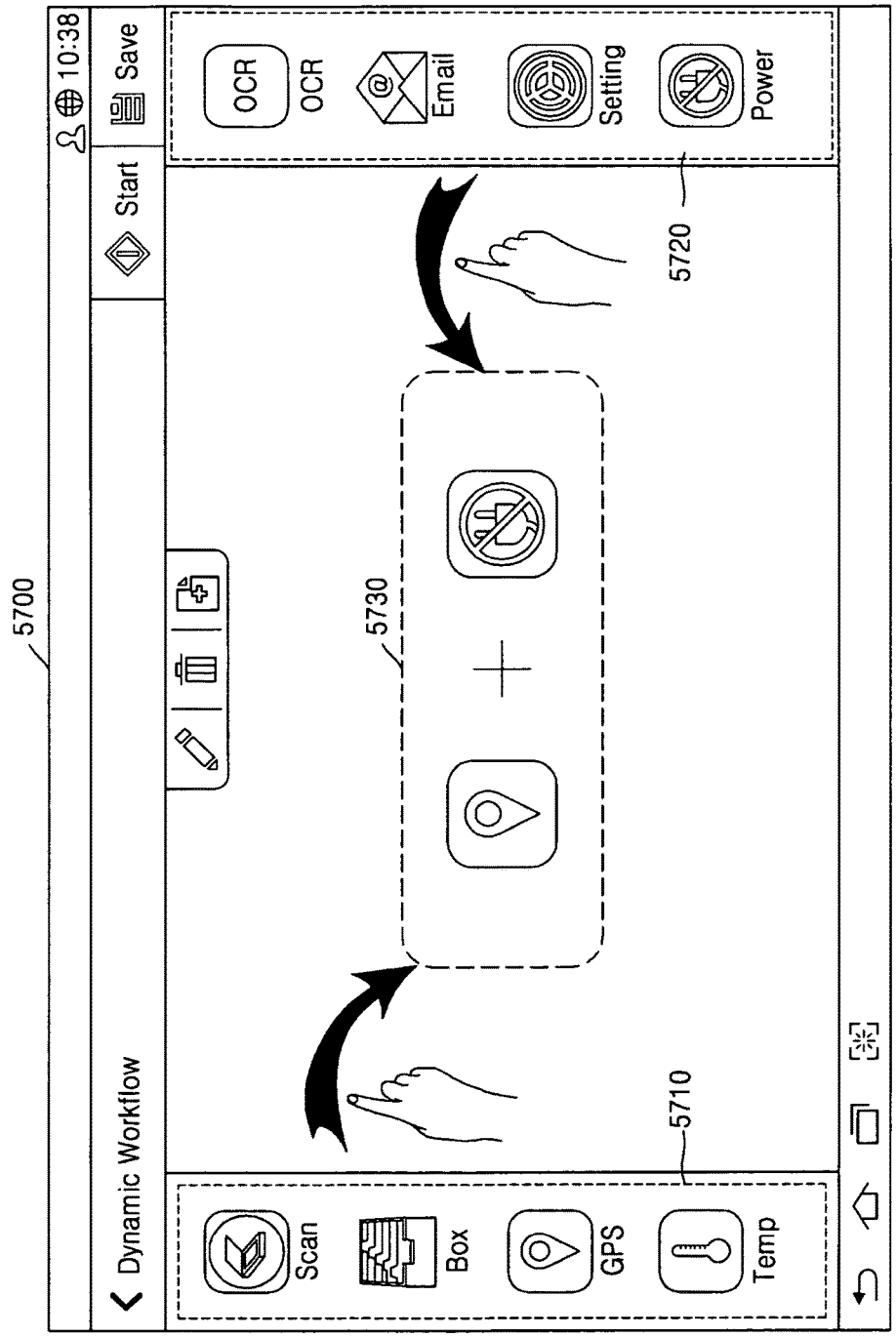
FIG. 57 is a diagram describing an embodiment of generating a workform for controlling power that is supplied to an image forming apparatus according to a location of a mobile device.

FIG. 57 is a diagram describing an embodiment of generating a workform for controlling power that is supplied to an image forming apparatus according to a location of a mobile device.

Referring to FIG. 57, the workform is generated by combining an application determining location information of the device (e.g., a "Global Positioning System (GPS)" application) and an application controlling power supply of the image forming apparatus (e.g., a "Power" application). According to the generated workform, a location of the mobile device is determined through the "GPS" application installed in the mobile device, and when the mobile device transmits the location information to the image forming apparatus, the "Power" application installed in the image forming apparatus controls power supplied to the image forming apparatus according to the received location information. For example, when the mobile device is at a far distance from the image forming apparatus, the image forming apparatus may enter a sleep mode or may be turned off.

Figure 58:
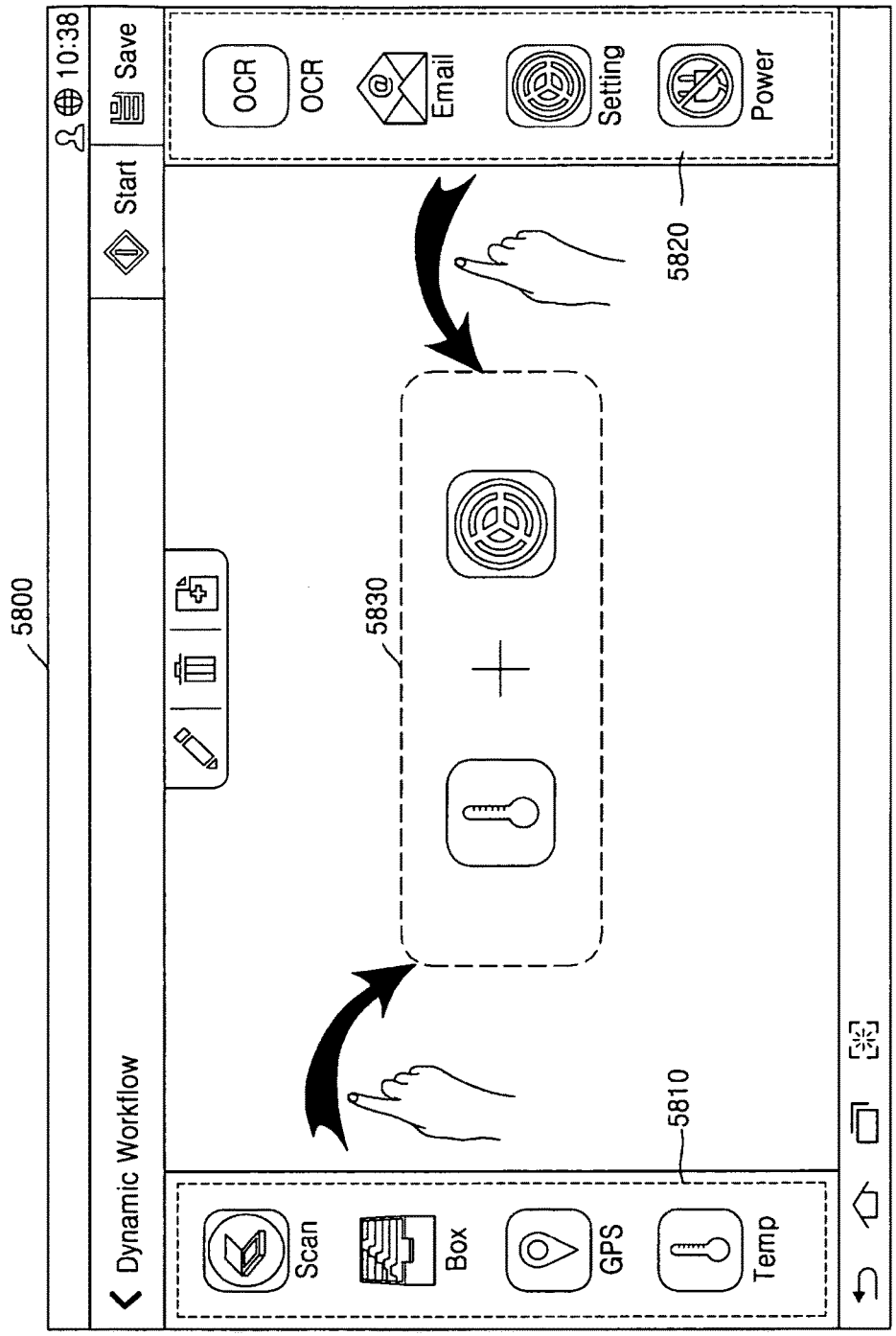
FIG. 58 is a diagram describing an embodiment of generating a workform for changing a setting of an image forming apparatus according to a temperature measured by a mobile device.

FIG. 58 is a diagram describing an embodiment of generating a workform for changing a setting of an image forming apparatus according to a temperature measured by a mobile device.

Referring to FIG. 58, the workform is generated by combining an application measuring a temperature by using a sensor of the mobile device (e.g., a "Temp" application) and an application controlling the setting of the image forming apparatus (e.g., a "Setting" application). According to the generated workform, the temperature is measured through the "Temp" application installed in the mobile device, and when the mobile device transmits the measured temperature to the image forming apparatus, the "Setting" application installed in the image forming apparatus changes the setting of the image forming apparatus according to the received temperature. For example, various options and settings of the image forming apparatus may be changed to obtain an optimum print quality at the measured temperature. Here, an application for measuring the humidity may be used instead of the "Temp" application, or an application for measuring both the temperature and humidity may be used.

Figure 59:
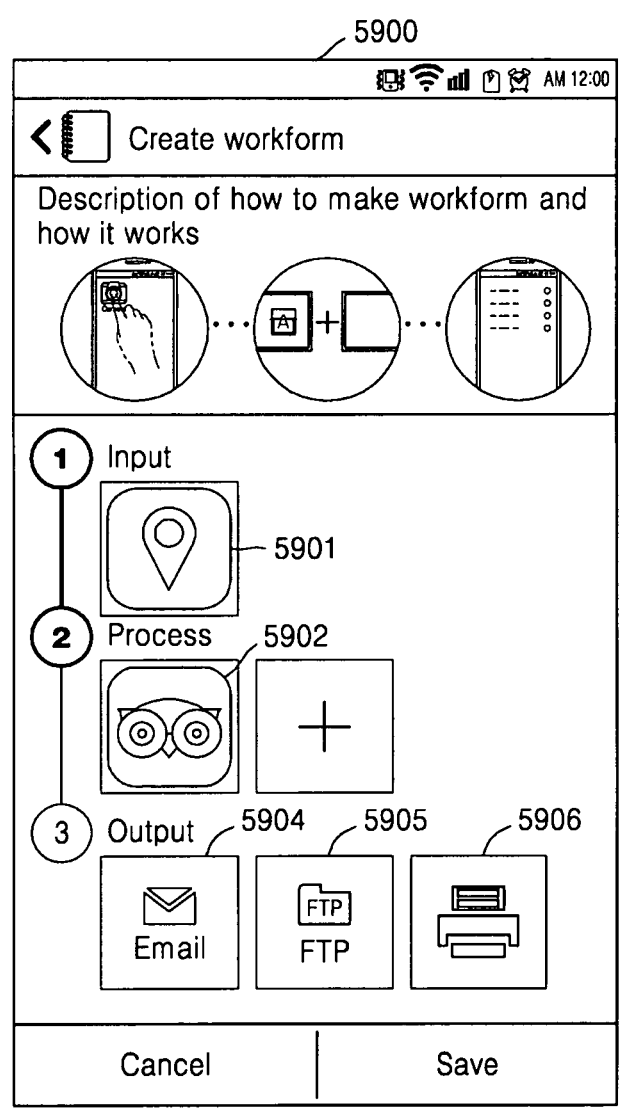
FIG. 59 is a diagram describing an embodiment of generating a workform for downloading travel information and then printing or transmitting/storing the downloaded travel information according to a location of a mobile device.

FIG. 59 is a diagram describing an embodiment of generating a workform for downloading travel information and then printing or transmitting/storing the downloaded travel information corresponding to a location of a mobile device. A UI screen 5900 for generating the workform of FIG. 59 is different from those of FIGS. 56 through 58, and a UI screen for generating a workform may vary.

Referring to FIG. 59, in the UI screen 5900, the workform is generated by selecting a location determining application 5901 as an input application, a travel information application 5902 is selected as a process application, and an email application 5904, a FTP server storing application 5905, and a print application 5906 are selected as output applications.

When a workflow defined in the workform of FIG. 58 is executed, the location determining application 5901 installed in a mobile device determines a location of the mobile device. At this time, a GPS sensor included in the mobile device may be used, or a user may directly input location information. Then, the travel information application 5902 installed in the mobile device receives travel information (e.g., information about accommodations and restaurants) corresponding to the location information from the Internet or a server provided by a third party. Upon receiving the travel information, the mobile device executes the email application 5904 to transmit the travel information to a pre-assigned email address, and executes the FTP server storing application 5905 to store the travel information in a pre-assigned FTP server. Also, the mobile device transmits the travel information to the image forming apparatus, and the image forming apparatus executes the print application 5906 to print the travel information.

Accordingly, a user may access the image forming apparatus provided, for example, at a hotel at a travel destination, to execute the workform, thereby conveniently printing the travel information.

Figure 60:
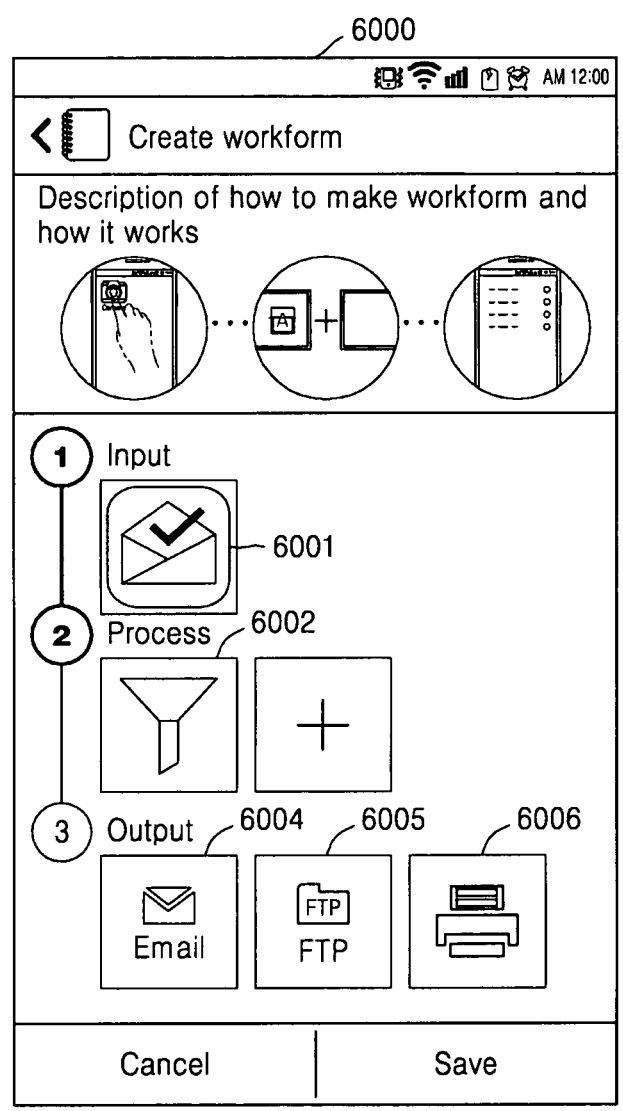
FIG. 60 is a diagram describing an embodiment of generating a workform for filtering a received mail according to a certain standard, and then printing or transmitting/storing the filtered mail.

FIG. 60 is a diagram describing an embodiment of generating a workform for filtering a received mail according to a certain standard, and then printing or transmitting/storing the filtered mail.

Referring to FIG. 60, in a UI screen 6000, the workform is generated by selecting an email client application 6001 as an input application, selecting a filtering application 6002 as a process application, and selecting an email application 6004, an FTP server storing application 6005, and a print application 6006 as output applications.

When a workflow defined in the workform of FIG. 60 is executed, the email client application 6001 installed in a mobile device checks and manages emails a user received. Then, the filtering application 6002 installed in the mobile device filters the received emails according to a pre-set condition. For example, the filtering application 6002 may extract only an email of which title or content includes a certain phrase. Emails may be set to be filtered according to other various standards. The mobile device may execute the email application 6004 and the FTP server storing application 6005 to transmit the extracted email via an email or store the extracted email in a FTP server. Here, the mobile device may transmit or store at least one of the body of the extracted email or a file enclosed in the extracted email. Also, the mobile device may transmit at least one of the body of the extracted email and the file enclosed in the extracted email to an image forming apparatus, and the image forming apparatus may execute the print application 6006 to print the at least one of the body and the file.

Figure 61:
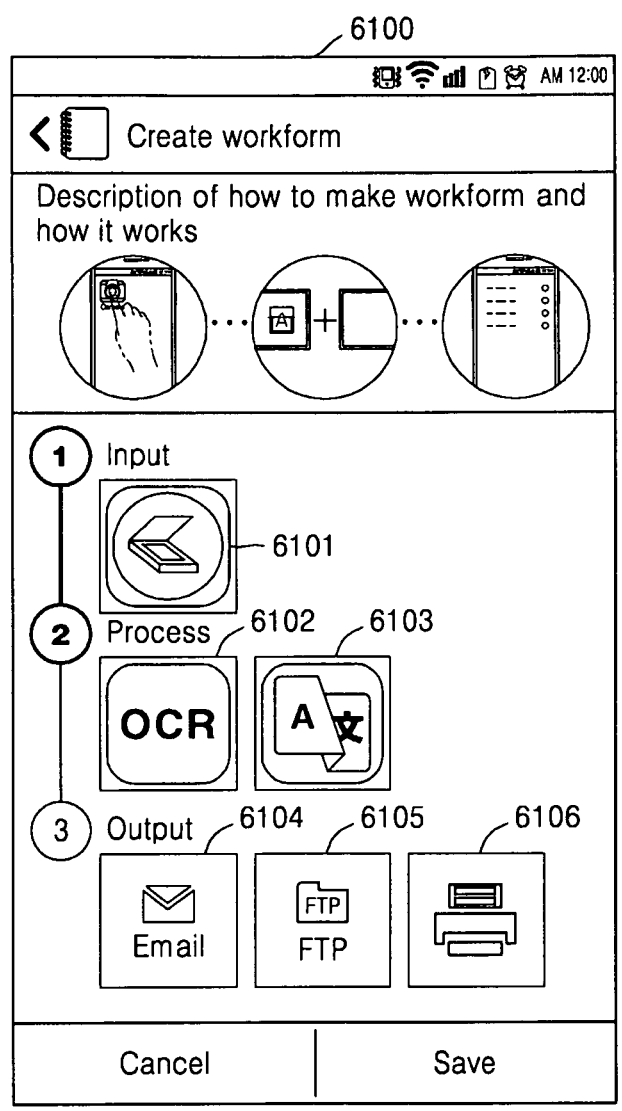
FIG. 61 is a diagram describing an embodiment of generating a workform for printing or transmitting/storing a translation of text extracted from a scan image of a document.

FIG. 61 is a diagram describing an embodiment of generating a workform for printing or transmitting/storing a translation of text extracted from a scan image of a document.

Referring to FIG. 61, in a UI screen 6100, the workform is generated by selecting a scan application 6101 as an input application, selecting an OCR application 6102 and a translation application 6103 as process applications, and selecting an email application 6104, an FTP server storing application 6105, and a print application 6106 as output applications.

When a workflow defined in the workform of FIG. 61 is executed and a user places a document on a scanner of an image forming apparatus, the image forming apparatus scans the document through the scan application 6101 to obtain a scan image, and transmits the scan image to a mobile device. The OCR application 6102 installed in the mobile device extracts text from the scan image. Then, the translation application 6103 translates the extracted text to a pre-assigned language. When the translating is completed, the mobile device executes the email application 6104 and the FTP server storing application 6105 to transmit the translated text via an email or store the translated text in an FTP server. Also, the mobile device may transmit the translated text to the image forming apparatus, and the image forming apparatus may execute the print application 6106 to print the translated text.

Figure 62:
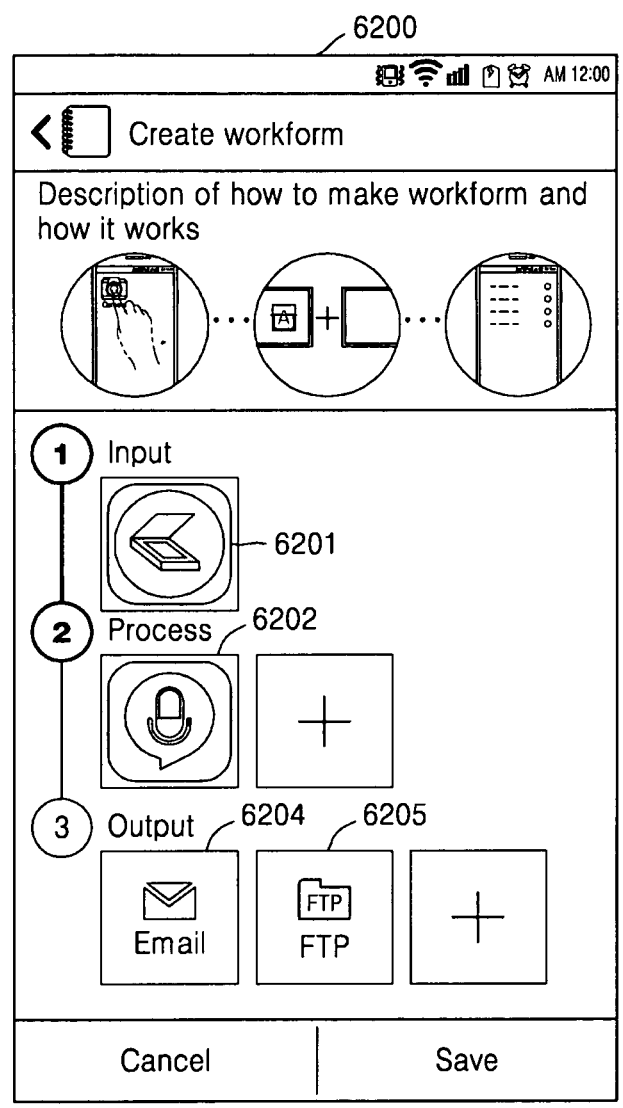
FIG. 62 is a diagram describing an embodiment of generating a workform for transmitting/storing a file obtained by combining voice with a scan image of a document.

FIG. 62 is a diagram describing an embodiment of generating a workform for transmitting/storing a file obtained by combining voice to a scan image of a document.

Referring to FIG. 62, in a UI screen 6200, the workform is generated by selecting a scan application 6201 as an input application, selecting a voice recording application 6202 as a process application, and selecting an email application 6204 and an FTP server storing application 6205 as output applications.

When a workflow defined in the workform of FIG. 62 is executed and a user places a document on a scanner of an image forming apparatus, the image forming apparatus scans a document through the scan application 6201 to obtain a scan image, and transmits the scan image to a mobile device. The mobile device executes the voice recording application 6202 to store a file in which the scan image and a voice message are combined. In other words, when the user records a voice message while looking at a preview of a certain page of the scan image, the file in which the voice message is recorded according to the certain page is stored. When the recording of the voice message and the generating of the file are completed, the mobile device may execute the email application 6204 and the FTP server storing application 6205 to transmit the file via an email or store the file in an FTP server.

Figure 63:
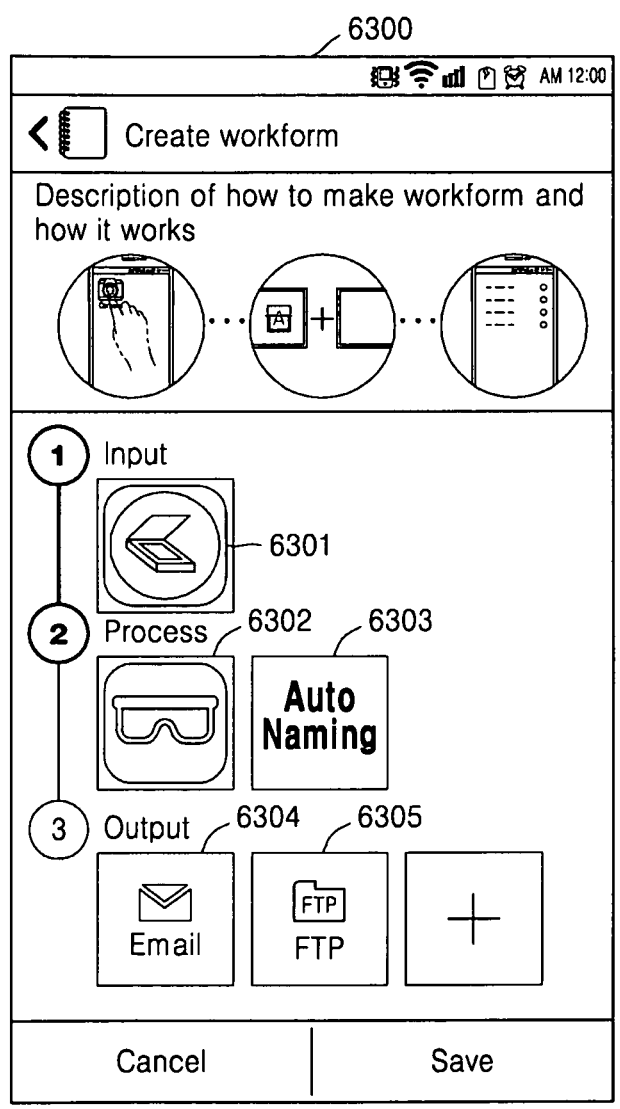
FIG. 63 is a diagram describing an embodiment of generating a workform for automatically generating a file name of a scan image of a document by recognizing and searching for an image included in the scan image.

FIG. 63 is a diagram describing an embodiment of generating a workform for automatically generating a file name of a scan image of a document by recognizing and searching for an image included in the scan image.

Referring to FIG. 63, in a UI screen 6300, the workform is generated by selecting a scan application 6301 as an input application, selecting an image recognizing/searching application 6302 and an auto-naming application 6303 as process applications, and selecting an email application 6304 and an FTP server storing application 6305 as output applications.

When a workflow defined in the workform of FIG. 63 is executed and a user places a document on a scanner of an image forming apparatus, the image forming apparatus scans the document through the scan application 6301 to obtain a scan image, and transmits the scan image to a mobile device. The mobile device recognizes at least one image in the scan image by executing the image recognizing/searching application 6302, and search for the recognized image on the Internet. For example, when the scan image includes a car image, the image recognizing/searching application 6302 may recognize the car image in the scan image, and search for the car image on the Internet, thereby determining that a "car" is included in the scan image. Then, the mobile device may execute the auto-naming application 6303 to automatically generate a file name based on results of recognizing/searching the recognized image, or may provide a plurality of file name candidates to a user and receive a user input of selecting one of the plurality of file name candidates. When the file name is determined, the mobile device may store the scan image in the determined file name, and execute the email application 6304 or the FTP server storing application 6305 to transmit the scan image via an email or store the scan image in an FTP server.

A workform may be generated according to other various scenarios.

For example, a workform may be generated such that zone OCR is performed on a scan image to recognize text in a certain region of the scan image, a document is generated by inputting the recognized text to a pre-set form, and then the generated document is transmitted/stored or printed. Such a workform may be used to extract information, such as a hospital name, an expenditure item, and a cost, from a receipt issued by a hospital, and automatically input the extracted information to hospital bills.

Alternatively, when a text message received by a mobile device includes a URL of a file, the file may be downloaded by accessing the URL, and the file may be transmitted/stored or printed. Here, a workform may be generated such that filtering is performed based on a sender, content, and an extension to extract the text message, and the file is downloaded only with respect to the extracted text message.

Alternatively, when a mobile device is connected to an image forming apparatus as the mobile device is within a certain distance from the image forming apparatus, and a user requests the image forming apparatus to print a file stored in a USB memory by connecting the USB memory to the image forming apparatus, but the file is not in a format to be directly printed, a workform may be generated such that the image forming apparatus transmits the file to the mobile device, the mobile device renders the file, converts the file to print data, and transmits the print data to the image forming apparatus, and the image forming apparatus prints the print data.

Hereinafter, a method of providing a security print solution in a BYOD environment will be described. Exemplary embodiments described hereinafter refer to a mobile device management (MDM) or mobile application management (MAM) environment.

FIG. 64 is a diagram of an environment providing a security print solution in a BYOD environment, according to an exemplary embodiment. Referring to FIG. 64, a PC 6410, a mobile device 6420, and an image forming apparatus 6430 are under MDM by an MDM server 6440. A print driver is installed in the PC 6410, and the mobile device 6420 is registered in the print driver. Also, a security print application is each installed in the mobile device 6420 and the image forming apparatus 6430.

Under an MDM environment, when the PC 6410 performs printing, the print driver generates print data and transmits the print data to the mobile device 6420. The mobile device 6420 stores the print data, and a user may check the print data and request the print data to be printed by executing the security print application in the mobile device 6420. Upon receiving a print request, the security print application in the mobile device 6420 may request the security print application in the image forming apparatus 6430 to print the print data by transmitting the print data.

Here, the security print applications installed in the mobile device 6420 and the image forming apparatus 6430 normally operate only when the mobile device 6420 and the image forming apparatus 6430 are under the MDM environment. Thus, when the mobile device 6420 and the image forming apparatus 6430 are not in the MDM environment, even when the user executes the security print application in the mobile device 6420, the user is unable to check or print the print data.

Processes of installing a print driver and a security printing application and performing printing will now be described with reference to FIGS. 65A through 65C.

Figure 65A:
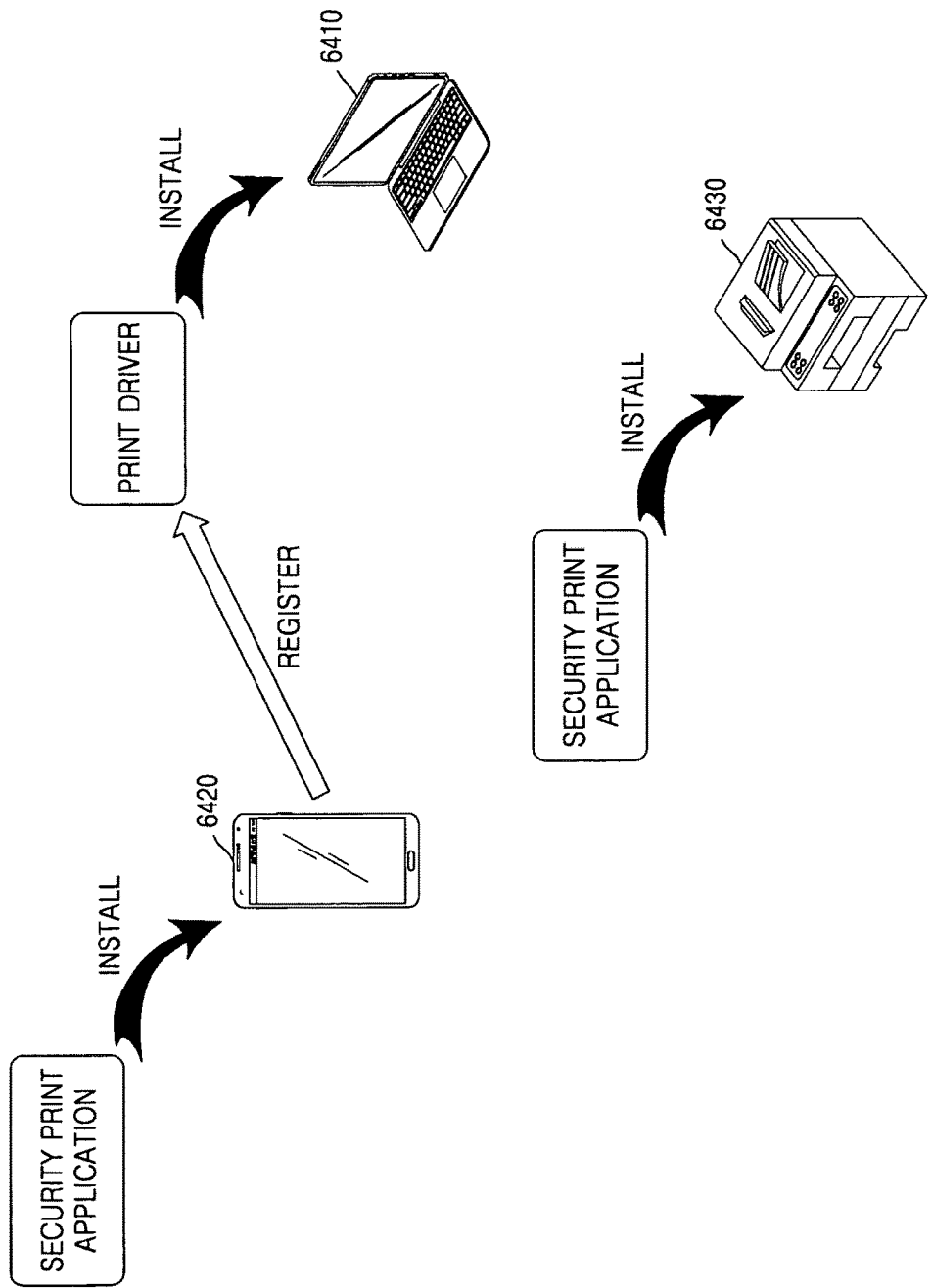
FIGS. 65A through 65C are diagrams describing processes of installing a print driver and a security printing application and performing printing in a mobile device management (MDM) environment, according to an exemplary embodiment.

Referring to FIG. 65A, the security print application is each installed in the mobile device 6420 and the image forming apparatus 6430. The print driver is installed in the PC 6410, and while installing the print driver, the mobile device 6420 is registered in the print driver.

Figure 65B:
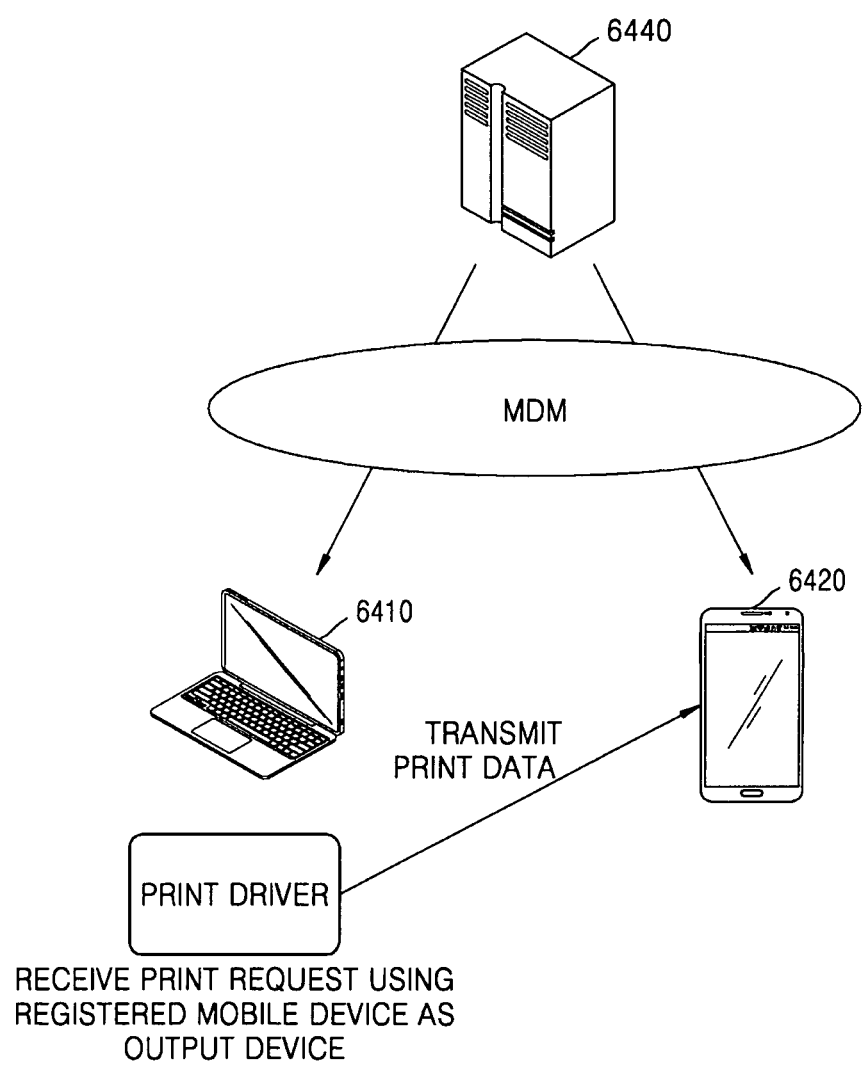

Referring to FIG. 65B, in an MDM environment, when the PC 6410 receives a print request using the mobile device 6420 registered in the print driver as an output device, the print driver generates print data and transmits the print data to the mobile device 6420. The mobile device 6420 stores the print data.

Figure 65C:
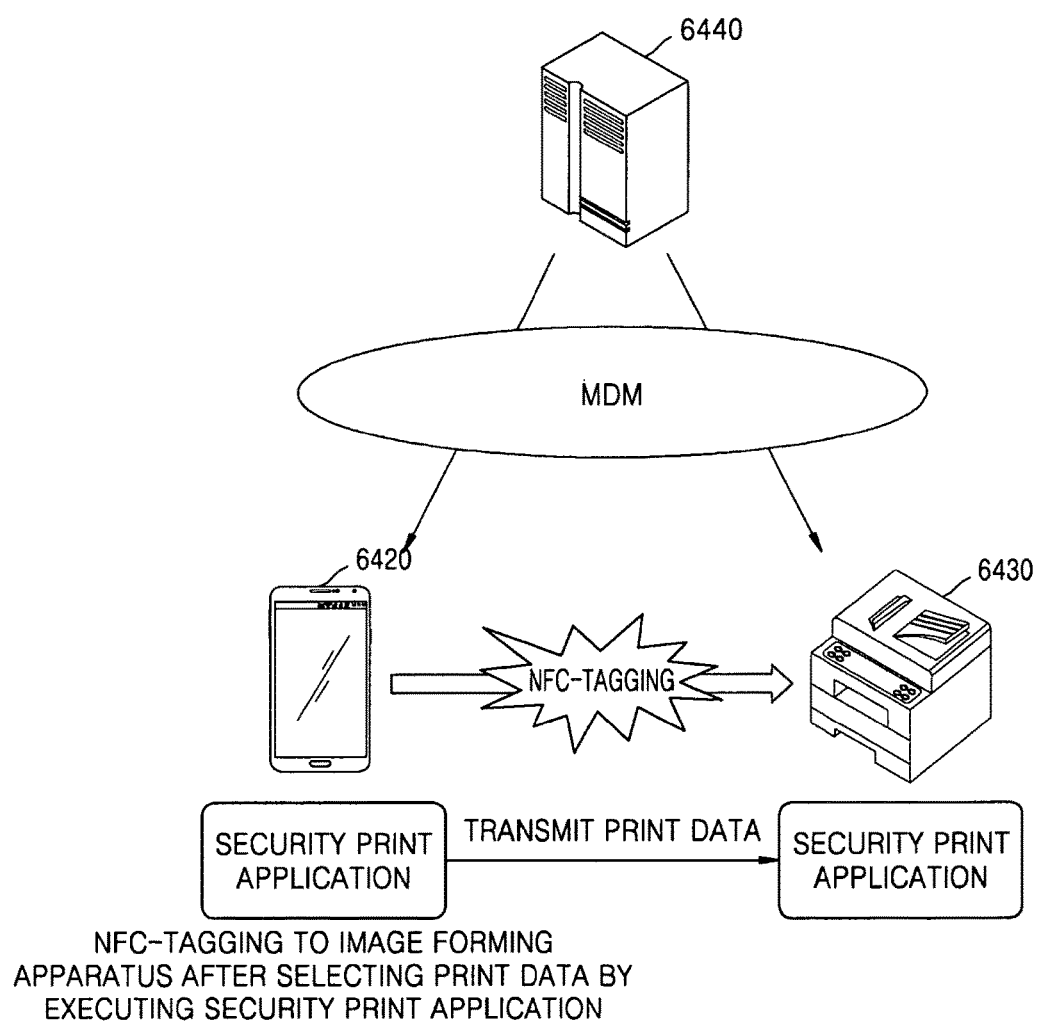

Referring to FIG. 65C, in the MDM environment, when a user executes the security print application in the mobile device 6420, the user may check the print data received from the PC 6410, and request the print data to be printed. Here, printing of the print data may be requested in any one of various methods. For example, the print data may be requested to be printed as the mobile device 6420 is NFC-tagged to the image forming apparatus 6430, or by a quick response (QR) code including ID information of the image forming apparatus 6430 is scanned through a camera of the mobile device 6420. The printing of the print data may be requested via other methods.

When the user requests the print data to be printed, the security print application of the mobile device 6420 requests the image forming apparatus 6430 to print the print data by transmitting the print data to the security print application of the image forming apparatus 6430. The image forming apparatus 6430 prints the print data.

Other exemplary embodiments of generating and executing a workform will now be described with reference to FIGS. 66 through 70.

Figure 66:
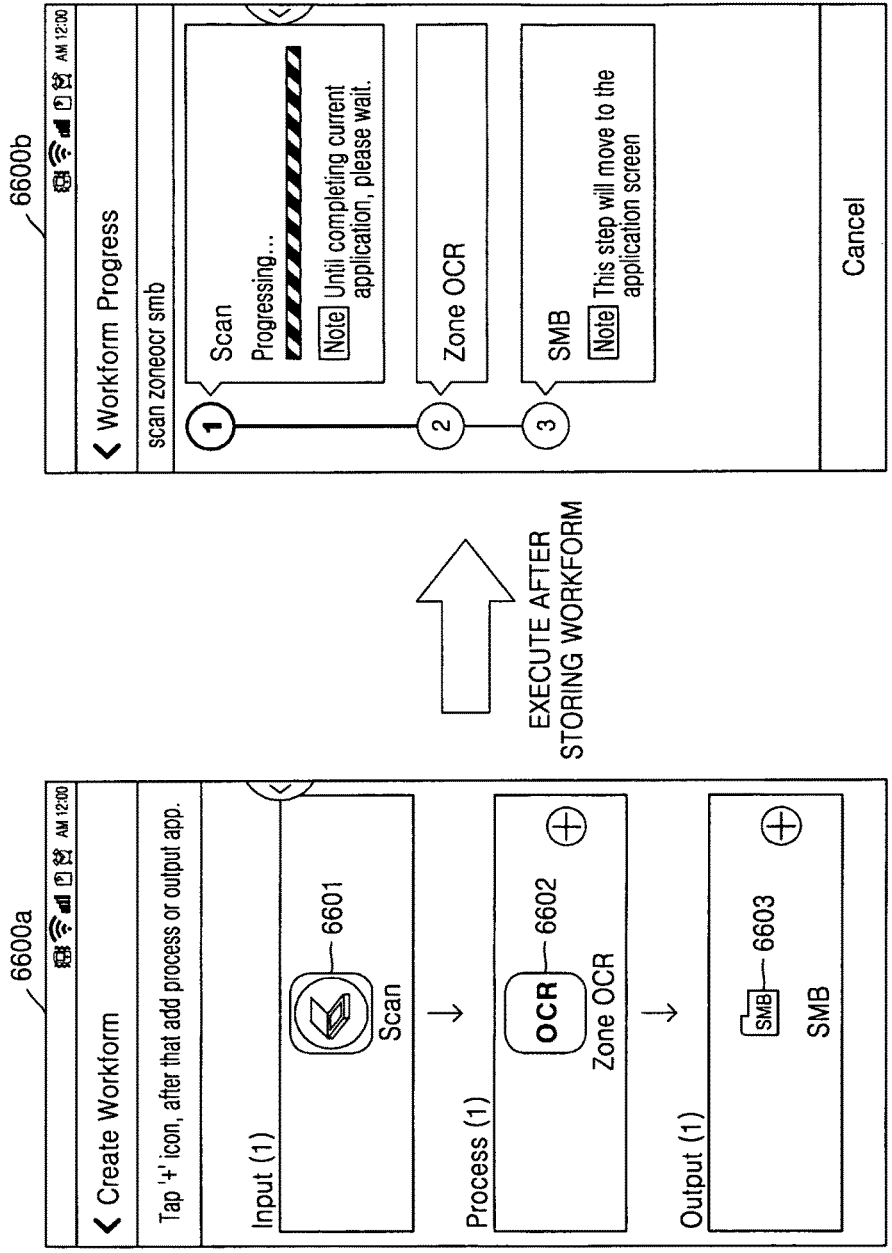
FIG. 66 is a diagram describing an embodiment of generating and executing a workform for scanning a document to obtain a scan image, generating a file name using information obtained via optical character recognition (OCR) on a certain region of the scan image, and then storing the scan image in a server management block (SMB) server.

FIG. 66 is a diagram describing an embodiment of generating and executing a workform for scanning a document to obtain a scan image, generating a file name by using information obtained via OCR on a certain region of the scan image, and then storing the scan image in a server management block (SMB) server.

Referring to FIG. 66, a first screen 6600a is a UI screen for generating a workform, and a second screen 6600b is a UI screen displayed when the workform is executed. In the first screen 6600a, the workform is generated by selecting a scan application 6601 as an input application, selecting a zone OCR application 6602 as a process application, and selecting an SMB application 6603 as an output application. The first screen 6600a and the second screen 6600b may be displayed on any one of a screen of a mobile device and a display panel of an image forming apparatus, or may be simultaneously displayed on both the screen of the mobile device and the display panel of the image forming apparatus.

When the workform generated according to the first screen 6600a of FIG. 66 is executed, processes are started as the second screen 6600b is displayed. First, the image forming apparatus obtains a scan image by scanning a document. Then, the zone OCR application 6602 performs OCR on a certain region of the scan image. Here, the certain region on which the OCR is performed may be a region of the document pre-assigned by the user, or may be a region in which text having at least a certain size exists. In addition, the certain region may be variously set. When the OCR is completed, the SMB application 6603 automatically generates a file name by using text obtained as a result of the OCR, and store the scan image in an SMB server under the generated file name.

As such, by generating the file name by using the text obtained by performing the OCR on the certain region of the scan image, the file name for identifying the scan image may be automatically generated without the user having to assign a file name.

Meanwhile, an exemplary embodiment of scanning a document and generating a file name by using text obtained by performing OCR on a certain region of the document is described above, but alternatively, a target other than a document may be scanned, and a file name may be generated by using information obtained by performing image recognition on a certain region of the target.

The zone OCR application 6602 and the SMB application 6603 may be installed in any one of the mobile device and the image forming apparatus. In other words, the zone OCR application 6602 and the SMB application 6603 may both be installed in the mobile device or the image forming apparatus. Alternatively, the zone OCR application 6602 may be installed in the mobile device and the SMB application 6603 may be installed in the image forming apparatus, or the zone OCR application 6602 may be installed in the image forming apparatus and the SMB application 6603 may be installed in the mobile device.

Meanwhile, a progress status of the workform may be displayed on the second screen 6600b. The second screen 6600b shown in FIG. 66 may display that scanning is currently performed and which process is to be performed next.

Figure 67:
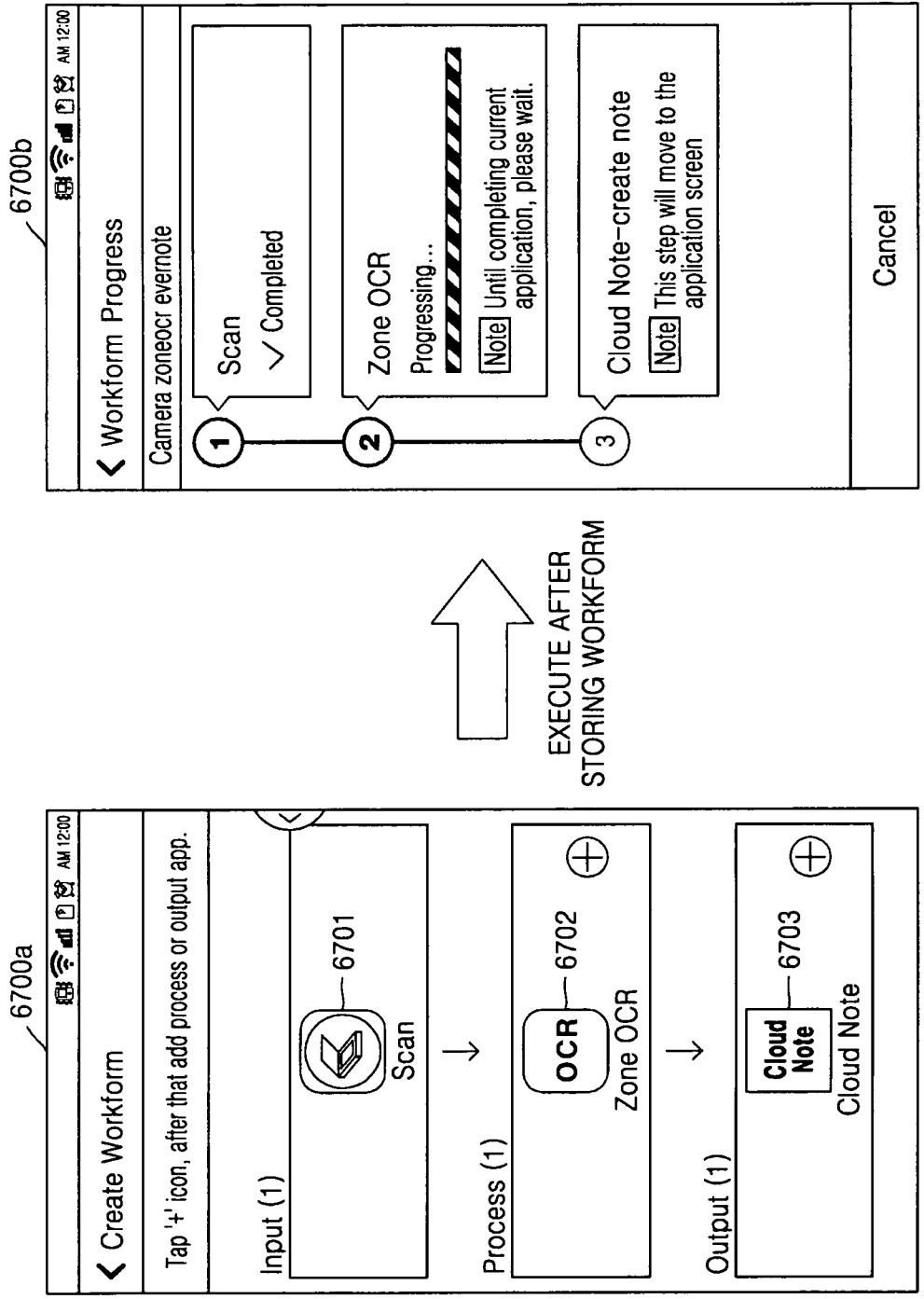
FIG. 67 is a diagram describing an embodiment of generating and executing a workform for scanning a document to obtain a scan image, generating a file name using information obtained via OCR on a certain region of the scan image, and then storing the scan image through a cloud document management application provided by a third party.

FIG. 67 is a diagram describing an embodiment of generating and executing a workform for scanning a document to obtain a scan image, generating a file name by using information obtained via OCR on a certain region of the scan image, and then storing the scan image through a cloud document management application provided by a third party.

Referring to FIG. 67, a first screen 6700a is a UI screen for generating the workform, and a second screen 6700b is a UI screen displayed when the workform is executed. In the first screen 6700a, the workform is generated by selecting a scan application 6701 as an input application, a zone OCR application 6702 as a process application, and a cloud note application 6703 as an output application. The first and second screens 6700a and 6700b may be displayed on any one of a screen of a mobile device and a display panel of an image forming apparatus, or may be simultaneously displayed on both the screen of the mobile device and the display panel of the image forming apparatus.

When the workform generated according to the first screen 6700a of FIG. 67 is executed, processes are started as the second screen 6700b is displayed. First, the image forming apparatus obtains a scan image by scanning a document. Then, the zone OCR application 6702 performs OCR on a certain region of the scan image. Here, the certain region on which the OCR is performed may be a region of the document pre-assigned by the user, or may be a region in which text having at least a certain size exists. In addition, the certain region may be variously set. When the OCR is completed, the cloud note application 6703 automatically generates a file name by using text obtained as a result of the OCR, and store the scan image in a cloud server under the generated file name. Here, the cloud note application 6703 is an application provided by a third party and may perform functions of storing and managing a document or an image in a cloud server.

As such, by generating the file name by using the text obtained by performing the OCR on the certain region of the scan image, the file name for identifying the scan image may be automatically generated without the user having to assign a file name.

Meanwhile, an exemplary embodiment of scanning a document and generating a file name by using text obtained by performing OCR on a certain region of the document is described above, but alternatively, a target other than a document may be scanned, and a file name may be generated by using information obtained by performing image recognition on a certain region of the target.

The zone OCR application 6702 and the cloud note application 6703 may be installed in any one of the mobile device and the image forming apparatus. In other words, the zone OCR application 6702 and the cloud note application 6703 may both be installed in the mobile device or the image forming apparatus. Alternatively, the zone OCR application 6702 may be installed in the mobile device and the cloud note application 6703 may be installed in the image forming apparatus, or the zone OCR application 6702 may be installed in the image forming apparatus and the cloud note application 6703 may be installed in the mobile device.

Meanwhile, a progress status of the workform may be displayed on the second screen 6700*b*. The second screen 6700*b* of FIG. 67 may display that zone OCR is currently performed after scanning is completed, and which process is to be performed next.

Figure 68:
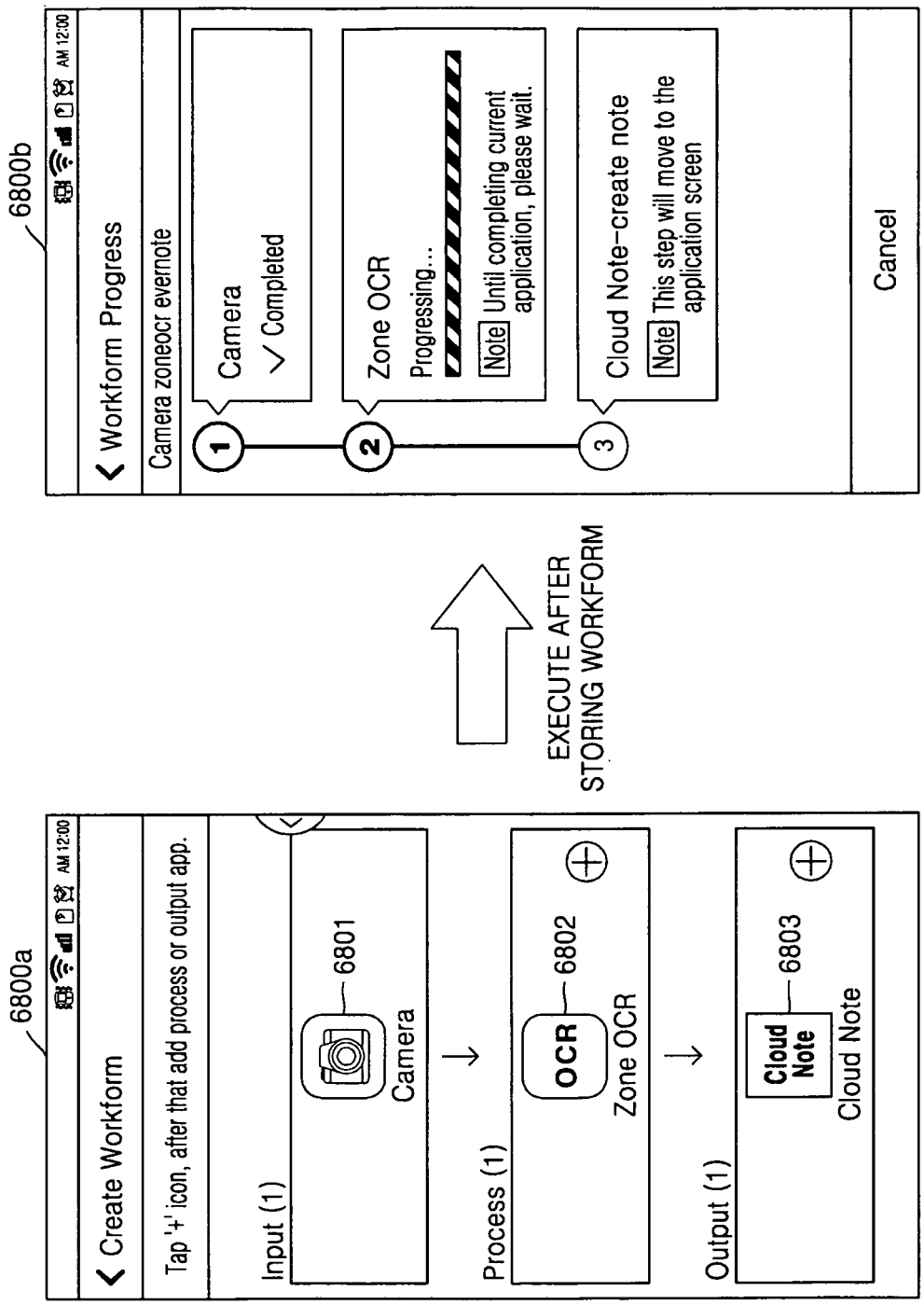
FIG. 68 is a diagram describing an embodiment of generating and executing a workform for capturing an image of a document, generating a file name using information obtained via OCR on a certain region of the image, and then storing the image through a cloud document management application provided by a third party.

FIG. 68 is a diagram describing an embodiment of generating and executing a workform for capturing an image of a document, generating a file name by using information obtained via OCR on a certain region of the image, and then storing the image through a cloud document management application provided by a third party.

Referring to FIG. 68, a first screen 6800*a* is a UI screen for generating the workform, and a second screen 6800*b* is a UI screen displayed when the workform is executed. In the first screen 6800*a*, the workform is generated by selecting a camera application 6801 as an input application, a zone OCR application 6802 as a process application, and a cloud note application 6803 as an output application. The first and second screens 6800*a* and 6800*b* may be displayed on any one of a screen of a mobile device and a display panel of an image forming apparatus, or may be simultaneously displayed on both the screen of the mobile device and the display panel of the image forming apparatus.

When the workform generated according to the first screen 6800*a* of FIG. 68 is executed, processes are started as the second screen 6800*b* is displayed. First, the mobile device captures an image of a document by using a camera included in the mobile device. Then, the zone OCR application 6802 performs OCR on a certain region of the image. Here, the certain region on which the OCR is performed may be a region of the document pre-assigned by the user or may be a region in which text having at least a certain size exists. In addition, the certain region may be variously set. When the OCR is completed, the cloud note application 6803 automatically generates a file name by using text obtained as a result of the OCR, and store the image in a cloud server under the generated file name. Here, the cloud note application 6803 is an application provided by a third party and may perform functions of storing and managing a document or an image in a cloud server.

Meanwhile, an exemplary embodiment of scanning a document and generating a file name by using text obtained by performing OCR on a certain region of the document is described above, but alternatively, a target other than a document may be scanned, and a file name may be generated using information obtained by performing image recognition on a certain region of the target.

The zone OCR application 6802 and the cloud note application 6803 may be installed in any one of the mobile device and the image forming apparatus. In other words, the zone OCR application 6802 and the cloud note application 6803 may both be installed in the mobile device or the image forming apparatus. Alternatively, the zone OCR application 6802 may be installed in the mobile device and the cloud note application 6803 may be installed in the image forming apparatus, or the zone OCR application 6802 may be installed in the image forming apparatus and the cloud note application 6803 may be installed in the mobile device.

Meanwhile, a progress status of the workform may be displayed on the second screen 6800*b*. The second screen 6800*b* of FIG. 68 may display that the zone OCR is currently performed after the image of the document is captured, and which process is to be performed next.

Figure 69:
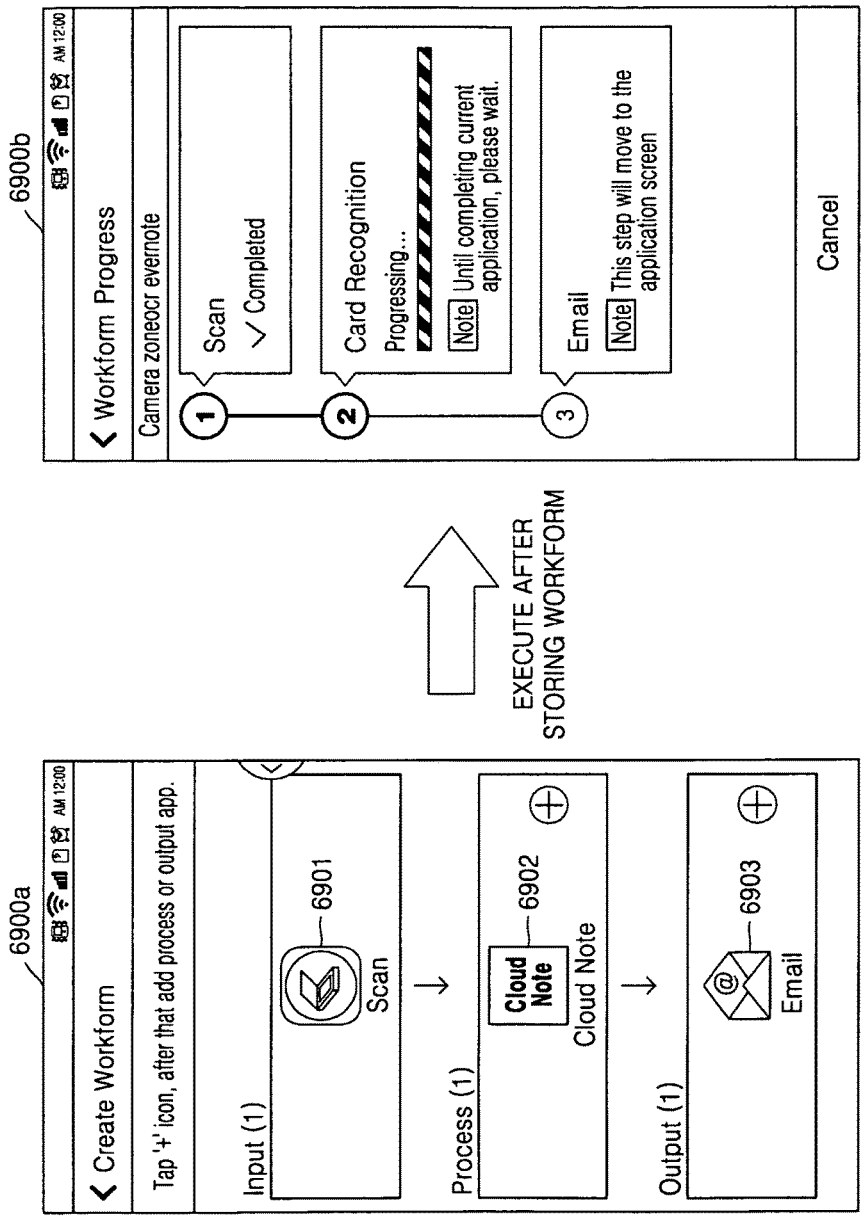
FIG. 69 is a diagram describing an embodiment of generating and executing a workform for scanning a business card to obtain a scan image, obtaining an email address from the scan image, and then transmitting a file to the email address.

FIG. 69 is a diagram describing an embodiment of generating and executing a workform for scanning a business card to obtain a scan image, obtaining an email address from the scan image, and then transmitting a file to the email address.

Referring to FIG. 69, a first screen 6900*a* is a UI screen for generating the workform, and a second screen 6900*b* is a UI screen displayed when the workform is executed. In the first screen 6900*a*, the workform is generated by selecting a scan application 6901 as an input application, a card recognition application 6902 as a process application, and an email application 6903 as an output application. The first and second screens 6900*a* and 6900*b* may be displayed on any one of a screen of a mobile device and a display panel of an image forming apparatus, or may be simultaneously displayed on both the screen of the mobile device and the display panel of the image forming apparatus.

When the workform generated according to the first screen 6900*a* of FIG. 69 is executed, processes are started as the second screen 6900*b* is displayed. First, the image forming apparatus scans a business card to obtain a scan image. Then, the card recognition application 6902 recognizes and obtains an email address from the scan image. Here, the email address may be obtained from the scan image by using a zone OCR application instead of the card recognition application 6902. When the email address is obtained, the email application 6903 transmits a file to the email address. Here, the file may be pre-assigned by a user. For example, an event coupon may be pre-assigned to be transmitted, or a business document, such as a meeting document, may be pre-assigned to be transmitted.

Meanwhile, an exemplary embodiment of scanning a business card to obtain a scan image, obtaining an email address from the scan image, and transmitting a file to the email address is described above, but alternatively, a business card may be photographed, an email address may be obtained from a captured image of the business card, and a file may be transmitted to the email address, or a destination other than the email address, such as a phone number, may be obtained from the scan image or the captured image of the business card to transmit the file.

The card recognition application 6902 and the email application 6903 may be installed in any one of the mobile device and the image forming apparatus. In other words, the card recognition application 6902 and the email application 6903 may both be installed in the mobile device or the image forming apparatus. Alternatively, the card recognition application 6902 may be installed in the mobile device and the email application 6903 may be installed in the image forming apparatus, or the card recognition application 6902 may be installed in the image forming apparatus and the email application 6903 may be installed in the mobile device.

Meanwhile, a progress status of the workform may be displayed on the second screen 6900*b*. The second screen 6900*b* shown in FIG. 69 may display that card recognition is currently performed after business card is scanned and which process is to be performed next.

Figure 70:
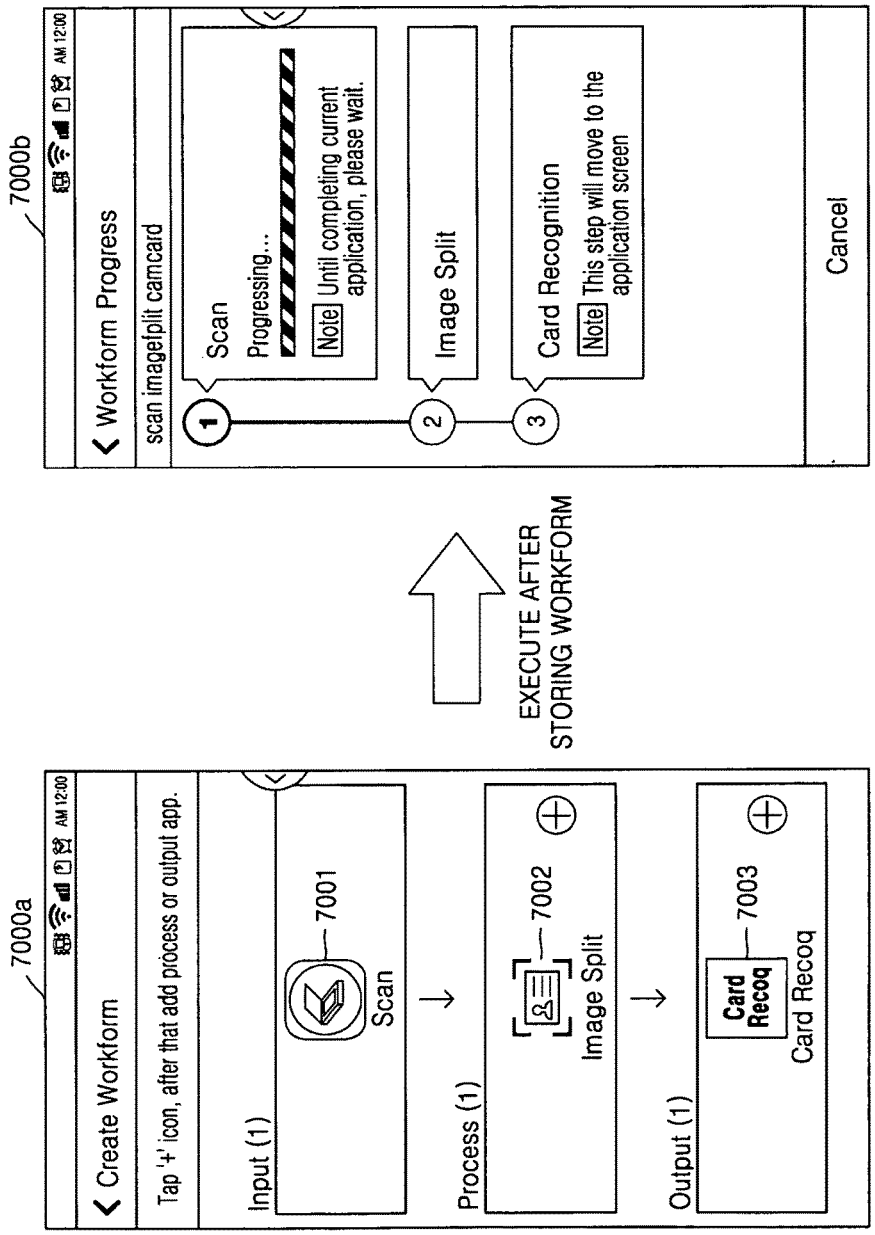
FIG. 70 is a diagram describing an embodiment of generating and executing a workform for scanning a business card to obtain a scan image, obtaining an email address from the scan image, and then updating the email address to an address book.

FIG. 70 is a diagram describing an embodiment of generating and executing a workform for scanning a business card to obtain a scan image, obtaining an email address from the scan image, and then updating the email address to an address book.

Referring to FIG. 70, a first screen 7000a is a UI screen for generating the workform, and a second screen 7000b is a UI screen displayed when the workform is executed. In the first screen 7000a, the workform is generated by selecting a scan application 7001 as an input application, an image split application 7002 as a process application, and a card recognition application 7003 as an output application. The first and second screens 7000a and 7000b may be displayed on any one of a screen of a mobile device and a display panel of an image forming apparatus, or may be simultaneously displayed on both the screen of the mobile device and the display panel of the image forming apparatus.

When the workform generated according to the first screen 7000a of FIG. 70 is executed, processes are started as the second screen 7000b is displayed. First, the image forming apparatus scans a business card to obtain a scan image. Then, the image split application 7002 splits regions of the scan image. For example, the scan image may be split into a region where a name is displayed, a region where a phone number is displayed, and a region where an email address is displayed. After the scan image is split, the card recognition application 7003 may obtain an email address from the scan image, and update the email address to an address book. In other words, the card recognition application 7003 may store the email address in the address book such that the email address corresponds to a name included in the scan image. Alternatively, the card recognition application 7003 may obtain a phone number instead of the email address, and update the phone number to the address book.

Meanwhile, an exemplary embodiment of scanning a business card to obtain a scan image, obtaining an email address from the scan image, and updating an address book is described above, but alternatively, a business card may be photographed, an email address may be obtained from a captured image of the business card, and an address book may be updated, or information other than the email address, such as a phone number, may be obtained from the scan image or the captured image of the business card to update the address book.

The image split application 7002 and the card recognition application 7003 may be installed in any one of the mobile device and the image forming apparatus. In other words, the image split application 7002 and the card recognition application 7003 may both be installed in the mobile device or the image forming apparatus. Alternatively, the image split application 7002 may be installed in the mobile device and the card recognition application 7003 may be installed in the image forming apparatus, or the image split application 7002 may be installed in the image forming apparatus and the card recognition application 7003 may be installed in the mobile device.

Meanwhile, a progress status of the workform may be displayed on the second screen 7000b. The second screen 7000b shown in FIG. 70 may display that scanning is currently performed and which process is to be performed next.

As described above, according to one or more exemplary embodiments, a workform defining an order of performing jobs using a BYOD service may be generated and stored, and the workform may be executed later such that the jobs are performed in the defined order, thereby increasing user convenience.

The one or more exemplary embodiments described above may be written as computer programs and may be implemented in general-use digital computers that execute the programs using a computer-readable recording medium. Examples of the computer-readable recording medium include magnetic storage media (e.g., ROM, floppy disks, hard disks, etc.), optical recording media (e.g., CD-ROMs, or DVDs), etc.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments. While one or more exemplary embodiments have been described with reference to the figures, it will be understood by those of ordinary skill in the art that various changes in form and details may be made therein without departing from the spirit and scope as defined by the following claims.

What is claimed is:

1. A method of generating a workform that defines an order of performing jobs, the method comprising:
   selecting, for a workform to be generated, any one of an image forming apparatus and a mobile device as an input source to be used to receive a job target during execution of the workform;
   selecting, for the workform to be generated, an editor application to be automatically executed in response to the job target being received via the input source during execution of the workform, wherein the editor application is to edit the job target received via the input source during the execution of the workform;
   selecting, for the workform to be generated, any one of the image forming apparatus and the mobile device as a transmission destination to be used to transmit the job target edited by the editor application during the execution of the workform;
   generating the workform which defines a plurality of jobs and an order in which the plurality of jobs are to be performed, with reference to the input source, the editor application, and the transmission destination; and
   storing the workform.

2. The method of claim 1, wherein the selecting of any one of the image forming apparatus and the mobile device as the input source comprises:
   selecting any one of the image forming apparatus and the mobile device; and
   selecting a function of the selected any one of the image forming apparatus and the mobile device.

3. The method of claim 2, wherein the selecting of any one of the image forming apparatus and the mobile device as the input source further comprises setting an option related to performing the function selected.

4. The method of claim 1, wherein
   the editor application is an image editor application, and
   the image editor application is installed in the mobile device in which the workform is stored.

5. The method of claim 1, wherein the selecting of any one of the image forming apparatus and the mobile device as the transmission destination comprises:
   selecting any one of the image forming apparatus and the mobile device; and
   selecting a function to be performed by the selected any one of the image forming apparatus and the mobile device after the job target is transmitted to the selected any one of the image forming apparatus and the mobile device.

6. The method of claim 5, wherein the selecting of any one of the image forming apparatus and the mobile device as the transmission destination further comprises setting an option related to performing the function selected.

7. The method of claim 1, wherein, when the image forming apparatus is selected as the input source, the selecting of any one of the image forming apparatus and the mobile device as the transmission destination comprises selecting an image forming apparatus that is different from the image forming apparatus that is selected as the input source, as the transmission destination.

8. The method of claim 1, wherein a name of the workform is automatically generated such that details and orders of jobs defined in the workform are distinguished.

9. The method of claim 1, wherein, when the workform is stored in the mobile device, the mobile device performs pairing with an image forming apparatus that is selected as the input source or the transmission destination.

10. A non-transitory computer-readable recording medium having recorded thereon a program for executing the method of claim 1.

11. A mobile device, comprising:
a hardware user input device to receive a user input:
to select, for a workform to be generated, an input source to be used to receive a job target during execution of the workform,
to select, for the workform to be generated, an editor application to be automatically executed in response to the job target being received via the input source during execution of the workform, wherein the editor application is to edit the job target received via the input source during the execution of the workform, and
to select, for the workform to be generated, a transmission destination to be used to transmit the job target edited by the editor application during the execution of the workform;
a controller to generate the workform which defines a plurality of jobs and an order in which the plurality of jobs are to be performed, with reference to the input source, the editor application, and the transmission destination, which are selected according to the user input received through the hardware user input device; and
a storage to store the workform generated by the controller,
wherein
any one of an image forming apparatus and the mobile device is selected as the input source and any one of the image forming apparatus and the mobile device is selected as the transmission destination.

12. The mobile device of claim 11, wherein, when the user input received through the hardware user input device contains information about selecting any one of the image forming apparatus and the mobile device as the input source and selecting a function of the selected any one of the image forming apparatus and the mobile device to operate as the input source, the controller generates the workform to comprise the selected any one of the image forming apparatus and the mobile device and the function selected.

13. The mobile device of claim 12, wherein, when the user input received through the hardware user input device further contains information about setting an option related to performing the function selected, the controller generates the workform to further comprise the option.

14. The mobile device of claim 11, wherein
the editor application is an image editor application, and the image editor application is installed in the mobile device.

15. The mobile device of claim 11, wherein, when the user input received through the hardware user input device contains information about selecting any one of the image forming apparatus and the mobile device as the transmission destination, and selecting a function to be performed by the selected any one of the image forming apparatus and the mobile device after the job target is transmitted to the selected any one of the image forming apparatus and the mobile device, the controller generates the workform to comprise the selected any one of the image forming apparatus and the mobile device and the function selected.

16. The mobile device of claim 15, wherein, when the user input received through the hardware input user device further contains information about setting an option related to performing the function selected, the controller generates the workform to further comprise the option.

17. The mobile device of claim 11, wherein, when the image forming apparatus is selected as the input source, an image forming apparatus that is different from the image forming apparatus that is selected as the input source is selected as the transmission destination.

18. The mobile device of claim 11, wherein the controller automatically generates a name of the workform such that details and orders of jobs defined in the workform are distinguished.

19. The mobile device of claim 11, further comprising a communication hardware unit that communicates with the image forming apparatus,
wherein, when the workform is generated, the controller performs pairing with an image forming apparatus that is selected as the input source or the transmission destination, through the communication hardware unit.

20. A mobile device, comprising:
a hardware user input device to receive a user input:
to select, for a workform to be generated, a camera of the mobile device or a first image forming apparatus as a source from which an image is to be obtained during execution of the workform,
to select, for the workform to be generated, an image editor application to be used to edit the image received via the camera or the first image forming apparatus during the execution of the workform, and
to select, for the workform to be generated, a transmission destination to be used to transmit the image edited by the image editor application during the execution of the workform;
a controller to generate the workform which defines a plurality of jobs and an order in which the plurality of jobs are to be performed, with reference to the image editor application, the transmission destination, and at least one of the camera or the first image forming apparatus, selected according to the user input received through the hardware user input device; and
a storage to store the workform generated by the controller,
wherein
when the camera is selected as the source, at least one of the first image forming apparatus or a second image forming apparatus is selectable as the transmission destination, and
when the first image forming apparatus is selected as the source, at least one of the mobile device or the second image forming apparatus is selectable as the transmission destination.

* * * * *